(12) United States Patent
Ganapathiappan et al.

(10) Patent No.: US 10,953,515 B2
(45) Date of Patent: Mar. 23, 2021

(54) APPARATUS AND METHOD OF FORMING A POLISHING PADS BY USE OF AN ADDITIVE MANUFACTURING PROCESS

(71) Applicant: Applied Materials, Inc., Santa Clara, CA (US)

(72) Inventors: Sivapackia Ganapathiappan, Los Altos, CA (US); Boyi Fu, San Jose, CA (US); Ashwin Chockalingam, San Jose, CA (US); Daniel Redfield, Morgan Hill, CA (US); Rajeev Bajaj, Fremont, CA (US); Mahendra C. Orilall, Santa Clara, CA (US); Hou T. Ng, San Jose, CA (US); Jason G. Fung, Santa Clara, CA (US); Mayu Yamamura, San Carlos, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 750 days.

(21) Appl. No.: 15/352,647

(22) Filed: Nov. 16, 2016

(65) Prior Publication Data

US 2017/0136603 A1    May 18, 2017

Related U.S. Application Data

(63) Continuation of application No. 15/296,015, filed on Oct. 17, 2016, now Pat. No. 10,399,201, which is a
(Continued)

(51) Int. Cl.
*B24B 37/24* (2012.01)
*B24B 37/22* (2012.01)
(Continued)

(52) U.S. Cl.
CPC .............. *B24B 37/24* (2013.01); *B24B 37/22* (2013.01); *B24B 37/26* (2013.01); *B24D 3/28* (2013.01);
(Continued)

(58) Field of Classification Search
None
See application file for complete search history.

(56) References Cited

U.S. PATENT DOCUMENTS 3,741,116 A    6/1973    Green et al.
4,459,779 A    7/1984    Shen
(Continued)

FOREIGN PATENT DOCUMENTS

CN    1345264 A    4/2002
CN    1387469 A    12/2002
(Continued)

OTHER PUBLICATIONS

Chinese Office Action dated Jul. 30, 2018, for Chinese Application/Patent No. 201580069573.2.
(Continued)

*Primary Examiner* — Pegah Parvini
*Assistant Examiner* — Ross J Christie
(74) *Attorney, Agent, or Firm* — Patterson + Sheridan LLP

(57) ABSTRACT

Embodiments of the present disclosure relate to advanced polishing pads with tunable chemical, material and structural properties, and new methods of manufacturing the same. According to one or more embodiments of the disclosure, it has been discovered that a polishing pad with improved properties may be produced by an additive manufacturing process, such as a three-dimensional (3D) printing process. Embodiments of the present disclosure thus may provide an advanced polishing pad that has discrete features
(Continued)

and geometries, formed from at least two different materials that include functional polymers, functional oligomers, reactive diluents, addition polymer precursor compounds, catalysts, and curing agents. For example, the advanced polishing pad may be formed from a plurality of polymeric layers, by the automated sequential deposition of at least one polymer precursor composition followed by at least one curing step, wherein each layer may represent at least one polymer composition, and/or regions of different compositions. Embodiments of the disclosure further provide a polishing pad with polymeric layers that may be interpenetrating polymer networks.

29 Claims, 22 Drawing Sheets

Related U.S. Application Data continuation-in-part of application No. 15/002,384, filed on Jan. 20, 2016, which is a continuation-in-part of application No. 14/920,801, filed on Oct. 22, 2015, which is a continuation-in-part of application No. 14/887,240, filed on Oct. 19, 2015, which is a continuation-in-part of application No. 14/885,950, filed on Oct. 16, 2015, now Pat. No. 10,384,330.

(60) Provisional application No. 62/065,193, filed on Oct. 17, 2014, provisional application No. 62/065,270, filed on Oct. 17, 2014, provisional application No. 62/304,134, filed on Mar. 4, 2016, provisional application No. 62/323,599, filed on Apr. 15, 2016, provisional application No. 62/339,807, filed on May 21, 2016, provisional application No. 62/380,334, filed on Aug. 26, 2016, provisional application No. 62/280,537, filed on Jan. 19, 2016, provisional application No. 62/331,234, filed on May 3, 2015, provisional application No. 62/380,015, filed on Aug. 26, 2016.

(51) Int. Cl.
| | | |
|---|---|---|
| B24B 37/26 | (2012.01) | |
| B29C 64/112 | (2017.01) | |
| B24D 3/28 | (2006.01) | |
| B24D 11/00 | (2006.01) | |
| B24D 11/04 | (2006.01) | |
| B33Y 10/00 | (2015.01) | |
| B33Y 80/00 | (2015.01) | |
| B29C 35/08 | (2006.01) | |
| C09D 4/00 | (2006.01) | |
| C09G 1/16 | (2006.01) | |
| B33Y 70/00 | (2020.01) | |
| B29K 33/04 | (2006.01) | |

(52) U.S. Cl.
CPC ............ *B24D 11/001* (2013.01); *B24D 11/04* (2013.01); *B29C 35/0805* (2013.01); *B29C 64/112* (2017.08); *B33Y 10/00* (2014.12); *B33Y 80/00* (2014.12); *C09D 4/00* (2013.01); *C09G 1/16* (2013.01); *B24D 2203/00* (2013.01); *B29C 2035/0827* (2013.01); *B29K 2033/04* (2013.01); *B29K 2995/0077* (2013.01); *B29K 2995/0092* (2013.01); *B33Y 70/00* (2014.12)

(56) References Cited

U.S. PATENT DOCUMENTS

| | | |
|---|---|---|
| 4,575,330 A | 3/1986 | Hull |
| 4,836,832 A | 6/1989 | Tumey et al. |
| 4,844,144 A | 7/1989 | Murphy et al. |
| 4,942,001 A | 7/1990 | Murphy et al. |
| 5,096,530 A | 3/1992 | Cohen |
| 5,120,476 A | 6/1992 | Scholz |
| 5,121,329 A | 6/1992 | Crump |
| 5,178,646 A | 1/1993 | Barber, Jr. et al. |
| 5,212,910 A | 5/1993 | Breivogel et al. |
| 5,287,663 A | 2/1994 | Pierce et al. |
| 5,300,417 A | 4/1994 | Lushington et al. |
| 5,387,380 A | 2/1995 | Cima et al. |
| 5,533,923 A | 7/1996 | Shamouilian et al. |
| 5,605,760 A | 2/1997 | Roberts |
| 5,609,517 A | 3/1997 | Lofaro |
| 5,626,919 A | 5/1997 | Chapman et al. |
| 5,738,574 A | 4/1998 | Tolles et al. |
| 5,876,268 A | 3/1999 | Lamphere et al. |
| 5,900,164 A | 5/1999 | Budinger et al. |
| 5,905,099 A | 5/1999 | Everaerts et al. |
| 5,906,863 A | 5/1999 | Lombardi et al. |
| 5,921,855 A | 7/1999 | Osterheld et al. |
| 5,932,040 A | 8/1999 | Audisio |
| 5,932,290 A | 8/1999 | Lombardi et al. |
| 5,940,674 A * | 8/1999 | Sachs ................. B22F 3/115 |
| | | 419/2 |
| 5,965,460 A | 10/1999 | Rach et al. |
| 5,984,769 A | 11/1999 | Bennett et al. |
| 5,989,111 A | 11/1999 | Lamphere et al. |
| 6,022,264 A | 2/2000 | Cook et al. |
| 6,029,096 A | 2/2000 | Manners et al. |
| 6,036,579 A | 3/2000 | Cook et al. |
| 6,062,968 A | 5/2000 | Sevilla et al. |
| 6,090,475 A | 7/2000 | Robinson et al. |
| 6,095,902 A | 8/2000 | Reinhardt |
| 6,117,000 A | 9/2000 | Anjur et al. |
| 6,122,564 A | 9/2000 | Koch et al. |
| 6,126,532 A | 10/2000 | Sevilla et al. |
| 6,155,910 A | 12/2000 | Lamphere et al. |
| 6,206,759 B1 | 3/2001 | Agarwal et al. |
| 6,210,254 B1 | 4/2001 | Cook et al. |
| 6,241,596 B1 | 6/2001 | Osterheld et al. |
| 6,273,806 B1 | 8/2001 | Bennett et al. |
| 6,322,728 B1 * | 11/2001 | Brodkin ................ A61K 6/818 |
| | | 264/19 |
| 6,328,634 B1 | 12/2001 | Shen et al. |
| 6,361,832 B1 | 3/2002 | Agarwal et al. |
| 6,423,255 B1 | 7/2002 | Hoechsmann et al. |
| 6,454,634 B1 | 9/2002 | James et al. |
| 6,488,570 B1 | 12/2002 | James et al. |
| 6,500,053 B2 | 12/2002 | James et al. |
| 6,520,847 B2 | 2/2003 | Osterheld et al. |
| 6,569,373 B2 | 5/2003 | Napadensky |
| 6,582,283 B2 | 6/2003 | James et al. |
| 6,585,563 B1 | 7/2003 | Redeker et al. |
| 6,641,471 B1 | 11/2003 | Pinheiro et al. |
| 6,645,061 B1 | 11/2003 | Bennett et al. |
| 6,682,402 B1 | 1/2004 | Roberts et al. |
| 6,699,115 B2 | 3/2004 | Osterheld et al. |
| 6,719,818 B1 | 4/2004 | Birang et al. |
| 6,736,709 B1 | 5/2004 | James et al. |
| 6,746,225 B1 * | 6/2004 | McHugh ................ B22F 3/115 |
| | | 425/130 |
| 6,749,485 B1 | 6/2004 | James et al. |
| 6,796,880 B2 | 9/2004 | Redeker et al. |
| 6,811,937 B2 | 11/2004 | Lawton |
| 6,840,843 B2 | 1/2005 | Jones et al. |
| 6,855,588 B1 | 2/2005 | Liao et al. |
| 6,860,793 B2 | 3/2005 | Budinger et al. |
| 6,860,802 B1 | 3/2005 | Vishwanathan et al. |
| 6,869,350 B2 | 3/2005 | Roberts et al. |
| 6,875,097 B2 | 4/2005 | Grunwald |
| 6,896,593 B2 | 5/2005 | Prasad |
| 6,913,517 B2 | 7/2005 | Prasad |
| 6,935,931 B2 | 8/2005 | Prasad |

(56) References Cited

U.S. PATENT DOCUMENTS

| | | |
|---|---|---|
| 6,955,588 B1 | 10/2005 | Anderson, II et al. |
| 6,984,163 B2 | 1/2006 | Roberts |
| 6,991,517 B2 | 1/2006 | Redeker et al. |
| 6,998,166 B2 | 2/2006 | Prasad |
| 7,169,030 B1 | 1/2007 | Kulp |
| 7,195,544 B2 | 3/2007 | Prasad |
| 7,252,871 B2 | 8/2007 | Crkvenac et al. |
| 7,264,641 B2 | 9/2007 | Prasad |
| 7,267,607 B2 | 9/2007 | Prasad |
| 7,300,619 B2 | 11/2007 | Napadensky et al. |
| 7,311,862 B2 | 12/2007 | Prasad |
| 7,371,160 B1 | 5/2008 | Cruz et al. |
| 7,377,840 B2 | 5/2008 | Deopura et al. |
| 7,425,172 B2 | 9/2008 | Misra et al. |
| 7,435,161 B2 | 10/2008 | Prasad et al. |
| 7,435,165 B2 | 10/2008 | Prasad |
| 7,438,636 B2 | 10/2008 | Kulp et al. |
| 7,445,847 B2 | 11/2008 | Kulp |
| 7,455,571 B1 | 11/2008 | Kuo et al. |
| 7,497,885 B2 | 3/2009 | Kollodge |
| 7,517,488 B2 | 4/2009 | Saikin |
| 7,530,880 B2 | 5/2009 | Bajaj et al. |
| 7,531,117 B2 | 5/2009 | Ederer et al. |
| 7,537,446 B2 | 5/2009 | James et al. |
| 7,699,684 B2 | 4/2010 | Prasad |
| 7,704,122 B2 | 4/2010 | Misra et al. |
| 7,704,125 B2 | 4/2010 | Roy et al. |
| 7,815,778 B2 | 10/2010 | Bajaj |
| 7,846,008 B2 | 12/2010 | Bajaj |
| 8,066,555 B2 | 11/2011 | Bajaj |
| 8,075,372 B2 | 12/2011 | Prasad |
| 8,075,745 B2 | 12/2011 | Bajaj |
| 8,118,641 B2 | 2/2012 | Kulp et al. |
| 8,142,860 B2 | 3/2012 | Vanmaele et al. |
| 8,142,869 B2 | 3/2012 | Kobayashi et al. |
| 8,177,603 B2 | 5/2012 | Bajaj |
| 8,257,545 B2 | 9/2012 | Loyack et al. |
| 8,260,447 B2 | 9/2012 | Mattes et al. |
| 8,287,793 B2 | 10/2012 | Deopura et al. |
| 8,288,448 B2 | 10/2012 | Kulp |
| 8,292,692 B2 | 10/2012 | Bajaj |
| 8,377,623 B2 | 2/2013 | Fong |
| 8,380,339 B2 | 2/2013 | Misra et al. |
| 8,546,717 B2 | 10/2013 | Stecker |
| 8,598,523 B2 | 12/2013 | Stecker et al. |
| 8,702,479 B2 | 4/2014 | Huang et al. |
| 8,709,114 B2 | 4/2014 | Cantrell et al. |
| 8,715,035 B2 | 5/2014 | Roy et al. |
| 8,784,721 B2 | 7/2014 | Philippi et al. |
| 8,821,214 B2 | 9/2014 | Joseph |
| 8,864,859 B2 | 10/2014 | Roy et al. |
| 8,883,392 B2 | 11/2014 | Napadensky et al. |
| 8,888,480 B2 * | 11/2014 | Yoo ............... B33Y 10/00 425/375 |
| 8,932,116 B2 | 1/2015 | Deopura et al. |
| 8,986,585 B2 | 3/2015 | Cantrell et al. |
| 9,017,140 B2 | 4/2015 | Allison et al. |
| 9,067,297 B2 | 6/2015 | Allison et al. |
| 9,067,299 B2 | 6/2015 | Bajaj et al. |
| 9,156,124 B2 | 10/2015 | Allison et al. |
| 9,162,340 B2 | 10/2015 | Joseph et al. |
| 9,259,820 B2 | 2/2016 | Qian et al. |
| 9,259,821 B2 | 2/2016 | Qian et al. |
| 9,278,424 B2 | 3/2016 | Roy et al. |
| 9,296,085 B2 | 3/2016 | Bajaj et al. |
| 9,314,897 B2 | 4/2016 | Qian et al. |
| 9,333,620 B2 | 5/2016 | Qian et al. |
| 9,421,666 B2 | 8/2016 | Krishnan et al. |
| 9,457,520 B2 | 10/2016 | Bajaj et al. |
| 9,587,127 B2 | 3/2017 | Herlihy et al. |
| 9,630,249 B2 | 4/2017 | Toyserkani et al. |
| 9,744,724 B2 | 8/2017 | Bajaj et al. |
| 9,873,180 B2 | 1/2018 | Bajaj et al. |
| 9,993,907 B2 | 6/2018 | Murugesh et al. |
| 2001/0008830 A1 | 7/2001 | Tolles et al. |
| 2001/0020448 A1 | 9/2001 | Vaartstra et al. |
| 2001/0046834 A1 | 11/2001 | Ramana et al. |
| 2002/0077036 A1 | 6/2002 | Roberts et al. |
| 2002/0112632 A1 | 8/2002 | Faibish |
| 2002/0173248 A1 | 11/2002 | Doan et al. |
| 2003/0019570 A1 | 1/2003 | Chen et al. |
| 2003/0056870 A1 | 3/2003 | Comb et al. |
| 2003/0134581 A1 | 7/2003 | Wang et al. |
| 2003/0181137 A1 | 9/2003 | Redeker et al. |
| 2003/0205325 A1 | 11/2003 | Boyd et al. |
| 2004/0033758 A1 | 2/2004 | Wiswesser |
| 2004/0055223 A1 | 3/2004 | Ono et al. |
| 2004/0058623 A1 | 3/2004 | Lin et al. |
| 2004/0106367 A1 | 6/2004 | Walker et al. |
| 2004/0126575 A1 | 7/2004 | Yoshida et al. |
| 2004/0133298 A1 | 7/2004 | Toyserkani et al. |
| 2004/0154533 A1 | 8/2004 | Agarwal et al. |
| 2004/0173946 A1 | 9/2004 | Pfeifer et al. |
| 2004/0175451 A1 * | 9/2004 | Maekawa ............... B29C 41/36 425/144 |
| 2004/0187714 A1 | 9/2004 | Napadensky et al. |
| 2004/0198185 A1 | 10/2004 | Redeker et al. |
| 2005/0003189 A1 * | 1/2005 | Bredt ................ C08L 101/00 428/402 |
| 2005/0020082 A1 | 1/2005 | Vishwanathan et al. |
| 2005/0086869 A1 | 4/2005 | Park et al. |
| 2005/0101228 A1 | 5/2005 | Prasad |
| 2005/0110853 A1 | 5/2005 | Gardner et al. |
| 2005/0153634 A1 | 7/2005 | Prasad et al. |
| 2005/0171224 A1 | 8/2005 | Kulp |
| 2005/0227590 A1 * | 10/2005 | Sung ................ B24D 11/001 451/41 |
| 2006/0019587 A1 | 1/2006 | Deopura et al. |
| 2006/0052040 A1 | 3/2006 | Prasad |
| 2006/0160478 A1 | 7/2006 | Donohue et al. |
| 2006/0185256 A1 | 8/2006 | Nevoret et al. |
| 2006/0192315 A1 | 8/2006 | Farr et al. |
| 2006/0226567 A1 | 10/2006 | James et al. |
| 2006/0252900 A1 * | 11/2006 | Bowman ................ C07C 69/96 526/318 |
| 2007/0009606 A1 * | 1/2007 | Serdy ................... A61F 2/28 424/497 |
| 2007/0054599 A1 | 3/2007 | Taylor et al. |
| 2007/0117393 A1 | 5/2007 | Tregub et al. |
| 2007/0128874 A1 | 6/2007 | Shida et al. |
| 2007/0128991 A1 | 6/2007 | Yoon et al. |
| 2007/0149096 A1 | 6/2007 | Nishimura et al. |
| 2007/0212979 A1 | 9/2007 | Preston |
| 2007/0235133 A1 | 10/2007 | Benassi |
| 2007/0235904 A1 | 10/2007 | Saikin |
| 2008/0009228 A1 | 1/2008 | Nagase et al. |
| 2008/0057845 A1 | 3/2008 | Prasad |
| 2008/0157436 A1 | 7/2008 | Patel et al. |
| 2008/0207100 A1 | 8/2008 | Roy et al. |
| 2008/0211141 A1 | 9/2008 | Deopura et al. |
| 2008/0314878 A1 | 12/2008 | Cai et al. |
| 2009/0053976 A1 | 2/2009 | Roy et al. |
| 2009/0093201 A1 | 4/2009 | Kazuno et al. |
| 2009/0105363 A1 | 4/2009 | Napadensky |
| 2009/0206065 A1 | 8/2009 | Kruth et al. |
| 2009/0311955 A1 | 12/2009 | Kerprich et al. |
| 2009/0321979 A1 | 12/2009 | Hiraide |
| 2010/0140850 A1 * | 6/2010 | Napadensky ......... B29C 64/112 264/401 |
| 2010/0203815 A1 | 8/2010 | Bajaj |
| 2010/0323050 A1 | 12/2010 | Kumagai et al. |
| 2011/0059247 A1 | 3/2011 | Kuzusako et al. |
| 2011/0077321 A1 | 3/2011 | Napadensky |
| 2011/0180952 A1 | 7/2011 | Napadensky |
| 2012/0178845 A1 | 7/2012 | Napadensky et al. |
| 2012/0302148 A1 * | 11/2012 | Bajaj ................... B24B 37/205 451/527 |
| 2012/0315830 A1 | 12/2012 | Joseph et al. |
| 2013/0012108 A1 | 1/2013 | Li et al. |
| 2013/0017769 A1 | 1/2013 | Kimura |
| 2013/0019570 A1 | 1/2013 | Weible |
| 2013/0055568 A1 | 3/2013 | Dusel et al. |
| 2013/0059509 A1 | 3/2013 | Deopura et al. |
| 2013/0172509 A1 | 7/2013 | Pawloski et al. |

(56) References Cited

U.S. PATENT DOCUMENTS

| | | | |
|---|---|---|---|
| 2013/0231032 A1 | 9/2013 | Swedek et al. | |
| 2013/0283700 A1 | 10/2013 | Bajaj et al. | |
| 2013/0307194 A1* | 11/2013 | Elsey | B29C 67/0055 264/401 |
| 2013/0309951 A1 | 11/2013 | Benvegnu et al. | |
| 2013/0316081 A1 | 11/2013 | Kovalcik et al. | |
| 2013/0328228 A1 | 12/2013 | Pettis et al. | |
| 2014/0048970 A1 | 2/2014 | Batchelder et al. | |
| 2014/0117575 A1 | 5/2014 | Kemperle et al. | |
| 2014/0163717 A1 | 6/2014 | Das et al. | |
| 2014/0206268 A1 | 7/2014 | Lefevre et al. | |
| 2014/0239527 A1 | 8/2014 | Lee | |
| 2014/0324206 A1 | 10/2014 | Napadensky | |
| 2014/0370214 A1 | 12/2014 | Araki et al. | |
| 2014/0370788 A1 | 12/2014 | Nair | |
| 2015/0024233 A1 | 1/2015 | Gunther | |
| 2015/0031781 A1 | 1/2015 | Landers et al. | |
| 2015/0037601 A1 | 2/2015 | Blackmore | |
| 2015/0038066 A1 | 2/2015 | Huang et al. | |
| 2015/0045928 A1 | 2/2015 | Perez et al. | |
| 2015/0056421 A1* | 2/2015 | Yudovin-Farber | B33Y 10/00 428/201 |
| 2015/0056892 A1 | 2/2015 | Vacassy et al. | |
| 2015/0056895 A1 | 2/2015 | Fotou et al. | |
| 2015/0061170 A1 | 3/2015 | Engel et al. | |
| 2015/0065020 A1 | 3/2015 | Roy et al. | |
| 2015/0084238 A1 | 3/2015 | Bonassar et al. | |
| 2015/0093977 A1 | 4/2015 | Deopura et al. | |
| 2015/0115490 A1 | 4/2015 | Reinarz | |
| 2015/0123298 A1 | 5/2015 | Napadensky | |
| 2015/0126099 A1 | 5/2015 | Krishnan et al. | |
| 2015/0129798 A1 | 5/2015 | Napadensky | |
| 2015/0174826 A1 | 6/2015 | Murugesh et al. | |
| 2015/0216790 A1 | 8/2015 | Feng et al. | |
| 2016/0052103 A1 | 2/2016 | Qian et al. | |
| 2016/0107287 A1 | 4/2016 | Bajaj et al. | |
| 2016/0107288 A1 | 4/2016 | Orilall et al. | |
| 2016/0114458 A1 | 4/2016 | Bajaj et al. | |
| 2016/0176021 A1 | 6/2016 | Orilall | |
| 2016/0221145 A1 | 8/2016 | Huang et al. | |
| 2016/0229023 A1 | 8/2016 | Lugg et al. | |
| 2016/0279757 A1 | 9/2016 | Qian et al. | |
| 2016/0354901 A1 | 12/2016 | Krishnan et al. | |
| 2017/0100817 A1 | 4/2017 | Ganapathiappan et al. | |
| 2017/0151648 A1 | 6/2017 | Huang et al. | |
| 2017/0182629 A1 | 6/2017 | Lehuu et al. | |
| 2017/0203406 A1 | 7/2017 | Ganapathiappan et al. | |
| 2017/0203409 A1 | 7/2017 | Lefevre et al. | |
| 2018/0236632 A1 | 8/2018 | Murugesh et al. | |

FOREIGN PATENT DOCUMENTS

| | | |
|---|---|---|
| CN | 1474735 A | 2/2004 |
| CN | 1484566 A | 3/2004 |
| CN | 1531473 A | 9/2004 |
| CN | 1569399 A | 1/2005 |
| CN | 1802237 A | 7/2006 |
| CN | 1829587 A | 9/2006 |
| CN | 1897226 A | 1/2007 |
| CN | 1961410 A | 5/2007 |
| CN | 101072657 A | 11/2007 |
| CN | 101124067 A | 2/2008 |
| CN | 101199994 A | 6/2008 |
| CN | 101375374 A | 2/2009 |
| CN | 101612722 A | 12/2009 |
| CN | 101883664 A | 11/2010 |
| CN | 102099156 A | 6/2011 |
| CN | 102686361 A | 9/2012 |
| CN | 102762340 A | 10/2012 |
| CN | 102770239 A | 11/2012 |
| CN | 102892553 A | 1/2013 |
| CN | 103465155 A | 12/2013 |
| CN | 103476546 A | 12/2013 |
| CN | 103561907 A | 2/2014 |
| CN | 203542340 U | 4/2014 |
| CN | 104105575 A | 10/2014 |
| CN | 104210108 A | 12/2014 |
| CN | 104385595 A | 3/2015 |
| CN | 104400998 A | 3/2015 |
| CN | 104607639 A | 5/2015 |
| CN | 104625945 A | 5/2015 |
| CN | 107078048 A | 8/2017 |
| CN | 110142688 A | 8/2019 |
| DE | 19834559 A1 | 2/2000 |
| EP | 1016133 A1 | 7/2000 |
| EP | 1512519 A2 | 3/2005 |
| EP | 1661690 A1 | 5/2006 |
| EP | 2025458 A2 | 2/2009 |
| EP | 2025459 A2 | 2/2009 |
| EP | 2277686 A2 | 1/2011 |
| EP | 2431157 A1 | 3/2012 |
| EP | 2463082 A1 | 6/2012 |
| JP | H08132342 A | 5/1996 |
| JP | 09076353 A | 3/1997 |
| JP | 11-254542 A | 9/1999 |
| JP | 11-347761 A | 12/1999 |
| JP | 2001501544 A | 2/2001 |
| JP | 2001507634 A | 6/2001 |
| JP | 2001507997 A | 6/2001 |
| JP | 200228849 A | 1/2002 |
| JP | 2002151447 A | 5/2002 |
| JP | 2003-303793 A | 10/2003 |
| JP | 2003324087 A | 11/2003 |
| JP | 2004235446 A | 8/2004 |
| JP | 2004-243518 A | 9/2004 |
| JP | 2005150235 A | 6/2005 |
| JP | 3801100 B2 | 7/2006 |
| JP | 2007281435 A | 10/2007 |
| JP | 2008531306 A | 8/2008 |
| JP | 2008207323 A | 9/2008 |
| JP | 2008546167 A | 12/2008 |
| JP | 2009-101487 A | 5/2009 |
| JP | 2013515379 A | 5/2013 |
| JP | 2013530061 A | 7/2013 |
| JP | 2014515319 A | 6/2014 |
| JP | 2017520496 A | 7/2017 |
| JP | 2017533586 A | 11/2017 |
| KR | 2003-0020658 A | 3/2003 |
| KR | 2005-0052876 A | 6/2005 |
| KR | 10-0606476 B1 | 7/2006 |
| KR | 2008-0038607 A | 5/2008 |
| KR | 20100028294 A | 3/2010 |
| KR | 1020130138841 | 12/2013 |
| KR | 10-2015-0047628 A | 5/2015 |
| TW | 404878 B | 9/2000 |
| TW | 200528529 A | 9/2005 |
| TW | 200628262 A | 8/2006 |
| TW | I290576 B | 12/2007 |
| TW | 200906543 A | 2/2009 |
| TW | 200909134 A | 3/2009 |
| TW | 200927382 A | 7/2009 |
| TW | 201016387 A | 5/2010 |
| TW | I374792 B | 10/2012 |
| TW | 201309419 A | 3/2013 |
| TW | I388398 B | 3/2013 |
| TW | 201350265 A | 12/2013 |
| WO | 9830356 A1 | 7/1998 |
| WO | 1998047662 A1 | 10/1998 |
| WO | 9849723 A1 | 11/1998 |
| WO | 2000002707 A1 | 1/2000 |
| WO | 2000002708 A1 | 1/2000 |
| WO | 01/64396 A1 | 9/2001 |
| WO | 02/24415 A1 | 3/2002 |
| WO | 9956914 A1 | 5/2002 |
| WO | 2002043921 A1 | 6/2002 |
| WO | 2002070200 A1 | 9/2002 |
| WO | 03089702 A1 | 10/2003 |
| WO | 03103959 A1 | 12/2003 |
| WO | 2003099518 A1 | 12/2003 |
| WO | 2004037490 A1 | 5/2004 |
| WO | 2005000526 A1 | 1/2005 |
| WO | 2005100497 A1 | 10/2005 |
| WO | 2007001699 A1 | 1/2007 |

(56) References Cited

FOREIGN PATENT DOCUMENTS

| | | |
|---|---|---|
| WO | 2007024464 A1 | 3/2007 |
| WO | 2007055678 A2 | 5/2007 |
| WO | 2007055901 A1 | 5/2007 |
| WO | 2008123085 A1 | 10/2008 |
| WO | 2009026776 A1 | 3/2009 |
| WO | 2009158665 A1 | 12/2009 |
| WO | 2010016486 A1 | 2/2010 |
| WO | 2010123744 A2 | 10/2010 |
| WO | 20100116486 A1 | 10/2010 |
| WO | 2011/082155 A2 | 7/2011 |
| WO | 2011082155 A2 | 7/2011 |
| WO | 2011088057 A1 | 7/2011 |
| WO | 2012173885 A2 | 12/2012 |
| WO | 2013128452 | 9/2013 |
| WO | 2013162856 A1 | 10/2013 |
| WO | 2014/095200 A1 | 6/2014 |
| WO | 2014141276 A2 | 9/2014 |
| WO | 2015/040433 A2 | 3/2015 |
| WO | 2015/055550 A1 | 4/2015 |
| WO | 2015111366 A1 | 7/2015 |
| WO | 2015118552 A1 | 8/2015 |
| WO | 2015120430 A1 | 8/2015 |
| WO | 20150161210 A1 | 10/2015 |
| WO | 2016057075 A1 | 4/2016 |
| WO | 2016060712 A1 | 4/2016 |
| WO | 2016061544 A1 | 4/2016 |
| WO | 2017066077 A1 | 4/2017 |

OTHER PUBLICATIONS

Chinese Office Action dated Jul. 30, 2018, for Chinese Application/Patent No. 201580069624.1.
The Dow Chemical Company—"Specialty Elastomers for Automotive TPO Compounds" brochure, Nov. 2006, 8 pages.
The Dow Chemical Company—"Dow VLDPE DFDB-1085 NT, Very Low Density Polyethylene Resin" Technical Data, UL Prospector, Oct. 2003, 2 pages.
Lubrizol Advanced Materials, Inc.—"Lubrizol Engineered Polymers, Estane 58144 TPU" Technical Data, Feb. 2014, 2 pages.
Sekisui Voltek, LLC—"Volara Type EO" Technical Data, Jan. 2010, 2 pages.
Rogers Corporation, High Performance Foams Division, Poron Microcellular Urethanes—Product Availability Booklet, May 1, 2015, 11 pages.
EP Search Report and Written Opinion dated Jun. 20, 2018 for Application No. EP 15 85 0997.
PCT Notification of Transmittal of the International Search Report and the Written Opinion of the International Searching Authority for International Application No. PCT/US2015/027537 dated Jul. 29, 2015; 11 total pages.
PCT Notification of Transmittal of the International Search Report and the Written Opinion of the International Searching Authority for International Application No. PCT/US2015/027473 dated Jul. 29, 2015; 10 total pages.
Wikipedia [online]; 3D Printing; 2013; 17 total pages.
PCT Notification of Transmittal of the International Search Report and the Written Opinion of the International Searching Authority for International Application No. PCT/US2013/035513 dated Jun. 25, 2013; 12 total pages.
3D Printing: The Next Industrial Revolution: Christopher Barnatt Publisher: CreateSpace Independent Publishing Platform (May 4, 2013) ISBN-10: 148418176X ISBN-13: 978-1484181768.
C. Wong. "Damping Associated with Incipient Melting in Aluminum-Indium Alloys", David Taylor Research Center—SME 89-99. Jan. 1990.
Tammy Hickey et al. "Internal Friction and Modules Studies on Austempered Ductile Iron", Technical Report ARCCB-TR-98001. Jan. 1996. 24 pages.
Rodel. Rodel IC1000 CMP Pad. 1999. 2 pages.
Byoung-Ho Kwon et al. "Dishing and Ersosion in STI CMP". System IC R&D Center, Hyundai Electronics Industries Co. Ltd. 1999 IEEE. 3 pages.
S. Raghavan et al. "Chemical Mechanical Planariarization in Integrated Circuit Device Manufacturing". vol. 98-7. 1998. 19 pages.
Rajeev Bajaj et al. "Effect of Polishing Pad Material Properties on Chemical Mechanical Polishing (CMP) Processes". 1994. 8 pages.
Rodel. Rodel IC1010. 1998. 2 pages.
Peter Freeman et al. "A Study of the Variation of Physical Properties in Random Lots of Urethane Polishing Pads for CMP". A RODEL Publication. vol. 2, Issue 6. Jun. 1996. 8 Pages.
John J. Aklonis et al. "Introduction to Polymer Viscoelasticity". Second Edition. 1983. 6 pages.
Weidan Li et al. "The Effect of the Polishing Pad Treatments on the Chemical-Mechanical Polishing of SiO2 Films", Thin Solid Films 270 (1995). 6 pages.
International Search Report dated Jan. 28, 2016 for Application No. PCT/US2015/056254.
Antje M.J. Van Den Berg et al., "Inkjet Printing of Polyurethane Colloidal Suspensions", www.rsc.org/softmatter. Jul. 13, 2006.
Yu-Lim Jun et al. "Slicing Bitmap Generation and Patterning Technique a SFF System Using UV-Resin", International Conference on Control, Automation and Systems 2007. 5 Pages.
H. Yang. "High Viscosity Jetting System for 3D Reactive Inkjet Printing", Additive Manufacturing and 3D Printing Group, University of Nottingham. 9 pages.
I Hermant et al. "A Comparative Study of Polyurethane-Poly(Methyl Methacrylate) Interpenetrating and Semi-1 Interprenetrating Polymer Networks", vol. 20, No. 1. pp. 85-89, 1984.
Lee M. Cook. "CMP Consumables II: Pad" Chapter 6. Semiconductors and Semimetals, vol. 63. Published 1999. Chemical Mechanical Polishing in Silicon Processing. ISBN: 978-0-12-752172-5.
International Search Report dated Dec. 28, 2015 for application No. PCT/US2015/056077.
Chinese Supplemental Search Report dated Mar. 9, 2019, for Chinese Patent Application No. 201580069624.1.
Chinese Office Action dated Mar. 22, 2019, for Chinese Patent Application No. 201580069573.2.
Chinese Office Action dated Mar. 22, 2019, for Chinese Patent Application No. 201580069624.1.
EPO Extended European Search Report dated Mar. 19, 2019 for European Patent Application No. 16855985.4.
Andrews, Rodney J., et al.—"Glass Transition Temperatures of Polymers," Polymer Handbook, Fourth Edition, J. Brandrup et al., Editors, A Wiley Interscience Publication, John Wiley & Sons, Inc., 1999, VI / 193-198.
Crow—"Glass Transition Temperature," webpage, Polymer Properties Database, http://polymerdatabase.com/polymer%20physics/GlassTransition.html, 2015, printed Apr. 10, 2019, 2 pages.
Crow—"Glass Transition Temperatures," webpage, Polymer Properties Database, http://polymerdatabase.com/polymer%20physics/Polymer%20Tg%20C.html, 2015, printed Apr. 10, 2019, 6 pages.
Hupc—"Dipropylene Glycol Diacrylate (DPGDA)" webpage, CAS No. 57472-68-1_Radiation, http://www.union-pigment.com/china/radiation-curable-57472.html, printed Apr. 8, 2019, 2 pages.
Polysciences, Inc.—"Monomers Product Guide," 2012, 16 pages.
Whisnaut, David—"Polymer Chemistry: The Glass Transition" webpage, Engineering Libre Texts, https://eng.libretexts.org/Bookshelves/Materials_Schience?Supplemental_Modules_Materia . . . , printed Apr. 10, 2019, 2 pages.
Sigma-Aldrich—"Thermal Transitions of Homopolymers: Glass Transition & Melting Point" webpage, https://www.sigmaaldrich.com/technical-documents/articles/materials-science/polymer-scie . . . , printed Apr. 8, 2019, 3 pages.
Antje M.J. Van Den Berg, "Inkjet Printing of Polyurethane Colloidal Suspensions", www.rsc.org/softmatter. Jul. 13, 2006.
Peter Krober et al. "Reactive Inkjet Printing of Polyurethanes", www.rsc.org/materials. Journal of Materials Chemistry. Jan. 6, 2009.
Plastics in Action; 3-D Printing Speeds Prototype Development dated May/Jun. 1998; 2 total pages.
Taiwan Office Action dated Jul. 9, 2019, for Taiwan Patent Application No. 108102209.

(56) References Cited

OTHER PUBLICATIONS

Taiwan Office Action dated Jul. 4, 2019, for Taiwan Application/Patent No. 10413235.
Wikipedia—"Contact angle" webpage, https://en.wikipedia.org/wiki/Contact_angle, last edited Dec. 14, 2019, 9 pages.
Chinese Office Action dated Oct. 9, 2019, for Chinese Patent Application No. 201580069573.2.
Chinese Office Action dated Oct. 8, 2019, for Chinese Patent Application No. 201580069624.1.
Japanese Office Action dated Oct. 29, 2019, for Japanese Patent Application No. 2017-520508.
Japanese Decision to Grant a Patent dated Jan. 28, 2020, for Japanese Patent Application No. 2017-520496.
ASTM International—"Standard Terminology for Additive Manufacturing Technologies," ASTM Designation: F2792-12a, copyright dated Sep. 9, 2013, pp. 1-3.
Merriam-Webster Dictionary—"Droplet," https://www.merriam-webster.com/dictionary/droplet, accessed Feb. 24, 2020, 8 pages.
Shahrubudin, N., et al.—"An Overview on 3D Printing Technology: Technological, Materials, and Applications," 2nd International Conference on Sustainable Materials Processing and Manufacturing (SMPM 2019), Procedia Manufacturing, 35 (2019), published by Elsevier B.V., pp. 1286-1296.
Wikipedia—"Drop (liquid)," https://en.wikipedia.org/wiki/Drop_(liquid), last edited Feb. 12, 2020, accessed Feb. 24, 2020, 5 pages.
Chinese Office Action dated Jan. 22, 2020, for Chinese Patent Application No. 201580060603.3.
Japanese Decision to Grant dated Mar. 3, 2020, for Japanese Patent Application No. 2018-519328.
Chinese Office Action dated Mar. 13, 2020, for Chinese Patent Application No. 201580069624.1.
Chinese Office Action dated Oct. 18, 2019, for Chinese Patent Application No. 201680060117.6.
Taiwan Office Action dated Oct. 24, 2019, for Taiwan Patent Application No. 105132308.
Japanese Office Action dated Nov. 5, 2019, for Japanese Patent Application No. 2018-519328.
Moylan, John—"Considerations for Measuring Glass Transition Temperature," webpage on Element Materials Technology's website, https://www.element.com/nucleus/2017/08/15/18/45/considerations-for-measuring-glass-transition-temperature, Feb. 19, 2019, 8 pages.
ASTM International—"Standard Test Method for Assignment of the Glass Transition Temperature by Dynamic Mechanical Analysis," standard issued under Designation E1640, current edition approved Aug. 1, 2013, 6 pages.
Japanese Office Action dated Sep. 24, 2019, for Japanese Patent Application No. 2017-520496.
Office Action dated Apr. 22, 2020 and Search Report dated Apr. 14, 2020, for Chinese Patent Application No. 201680082260.5.
Japanese Office Action dated Jul. 14, 2020, for Japanese Patent Application No. 2019-081720.
Chinese Office Action dated Jul. 13, 2020, for Chinese Patent Application No. 201910516558.8.
Chinese Office Action dated Jul. 14, 2020, for Chinese Patent Application No. 201580060603.3.
European Office Action dated Aug. 20, 2020, for European Patent Application No. 20172985.2.
Taiwan Office Action dated Sep. 8, 2020, for Taiwan Patent Application No. 109112154.
Chinese Office Action dated Sep. 2, 2020, for Chinese Patent Application No. 201910555566.5.
Taiwan Office Action dated Dec. 7, 2020, for Taiwan Patent Application No. 109103156.

* cited by examiner

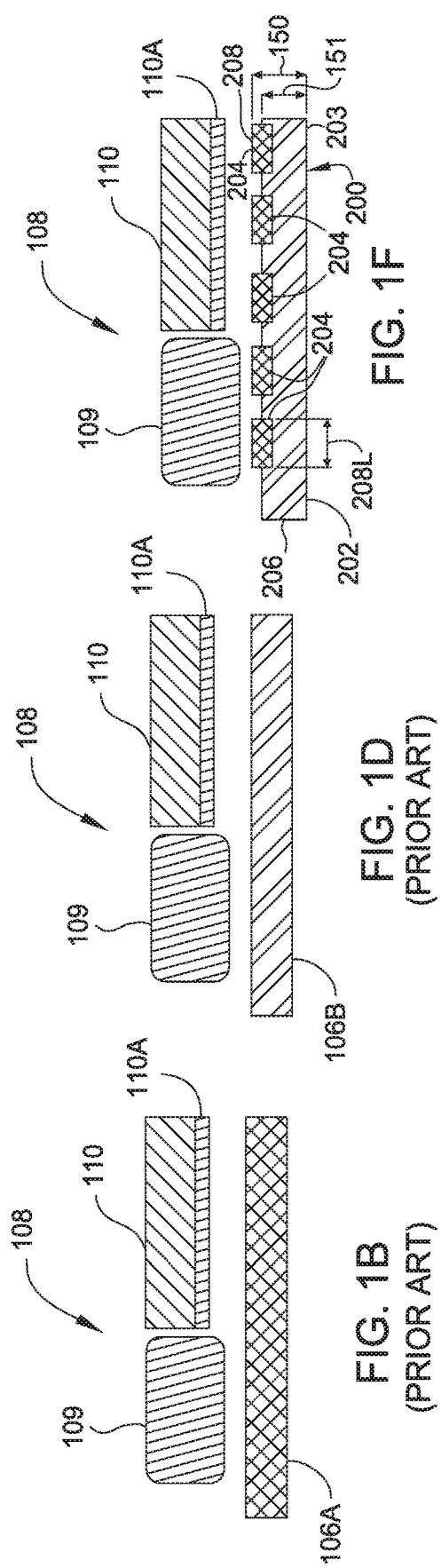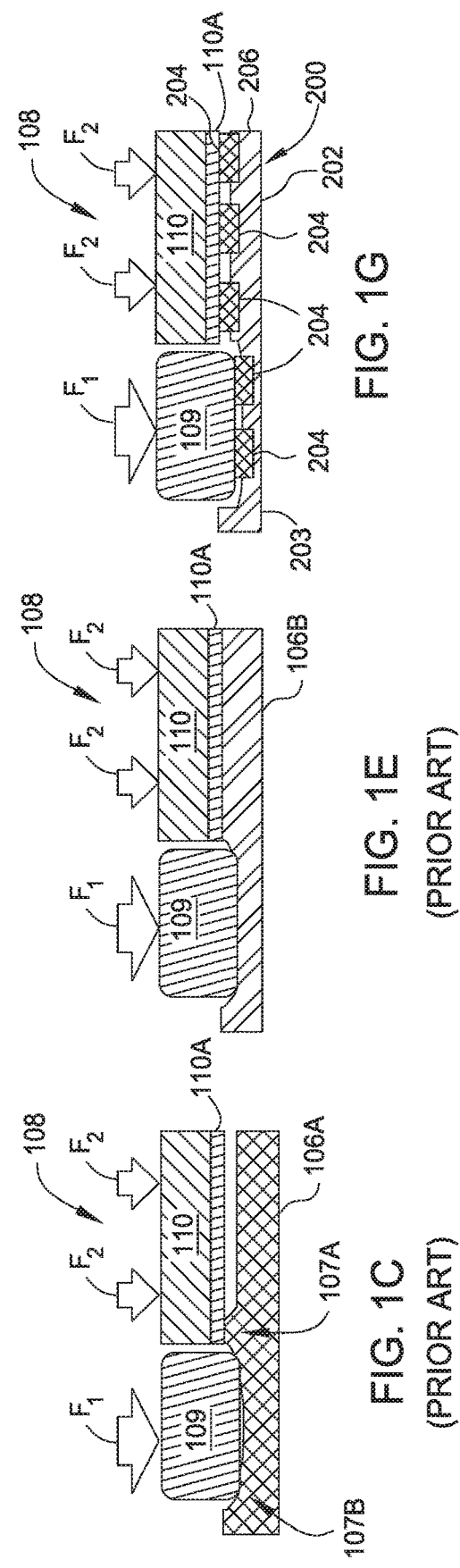

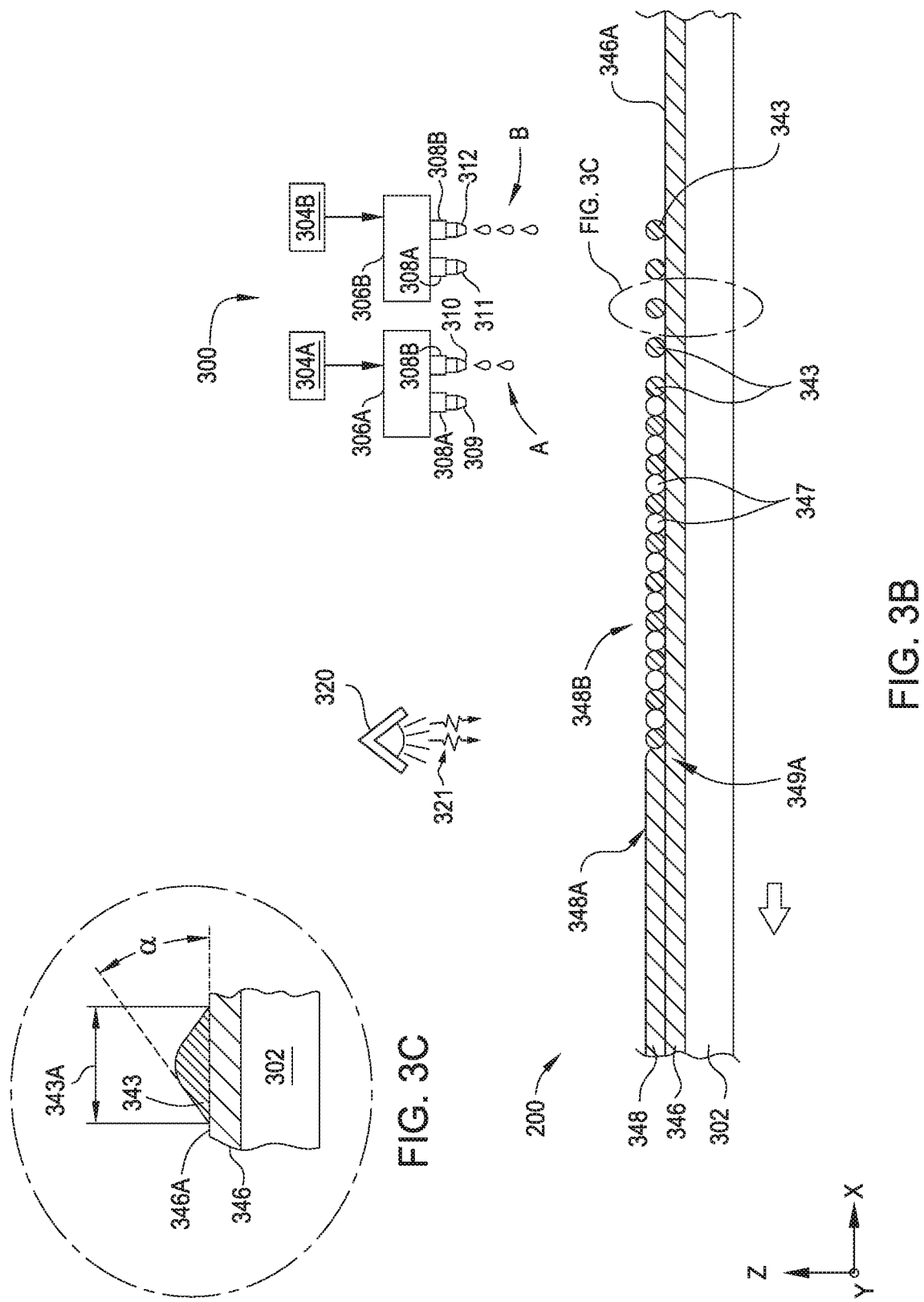

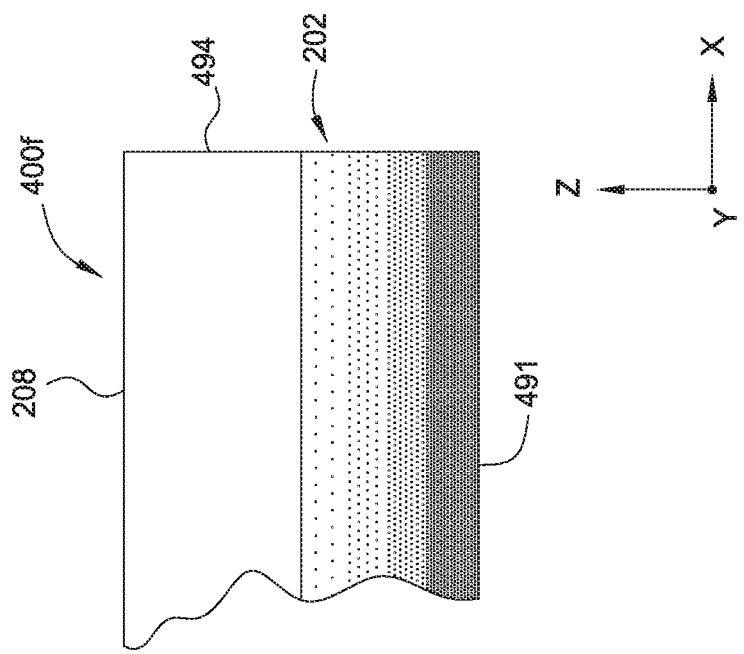
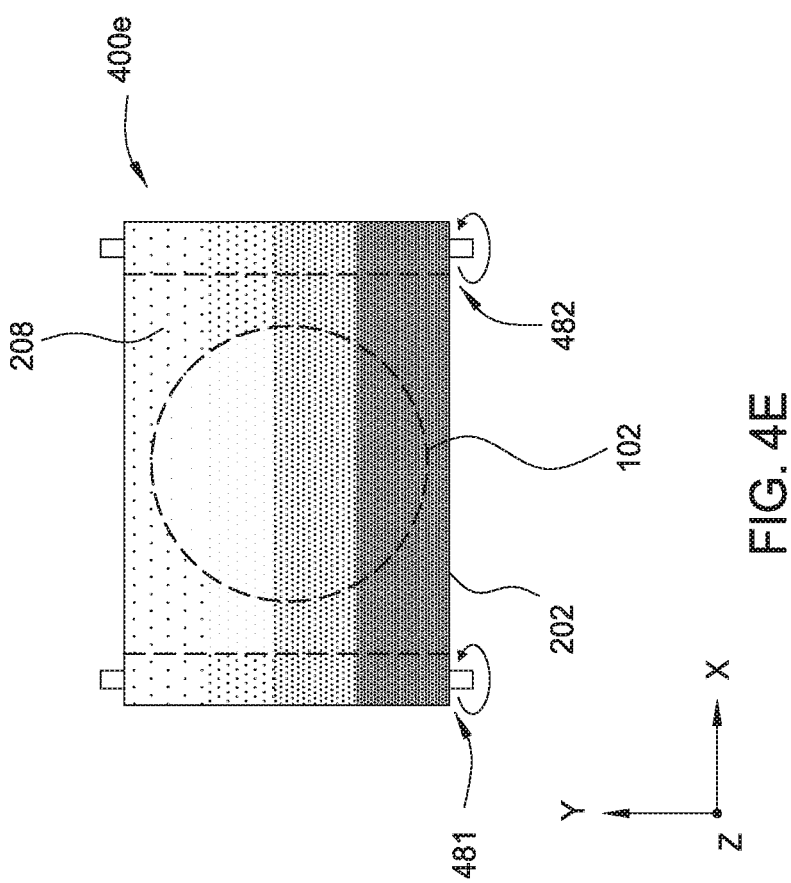
FIG. 4F
FIG. 4E

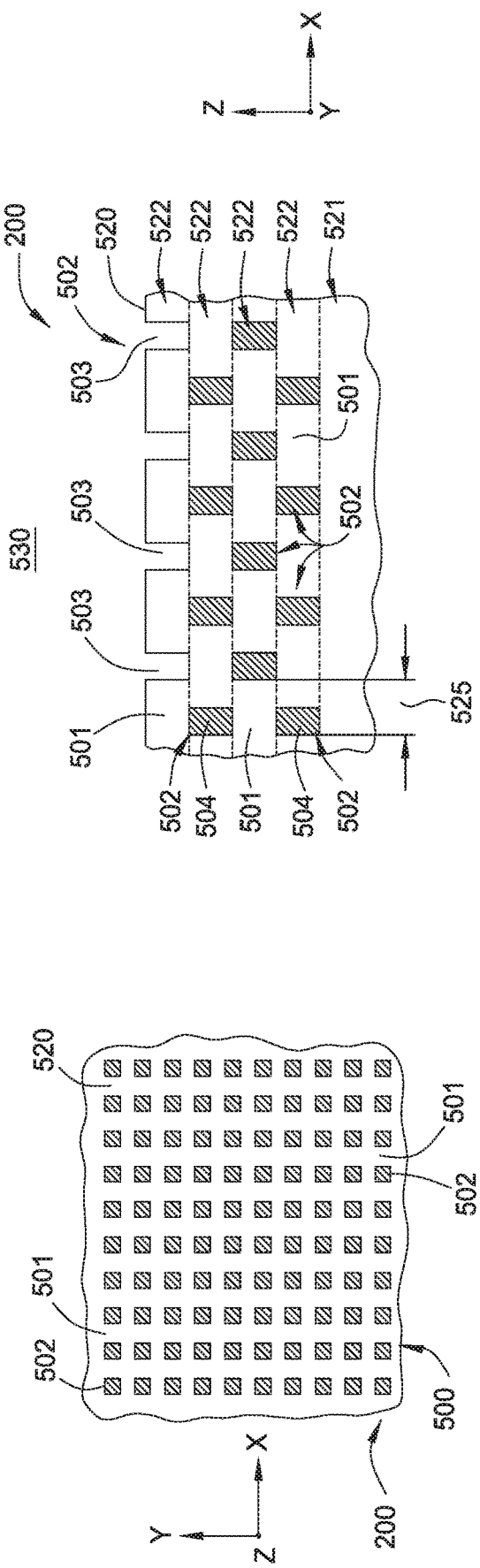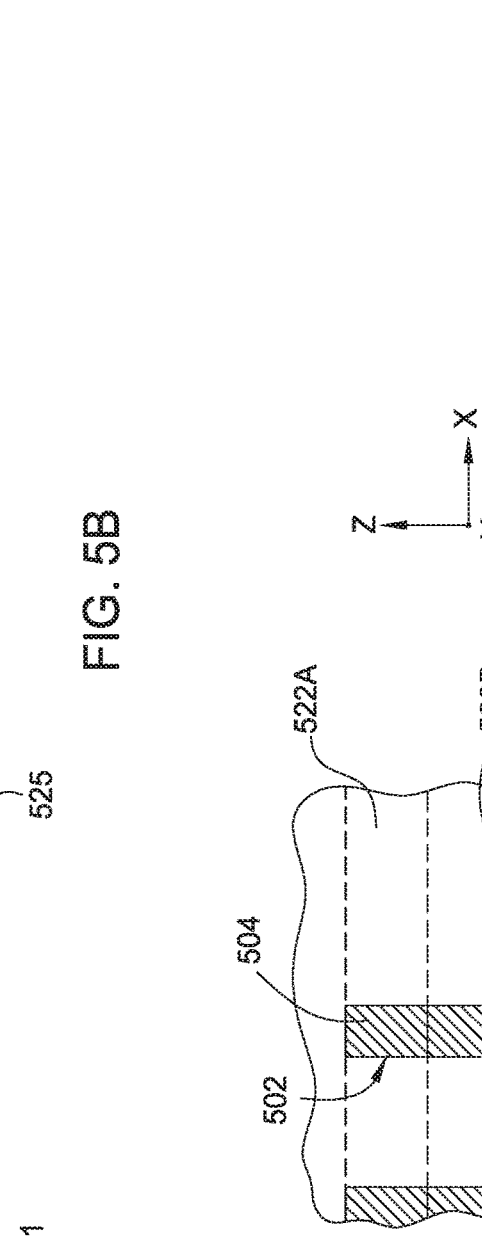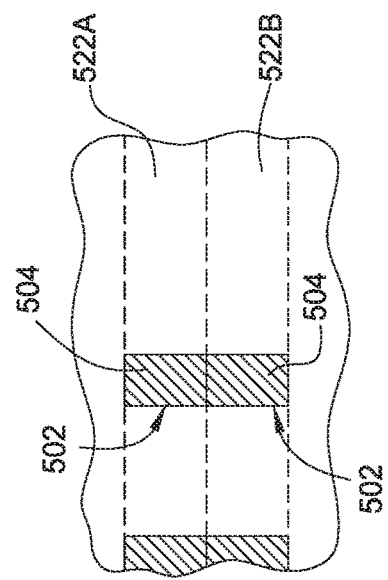
FIG. 5B
FIG. 5C
FIG. 5A

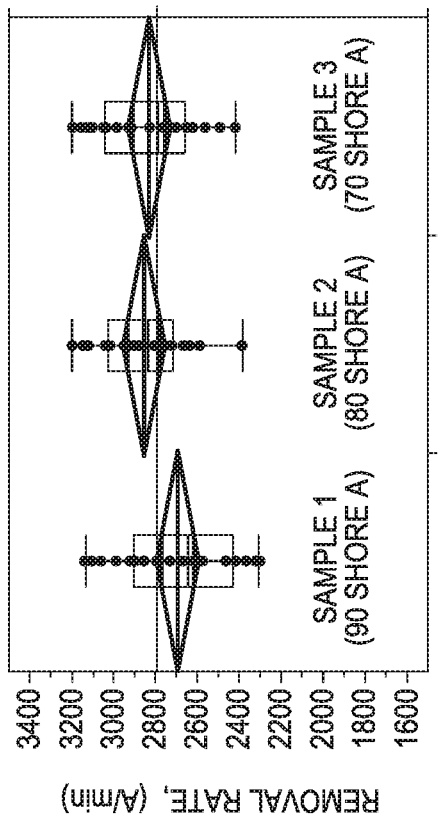
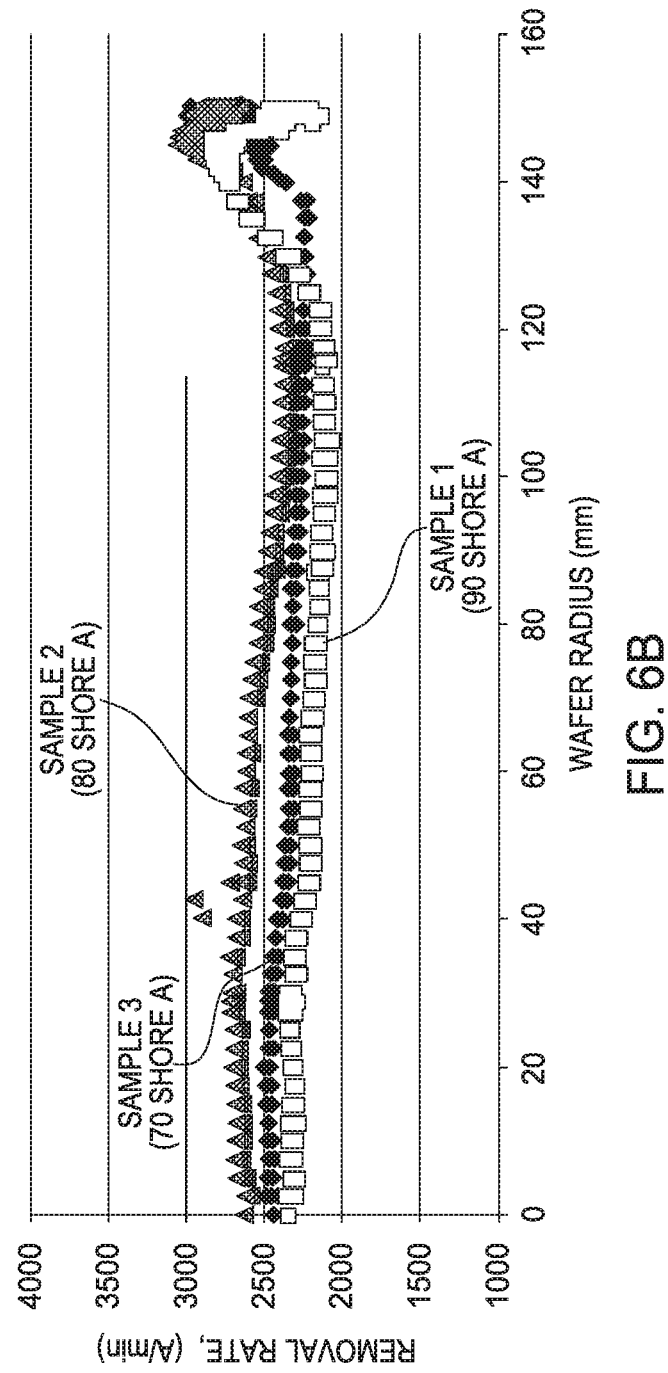
FIG. 6A
FIG. 6B

APPARATUS AND METHOD OF FORMING A POLISHING PADS BY USE OF AN ADDITIVE MANUFACTURING PROCESS

CROSS-REFERENCE TO RELATED APPLICATIONS

This application is a continuation of U.S. patent application Ser. No. 15/296,015, filed Oct. 17, 2016, which is a continuation-in-part of U.S. patent application Ser. No. 15/002,384, filed Jan. 20, 2016, which is a continuation-in-part of U.S. patent application Ser. No. of 14/920,801, filed on Oct. 22, 2015, which is a continuation-in-part of U.S. patent application Ser. No. of 14/887,240, filed on Oct. 19, 2015, which is a continuation-in-part of U.S. patent application Ser. No. 14/885,950, filed on Oct. 16, 2015, which are all incorporated herein by reference. The U.S. patent application Ser. No. 14/887,240 and U.S. patent application Ser. No. 14/885,950 both claim priority to United States Provisional Patent Application Ser. No. 62/065.193, filed on Oct. 17, 2014 and United States Provisional Patent Application Ser. No. 62/065,270, filed on Oct. 17, 2014, which are also all incorporated herein by reference. The U.S. patent application Ser. No. 15/296,015, also claimed the benefit of U.S. Provisional Patent Application Ser. No. 62/304,134, filed Mar. 4, 2016, the benefit of the United States Provisional Patent Application Ser. No. 62/323,599, filed Apr. 15, 2016, the benefit of the United States Provisional Patent Application Ser. No. 62/339,807, filed May 21, 2016, the benefit of the United States Provisional Patent Application Ser. No. 62/380,334, filed Aug. 26, 2016, the benefit of the United States Provisional Patent Application Ser. No. 62/280,537, filed Jan. 19, 2016, the benefit of the United States Provisional Patent Application Ser. No. 62/331,234, filed May 3, 2016, and the benefit of the United States Provisional Patent Application Ser. No. 62/380,015, filed Aug. 26, 2016, which are also all incorporated herein by reference.

BACKGROUND

Field

Embodiments disclosed herein generally relate to polishing articles and methods for manufacturing polishing articles used in polishing processes. More specifically, embodiments disclosed herein relate to polishing pads produced by processes that yield improved polishing pad properties and performance, including tunable performance.

Description of the Related Art

Chemical mechanical polishing (CMP) is a conventional process that has been used in many different industries to planarize surfaces of substrates. In the semiconductor industry, uniformity of polishing and planarization has become increasingly important as device feature sizes continue to decrease. During a CMP process, a substrate, such as a silicon wafer, is mounted on a carrier head with the device surface placed against a rotating polishing pad. The carrier head provides a controllable load on the substrate to push the device surface against the polishing pad. A polishing liquid, such as slurry with abrasive particles, is typically supplied to the surface of the moving polishing pad and polishing head. The polishing pad and polishing head apply mechanical energy to the substrate, while the pad also helps to control the transport of slurry which interacts with the substrate during the polishing process. Because polishing pads are typically made from viscoelastic polymeric materials, the mechanical properties of a polishing pad (e.g., elasticity, rebound, hardness, and stiffness), and the CMP processing conditions have a significant impact on the CMP polishing performance on both an IC die level (microscopic/nanoscopic) and wafer or global level (macroscopic). For example, CMP process forces and conditions, such as pad compression, pad rebound, friction, and changes in temperature during processing, and abrasive aqueous slurry chemistries will impact polishing pad properties and thus CMP performance.

Chemical mechanical polishing processes performed in a polishing system will typically include multiple polishing pads that perform different parts of the full polishing process. The polishing system typically includes a first polishing pad that is disposed on a first platen, which produces a first material removal rate and a first surface finish and a first flatness on the surface of the substrate. The first polishing step is typically known as a rough polish step, and is generally performed at a high polishing rate. The system will also typically include at least one additional polishing pad that is disposed on at least an additional platen, which produces a second material removal rate and a second surface finish and flatness on the surface of the substrate. The second polishing step is typically known as a fine polish step, which is generally performed at a slower rate than the rough polishing step. In some configurations, the system may also include a third polishing pad that is disposed on a third platen, which produces a third removal rate and a third surface finish and flatness on the surface of the substrate. The third polishing step is typically known as a material clearing or buffing step. The multiple pad polishing process can be used in a multi-step process in which the pads have different polishing characteristics and the substrates are subjected to progressively finer polishing or the polishing characteristics are adjusted to compensate for different layers that are encountered during polishing, for example, metal lines underlying an oxide surface.

During each of the CMP processing steps, a polishing pad is exposed to compression and rebound cycles, heating and cooling cycles, and abrasive slurry chemistries. Eventually the polishing pad becomes worn or "glazed" after polishing a certain number of substrates, and then needs to be replaced or reconditioned.

A conventional polishing pad is typically made by molding, casting or sintering polymeric materials that include polyurethane materials. In the case of molding, polishing pads can be made one at a time, e.g., by injection molding. In the case of casting, the liquid precursor is cast and cured into a cake, which is subsequently sliced into individual pad pieces. These pad pieces can then be machined to a final thickness. Pad surface features, including grooves which aid in slurry transport, can be machined into the polishing surface, or be formed as part of the injection molding process. These methods of manufacturing polishing pads are expensive and time consuming, and often yield non-uniform polishing results due to the difficulties in the production and control of the pad surface feature dimensions. Non-uniformity has become increasingly important as the dimensions of IC dies and features continue to shrink.

Current pad materials and methods to produce them limit the manipulation and fine control bulk pad properties such as storage modulus (E') and loss modulus (E"), which play critical roles in pad performance. Therefore, uniform CMP requires a pad material and surface features, such as grooves and channels, with a predictable and finely controlled balance of storage modulus E' and loss modulus E", that are further maintained over a CMP processing temperature range, from, for example, about 30° C. to about 90° C. Unfortunately, conventional pad production via traditional bulk polymerization and casting and molding techniques only provide a modicum of pad property (e.g., modulus) control, because the pad is a random mixture of phase separated macromolecular domains that are subject to intramolecular repulsive and attractive forces and variable polymer chain entanglement. For example, the presence of phase separated micro and macroscopic structural domains in the bulk pad may yield an additive combination of non-linear material responses, such as a hysteresis in the storage modulus E' over multiple heating and cooling cycles that typically occur during the CMP processing of batches of substrates, which may result polishing non-uniformities and unpredictable performance across the batch of substrates.

Because of the drawbacks associated with conventional polishing pads and their methods of manufacture, there is a need for new polishing pad materials and new methods of manufacturing polishing pads that provide control of pad feature geometry, and fine control of the pad's material, chemical and physical properties. Such improvements are expected to yield improved polishing uniformity at both a microscopic level and macroscopic level, such as over the entire substrate.

SUMMARY

Embodiments of the disclosure may provide a polishing article, comprising a first polishing element that comprises a plurality of sequentially formed layers. The sequentially formed layers may include a first layer that includes a first pattern of porosity-forming agent containing regions that are disposed on a surface on which the first layer is formed, and a first structural material containing region, wherein the first structural material containing region is disposed on the surface and between adjacently positioned porosity-forming agent containing regions of the first pattern. The sequentially formed layers may also include a second layer that is disposed on a surface of the first layer, wherein the second layer includes a second pattern of porosity-forming agent containing regions that are disposed on the surface of the first layer, and a second structural material containing region, wherein the second structural material containing region is disposed on the surface of the first layer and between adjacently positioned porosity-forming agent containing regions of the second pattern. The first pattern and the second pattern of porosity-forming agent containing regions may each further comprise a porosity-forming agent material that degrades when exposed to an aqueous solution, and the porosity-forming agent material may further comprises an acrylate.

Embodiments of the disclosure may further provide a method of forming a polishing article, comprising sequentially forming a plurality of polymer layers. The method may include forming a first layer of a plurality of first polishing elements of the polishing article, wherein forming the first layer comprises forming a first pattern of porosity-forming agent containing regions on a surface on which the first layer is formed, and forming a first structural material containing region, wherein the first structural material containing region is disposed on the surface and between adjacently positioned porosity-forming agent containing regions of the first pattern. Then forming a second layer of the plurality of first polishing elements, wherein forming the second layer is disposed on a surface of the first layer and comprises forming a second pattern of porosity-forming agent containing regions on the surface of the first layer, and forming a second structural material containing region, wherein the second structural material containing region is disposed on the surface of the first layer and between adjacently positioned porosity-forming agent containing regions of the second pattern.

Embodiments of the disclosure may provide a polishing pad having a polishing surface that is configured to polish a surface of a substrate, comprising a plurality of first polishing elements that each comprise a plurality of first polymer layers, wherein at least one of the plurality of first polymer layers forms the polishing surface, and one or more second polishing elements that each comprise a plurality of second polymer layers, wherein at least a region of each of the one or more second polishing elements is disposed between at least one of the plurality of first polishing elements and a supporting surface of the polishing pad. In some configurations, the plurality of first polymer layers comprise a first polymer composition and the plurality of second polymer layers comprise a second polymer composition. The first polymer composition may be formed from a first droplet composition and the second polymer composition may be formed from a second droplet composition. In some embodiments, the second droplet composition may comprise a greater amount of a resin precursor composition material than the first droplet composition, and the resin precursor composition material may have a glass transition temperature of less than or equal to about 40° C., such as less than or equal to 30° C. In some embodiments, the first droplet comprises a greater amount of oligomers and resin precursor composition materials than the second droplet composition, wherein the oligomers and resin precursor composition materials have a functionality greater than or equal to two. In some embodiments, the first droplet composition comprises oligomers and resin precursor composition materials that have a functionality greater than or equal to two and the second droplet composition comprises resin precursor composition materials that have a functionality less than or equal to two.

Embodiments of the disclosure may further provide a polishing pad having a polishing surface that is configured to polish a surface of a substrate, comprising a plurality of first polishing elements that each comprise a plurality of first polymer layers that comprise a first polymer material, wherein at least one of the plurality of first polymer layers forms the polishing surface, and a base region that is disposed between at least one of the plurality of first polishing elements and a supporting surface of the polishing pad, wherein the base region comprises a plurality of layers that each comprise a plurality of cured droplets of a first resin precursor composition material and a plurality of cured droplets of a second resin precursor composition material.

Embodiments of the disclosure may further provide a method of forming a polishing article, comprising forming a plurality of urethane acrylate polymer layers, wherein forming the plurality of urethane acrylate polymer layers comprises dispensing a plurality of droplets of a first precursor formulation in a first pattern across a surface of a polishing body that comprises a first material composition, wherein the first precursor formulation comprises a first multifunctional urethane acrylate oligomer, a first amount of a first multifunctional acrylate precursor and a first amount of a first curing agent, dispensing a plurality of droplets of a second precursor formulation in a second pattern across the surface of the polishing body, wherein the second precursor formulation comprises the first multifunctional urethane acrylate oligomer and/or the first multifunctional acrylate precursor, and exposing the dispensed droplets of the first precursor formulation and the dispensed droplets of the second precursor formulation to electromagnetic radiation for a first period of time to only partially cure the droplets of the first precursor formulation and the droplets of the second precursor formulation.

Embodiments of the disclosure may provide a polishing article having a polishing surface that is configured to polish a surface of a substrate, comprising a plurality of first polishing elements that each comprise a plurality of first polymer layers, wherein at least one of the plurality of first polymer layers forms the polishing surface, and one or more second polishing elements that each comprise a plurality of second polymer layers, wherein at least a region of each of the one or more second polishing elements is disposed between at least one of the plurality of first polishing elements and a supporting surface of the polishing article, wherein the plurality of first polymer layers comprise a first polymer composition and the plurality of second polymer layers comprise a second polymer composition, the plurality of first polishing elements each have an exposed portion and an unexposed portion, the unexposed portion of the first polishing elements is disposed within a portion of the one or more second polishing elements, the exposed portion has an exposed surface area that includes the polishing surface and an exposed surface area to volume ratio, and the exposed surface area to volume ratio is less about 20 $mm^{-1}$. In some configurations, the exposed surface area to volume ratio is less about 15 $mm^{-1}$, or less than about 10 $mm^{-1}$.

Embodiments of the disclosure may further provide a polishing article having a polishing surface that is configured to polish a surface of a substrate, comprising a plurality of first polishing elements that each comprise a plurality of first polymer layers, wherein at least one of the plurality of first polymer layers forms the polishing surface, and one or more second polishing elements that each comprise a plurality of second polymer layers, wherein at least a region of each of the one or more second polishing elements is disposed between at least one of the plurality of first polishing elements and a supporting surface of the polishing article, wherein the plurality of first polymer layers comprise a first polymer composition and the plurality of second polymer layers comprise a second polymer composition, and wherein the at least one first polymer layers at the polishing surface has a dynamic contact angle that is less than about 60°.

Embodiments of the disclosure may further provide a polishing article having a polishing surface that is configured to polish a surface of a substrate, comprising a plurality of first polishing elements that each comprise a plurality of first polymer layers, wherein at least one of the plurality of first polymer layers forms the polishing surface; and one or more second polishing elements that each comprise a plurality of second polymer layers, wherein at least a region of each of the one or more second polishing elements is disposed between at least one of the plurality of first polishing elements and a supporting surface of the polishing article, wherein the plurality of first polymer layers comprise a first polymer composition and the plurality of second polymer layers comprise a second polymer composition; and wherein the second polymer layers have a Shore A hardness of less than 90.

Embodiments of the disclosure may further provide a polishing article having a polishing surface that is configured to polish a surface of a substrate, comprising a plurality of first polishing elements that each comprise a plurality of first polymer layers, wherein at least one of the plurality of first polymer layers forms the polishing surface, and one or more second polishing elements that each comprise a plurality of second polymer layers, wherein at least a region of each of the one or more second polishing elements is disposed between at least one of the plurality of first polishing elements and a supporting surface of the polishing article, wherein the plurality of first polymer layers comprise a first polymer composition and the plurality of second polymer layers comprise a second polymer composition, and wherein a thermal diffusivity of the first polymer layers is less than about 6E-6 $m^2/s$.

Embodiments of the disclosure may further provide a polishing article having a polishing surface that is configured to polish a surface of a substrate, comprising a plurality of first polishing elements that each comprise a plurality of first polymer layers, wherein at least one of the plurality of first polymer layers forms the polishing surface, and one or more second polishing elements that each comprise a plurality of second polymer layers, wherein at least a region of each of the one or more second polishing elements is disposed between at least one of the plurality of first polishing elements and a supporting surface of the polishing article, wherein the plurality of first polymer layers comprise a first polymer composition and the plurality of second polymer layers comprise a second polymer composition; and wherein the one or more of the second polymer layers has a tan delta of at least 0.25 within a temperature range of 25° C. and 90° C.

Embodiments of the disclosure may further provide a method of forming a polishing article, comprising sequentially forming a plurality of polymer layers, wherein forming the plurality of polymer layers comprises: (a) dispensing an amount of a first addition polymer precursor formulation on a first region of a surface by use of an additive manufacturing process, wherein the first addition polymer precursor formulation comprises an amount of a first addition polymer precursor component and a second amount of a second addition polymer precursor component that has a viscosity that enables the first addition polymer precursor formulation to be dispensed using the additive manufacturing process; (b) dispensing an amount of a second addition polymer precursor formulation on a second region of the surface by use of the additive manufacturing process, wherein the second addition polymer precursor formulation comprises a third amount of a third addition polymer precursor component and a fourth amount of a fourth addition polymer precursor component that has a viscosity that enables the second addition polymer precursor formulation to be dispensed using the additive manufacturing process; (c) exposing the dispensed amount of the first addition polymer precursor formulation and the dispensed amount of the second addition polymer precursor formulation to electromagnetic radiation for a first period of time to only partially cure the first amount of the first addition polymer precursor formulation and the second amount of the second addition polymer precursor formulation; and (d) repeating (a)-(c) to form a plurality of first polishing elements, wherein the first polishing elements each have an exposed portion that has an exposed surface area that includes the polishing surface, and an exposed surface area to volume ratio that is less about 20 $mm^{-1}$.

Embodiments of the disclosure may further provide a method of forming a polishing article, comprising sequentially forming a plurality of polymer layers, wherein forming the plurality of polymer layers comprises: forming a plurality of first polishing elements, comprising: (a) dispensing a first amount of a first addition polymer precursor formulation on a first region of a surface by use of an additive manufacturing process, wherein the first addition polymer precursor formulation comprises an amount of a first addition polymer precursor component and a second amount of a second addition polymer precursor component that has a viscosity that enables the first addition polymer precursor formulation to be dispensed using the additive manufacturing process; (b) dispensing a second amount of a second addition polymer precursor formulation on a second region of the surface by use of the additive manufacturing process, wherein the second addition polymer precursor formulation comprises a third amount of a third addition polymer precursor component and a fourth amount of a fourth addition polymer precursor component that has a viscosity that enables the second addition polymer precursor formulation to be dispensed using the additive manufacturing process; (c) exposing the dispensed first amount of the first addition polymer precursor formulation and the dispensed second amount of the second addition polymer precursor formulation to electromagnetic radiation for a first period of time to only partially cure the first amount of the first addition polymer precursor formulation and the second amount of the second addition polymer precursor formulation; and (d) repeating (a)-(c); and forming a second polishing element, comprising: (e) dispensing a third amount of the first addition polymer precursor formulation on a third region of the surface by use of the additive manufacturing process; (f) dispensing a fourth amount of the second addition polymer precursor formulation on a fourth region of the surface by use of the additive manufacturing process; (g) exposing the dispensed third amount of the first addition polymer precursor formulation and the dispensed fourth amount of the second addition polymer precursor formulation to electromagnetic radiation for a second period of time to only partially cure the third amount of the first addition polymer precursor formulation and the fourth amount of the second addition polymer precursor formulation; and (h) repeating (e)-(g); and wherein the formed first polishing elements each have an exposed portion that has an exposed surface area that includes a polishing surface.

Embodiments of the disclosure may further provide a method of forming a polishing article, comprising dispensing a first droplet of a first liquid on a surface of a portion of a polishing body, wherein the surface comprises a first material formed by curing an amount of the first liquid, and exposing the dispensed first droplet of the first liquid to electromagnetic radiation for a first period of time to only partially cure the material within the first droplet, wherein exposing the dispensed first droplet of the first liquid occurs after a second period of time has elapsed, and the second time starts when the first droplet is disposed on the surface. The first droplet may comprises a urethane acrylate, a surface cure photoinitiator and a bulk cure photoinitiator, wherein the bulk cure photoinitiator comprises a material selected from a group consisting of benzoin ethers, benzyl ketals, acetyl phenones, alkyl phenones, and phosphine oxides, and the surface cure photoinitiator comprises a material selected from a group consisting of benzophenone compounds and thioxanthone compounds.

Embodiments of the disclosure may further provide a polishing pad having a polishing surface that is configured to polish a surface of a substrate, comprising a plurality of first polishing elements that are disposed in a pattern relative to the polishing surface, wherein each first polishing element comprises a plurality of first polymer layers that comprise a first polymer material, and at least one of the plurality of first polymer layers in each of the first polishing elements forms a portion of the polishing surface, and a base region that is disposed between each of the plurality of first polishing elements and a supporting surface of the polishing pad, and the base region comprises a second polymer material. The first polymer material may have a first $E'30/E'90$ ratio and the second polymer material may have a second $E'30/E'90$ ratio that is different from the first $E'30/E'90$ ratio. The base region may comprise a plurality of layers that each comprise a plurality of cured droplets of the first polymer material and a plurality of cured droplets of a second polymer material. Each of the first polymer layers of the first polymer material may comprise a plurality of cured droplets of a first droplet composition. In some configurations, the first polymer material has a first $E'30/E'90$ ratio that is greater than 6. The first polymer material in the polishing pad may have a first storage modulus and the second polymer material may have a second storage modulus, wherein the first storage modulus is greater than the second storage modulus, and the base region may further comprises a greater volume percent of the second polymer material versus the first polymer material. In some embodiments, the first polishing elements may further comprise a greater volume percent of the first polymer material versus the second polymer material.

Embodiments of the disclosure may further provide a method of forming a polishing article, comprising sequentially forming a plurality of polymer layers, wherein forming the plurality of polymer layers comprises forming a first layer of a plurality of first polishing elements of the polishing article, and forming the first layer may comprise forming a first pattern of first material containing regions on a surface on which the first layer is formed, and forming a second pattern of second material containing regions on the surface on which the first layer is formed, wherein the first layer comprises a first ratio of the first material containing regions to the second material containing regions. Then forming a second layer of the plurality of first polishing elements, wherein the formed second layer is disposed on a surface of the first layer and comprises forming a third pattern of first material containing regions on the surface of the first layer, and forming a fourth pattern of second material containing regions on the surface of the first layer, wherein second layer comprises a second ratio of the first material containing regions to the second material containing regions, and the first ratio is different from the second ratio.

Embodiments of the disclosure may further provide a polishing article having a polishing surface that is configured to polish a surface of a substrate during a polishing process. The polishing article may comprise an array of first polishing elements that are distributed in a first pattern, wherein each of the first polishing elements comprise a plurality of first polymer layers that are stacked in a first direction which is disposed at an angle to a first plane, a surface of at least one of the plurality of first polymer layers forms the polishing surface, each of the first polymer layers comprise a plurality of first material containing regions and a plurality of second material containing regions, and a ratio of the first material containing regions to the second material containing regions within at least a portion of each of the first polishing elements varies in a second direction that is parallel to the first plane. The polishing article may also comprise one or more second polishing elements that each comprise a plurality of second polymer layers, wherein each of the second polymer layers are stacked in the first direction and comprise a plurality of the first material containing regions.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 1B-1E are schematic sectional views of a portion of a polishing head and polishing pad configuration that are positioned in the polishing station illustrated in FIG. 1A.

FIGS. 1F-1G is a schematic sectional view of a portion of a polishing head and polishing pad configuration that are positioned in the polishing station illustrated in FIG. 1A, according to an embodiment of the present disclosure.

FIG. 3B is a schematic view of a portion of the system illustrated in FIG. 3A, according to an embodiment of the present disclosure.

FIG. 3C is a schematic view of a dispensed droplet disposed on a surface of a region of the advanced polishing pad illustrated in FIG. 3B, according to an embodiment of the present disclosure.

FIG. 4E is a schematic top view of a web or roll-to-roll type polishing pad, according to an embodiment of the present disclosure.

FIG. 4F is a schematic side cross-sectional view of a portion of a polishing pad, according to an embodiment of the present disclosure.

FIG. 5A is a top view of a pixel chart used to form an advanced polishing pad that may contain pores, according to at least one embodiment of the present disclosure.

FIG. 5B is a schematic side cross-sectional view of a portion of an advanced polishing pad, according to an embodiment of the present disclosure.

FIG. 5C is a schematic side cross-sectional view of a portion of an advanced polishing pad, according to an embodiment of the present disclosure.

FIG. 6A illustrates a plot of polished material removal rate versus material hardness for various pad materials used to form an advanced polishing pad, according to an embodiment of the present disclosure.

FIG. 6B illustrates a plot of polished material removal rate versus a radial position of a polished substrate, according to an embodiment of the present disclosure.

To facilitate understanding, common words have been used, where possible, to designate identical elements that are common to the figures. It is contemplated that elements disclosed in one embodiment may be beneficially utilized on other embodiments without specific recitation.

DETAILED DESCRIPTION

Figure 1A:
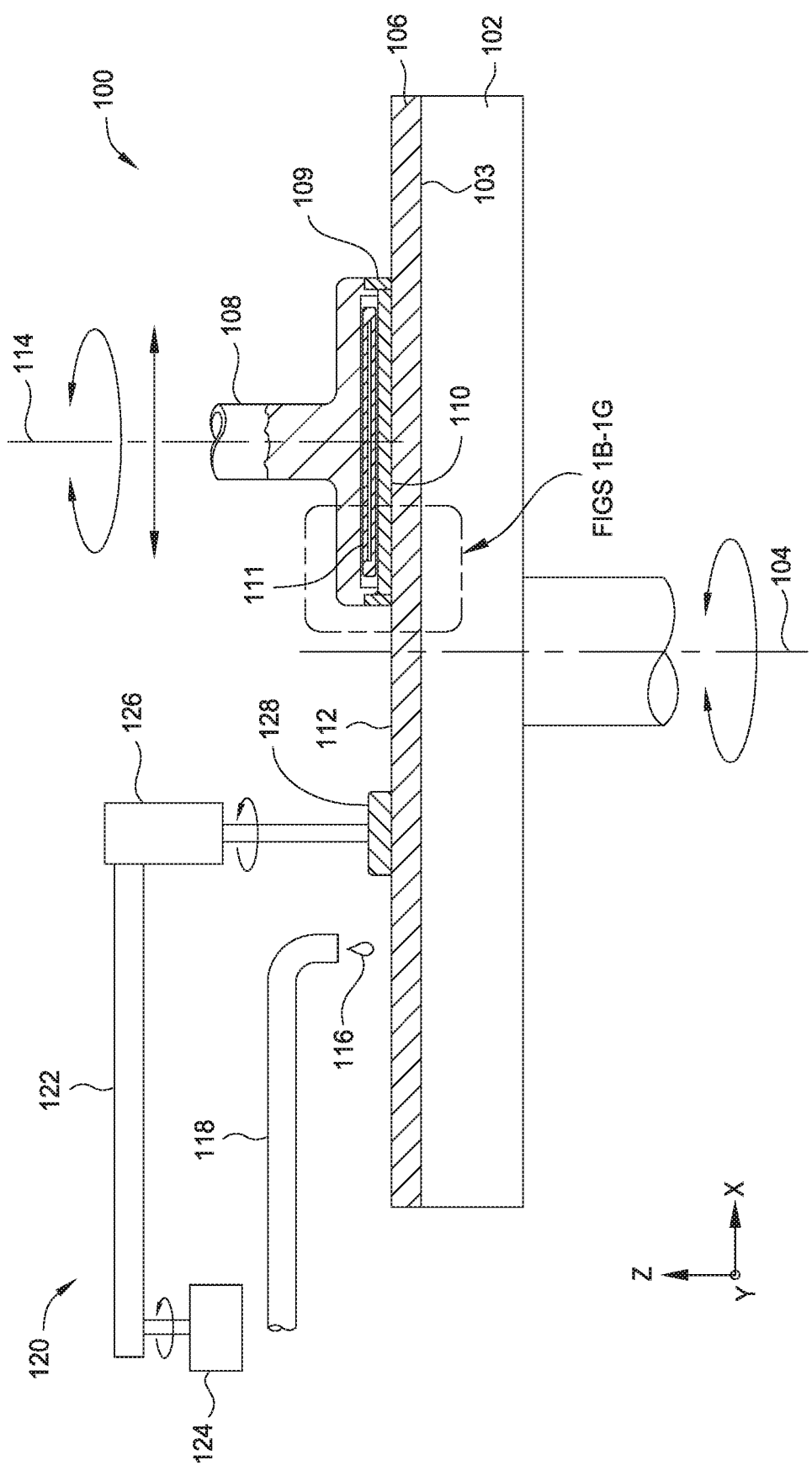
FIG. 1A is a schematic sectional view of a polishing station.

The present disclosure relates to advanced polishing articles, or advanced polishing pads, with tunable chemical, material and structural properties, and new methods of manufacturing the same. According to one or more embodiments of the disclosure, it has been discovered that a polishing pad with improved properties may be produced by an additive manufacturing process, such as a three-dimensional (3D) printing process. Embodiments of the present disclosure provide an advanced polishing pad that has discrete features and geometries, formed from at least two different materials that are formed from precursors, or resin precursor compositions, that contain "resin precursor components" that include, but are not restricted to functional polymers, functional oligomers, monomers, reactive diluents, flow additives, curing agents, photoinitiators, and cure synergists. The resin precursor components may also include chemically active materials and/or compounds such as functional polymers, functional oligomers, monomers, and reactive diluents that may be at least monofunctional, and may undergo polymerization when exposed to free radicals, Lewis acids, and/or electromagnetic radiation. As one example, an advanced polishing pad may be formed from a plurality of polymeric layers, by the automated sequential deposition of at least one resin precursor composition followed by at least one curing step, wherein each layer may represent at least one polymer composition, and/or regions of different compositions. In some embodiments, the layers and/or regions of the advanced polishing pad may include a composite material structure, such as a radiation cured polymer that contains at least one filler, such as metals, semimetal oxides, carbides, nitrides and/or polymer particles. In some embodiments, the fillers may be used to increase abrasion resistance, reduce friction, resist wear, enhance crosslinking and/or thermal conductivity of the entire pad, or certain regions of the pad. Therefore, the advanced polishing pad, including the pad body and discrete features produced over, upon, and within the pad body, may be formed simultaneously from a plurality of different materials and/or compositions of materials, thus enabling micron scale control of the pad architecture and properties.

Moreover, a polishing pad is provided that includes desirable pad polishing properties over the complete polishing process range. Typical polishing pad properties include both static and dynamic properties of the polishing pad, which are affected by the individual materials within the polishing pad and the composite properties of the complete polishing pad structure. An advanced polishing pad may include regions that contain a plurality of discrete materials and/or regions that contain gradients in material composition in one or more directions within the formed polishing pad. Examples of some of the mechanical properties that can be adjusted to form an advance polishing pad that has desirable polishing performance over the polishing process range include, but are not limited to storage modulus E', loss modulus E", hardness, yield strength, ultimate tensile strength, elongation, thermal conductivity, zeta potential, mass density, surface tension, Poison's ratio, fracture toughness, surface roughness ($R_a$) and other related properties. Examples of some of the dynamic properties that can be adjusted within an advanced polishing pad may include, but are not limited to tan delta (tan δ), storage modulus ratio (or E'30/E'90 ratio) and other related parameters, such as the energy loss factor (KEL). The energy loss factor (KEL) is related to the elastic rebound and dampening effect of a pad material. KEL may be defined by the following equation: KEL=tan δ*$10^{12}$/[E'*(1+(tan δ)$^2$)], where E' is in Pascals. The KEL is typically measured using the method of Dynamic Mechanical Analysis (DMA) at a temperature of 40° C., and frequency of 1 or 1.6 hertz (Hz). Unless specified otherwise, the storage modulus E', the E'30/E'90 ratio and the percent recovery measurements provided herein were performed using a DMA testing process that was performed at a frequency of about 1 hertz (Hz) and a temperature ramp rate of about 5° C./min. By controlling one or more of the pad properties, an improved the polishing process performance, improved polishing pad lifetime and improved polishing process repeatability can be achieved. Examples of pad configurations that exhibit one or more these properties are discussed further below in conjunction with one or more the embodiments discussed herein.

As will be discussed more detail below, storage modulus E', is an important factor in assuring that the polishing results are uniform across a substrate, and thus is a useful metric for polishing pad performance. Storage modulus E' is typically calculated by dividing an applied tensile stress by the extensional strain in the elastic linear portion of the stress-strain curve (e.g., slope, or Δy/Δx). Similarly, the ratio of viscous stress to viscous strain is used to define the loss modulus E". It is noted that both storage modulus E' and loss modulus E" are intrinsic material properties, that result from the chemical bonding within a material, both intermolecular and intramolecular. Storage modulus may be measured at a desired temperature using a material testing technique, such as dynamic mechanical analysis (DMA) (e.g., ASTM D4065, D4440, and D5279). When comparing properties of different materials it is typical to measure the storage modulus E' of the material at a single temperature, in a range between 25° C. and 40° C., such as 40° C.

Another relevant metric in polishing pad performance and uniformity is the measure of the dampening ability of a material, such as the compression and rebound dampening properties of a polishing pad. A common way to measure dampening is to calculate the tan delta (tan δ) of a material at a desired temperature, where tan δ=loss modulus/storage modulus=E"/E'. When comparing properties of different materials it is typical to compare the tan δ measurements for materials at a single temperature, such as 40° C. Unless specified otherwise, the tan δ measurements provided herein were performed using a DMA testing process that was performed at a frequency of 1 hertz (Hz) and a temperature ramp rate of about 5° C./min. Tan δ is generally a measure of how "viscous" chemical structures in a material respond (e.g., bond rotation, polymer chain slippage and movement) to an applied cyclic strain in comparison to spring-like elastic chemical structures in the material, such as flexible and coiled aliphatic polymer chains that revert to a preferred low energy conformation and structure when a force is released. For example, the less elastic a material is, when a cyclic load is applied, the response of the viscous molecular segments of the material will lag behind the elastic molecular segments of the material (phase shift) and heat is generated. The heat generated in a polishing pad during processing of substrates may have an effect on the polishing process results (e.g., polishing uniformity), and thus should be controlled and/or compensated for by judicious choice of pad materials.

The hardness of the materials in a polishing pad plays a role in the polishing uniformity results found on a substrate after polishing and the rate of material removal. Hardness of a material, also often measured using a Rockwell, Ball or Shore hardness scale, measures a materials resistance toward indentation and provides an empirical hardness value, and may track or increase with increasing storage modulus E'. Pad materials are typically measured using a Shore hardness scale, which is typically measured using the ASTM D2240 technique. Typically, pad material hardness properties are measured on either a Shore A or Shore D scale, which is commonly used for softer or low storage modulus E' polymeric materials, such as polyolefins. Rockwell hardness (e.g., ASTM D785) testing may also be used to test the hardness of "hard" rigid engineering polymeric materials, such as a thermoplastic and thermoset materials.

Polishing Pad Apparatus and Polishing Methods

FIG. 1A is a schematic sectional view of a polishing station 100 that may be positioned within a larger chemical mechanical polishing (CMP) system that contains multiple polishing stations 100. The polishing station 100 includes a platen 102. The platen 102 may rotate about a central axis 104. A polishing pad 106 may be placed on the platen 102. Typically, the polishing pad 106 covers an upper surface of the platen 102 which is at least one to two times larger than the size of the substrate 110 (e.g., substrate diameter) that is to be processed in the polishing station 100. In one example, the polishing pad 106 and platen 102 are between about 6 inches (150 mm) and about 40 inches (1,016 mm) in diameter. The polishing pad 106 includes a polishing surface 112 configured to contact and process one or more substrates 110 and a supporting surface 103 that is positioned over a surface of the platen 102. The platen 102 supports the polishing pad 106 and rotates the polishing pad 106 during polishing. A carrier head 108 holds a substrate 110 against the polishing surface 112 of the polishing pad 106. The carrier head 108 typically includes a flexible diaphragm 111 that is used to urge the substrate 110 against the polishing pad 106 and a retaining ring 109 that is used to correct for an inherently non-uniform pressure distribution found across the substrate's surface during the polishing process. The carrier head 108 may rotate about a central axis 114 and/or move in a sweeping motion to generate relative motions between the substrate 110 and the polishing pad 106.

A delivery arm 118 delivers a polishing fluid 116, such as an abrasive slurry, is supplied to the polishing surface 112 during polishing. The polishing fluid 116 may contain abrasive particles, a pH adjuster and/or chemically active components to enable chemical mechanical polishing of the substrate. The slurry chemistry of the polishing fluid 116 is designed to polish wafer surfaces and/or features that may include metals, metal oxides, and semimetal oxides. The polishing station 100 also typically includes a pad conditioning assembly 120 that includes a conditioning arm 122 and actuators 124 and 126 that are configured to cause a pad conditioning disk 128 (e.g., diamond impregnated disk) to be urged against and sweep across the polishing surface 112 at different times during the polishing process cycle to abrade and rejuvenate the surface 112 of the polishing pad 106.

Figure 10:
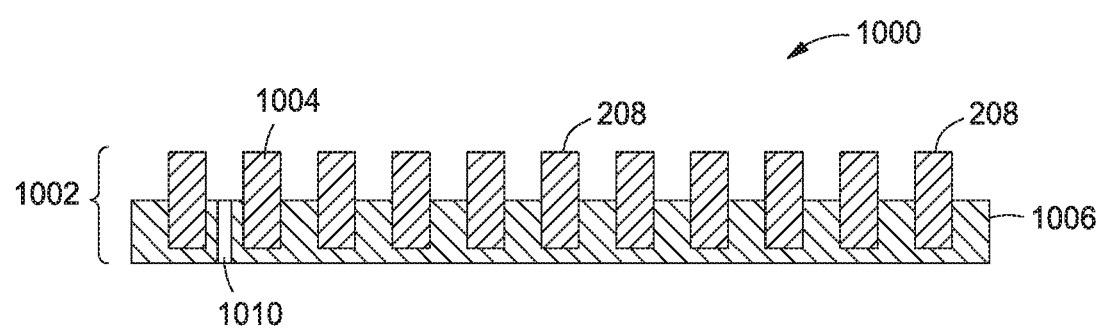
FIG. 10 is a schematic side cross-sectional view of a polishing pad having a transparent region formed therein, according to an embodiment of the present disclosure.

FIGS. 1B-1C are schematic sectional views of a portion of the carrier head 108 and a conventional "hard" or high storage modulus E' modulus polishing pad 106A that are positioned in the polishing station 100. FIGS. 1D-1E are schematic sectional views of a portion of the carrier head 108 and a conventional soft or low storage modulus E' polishing pad 106B that are positioned in the polishing station 100. FIGS. 1F-1G are schematic sectional views of a portion of the carrier head 108 and one embodiment of an advanced polishing pad 200, which is described further below, that are positioned in the polishing station 100. For clarity, the flexible diaphragm 111 and upper part of the carrier head 108 have been left out of FIGS. 1B-1G. During operation the flexible diaphragm 111 (FIG. 1A) is positioned to urge the substrate 110 against the polishing pad 106A, 106B or an advanced polishing pad 200, and a carrier head actuator (not shown) that is coupled to a mounting portion (not shown) of the carrier head 108 is configured to separately urge the carrier head 108 and the retaining ring 109 against the surface of the polishing pad 106A, 106B or advanced polishing pad 200. As shown in FIGS. 10, 1E and 1F, the flexible diaphragm 111 is configured to apply a pressure to the backside of the substrate 110, which is illustrated by the applied force $F_2$, and the carrier head actuator is configured to apply a force $F_1$ to the retaining ring 109.

FIG. 1B illustrates a portion of an edge of a substrate 110 that is positioned within the carrier head 108 and over a portion of a conventional "hard" or high storage modulus E' polishing pad 106A before the polishing process is performed on the substrate 110. The substrate 110 includes a layer 110A that has one or more device features 110B (FIG. 1H) that are to be removed and/or planarized during the subsequent CMP process. FIG. 10 illustrates the substrate 110 during a polishing process using the conventional "hard" polishing pad 106A illustrated in FIG. 1B. It has been found that CMP processes that use "hard" polishing pads tend to have non-uniform planarization results due to edge effects found at the edge of substrate 110 that specifically relate to the need to apply a force $F_1$ to the retaining ring 109 to compensate for a larger inherent polishing non-uniformity found at the edge of the substrate 110 during a CMP process. In other words, the high storage modulus E', rigid or hard nature of the material used to form the "hard" polishing pad causes a pad rebound or ridge 107A to be formed when the force $F_1$ is applied by the retaining ring 109 to the "hard" polishing pad 106A. The formation of the ridge 107A is generally related to the deformation 107B of the "hard" polishing pad 106A due to the applied force $F_1$, which causes the edge of the substrate 110 to polish faster than the center of the substrate 110. The higher polishing rate at the edge of the substrate 110 leads to a "global" CMP planarization non-uniformity (e.g., across the substrate non-uniformity).

Figure 1J:
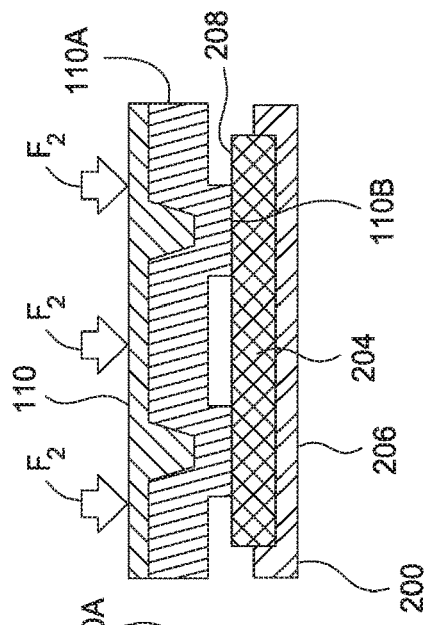
FIG. 1J is a schematic sectional view of a portion of a substrate that is being polished using the polishing station configuration illustrated in FIGS. 1F-1G, according to an embodiment of the present disclosure.
Figure 1I:
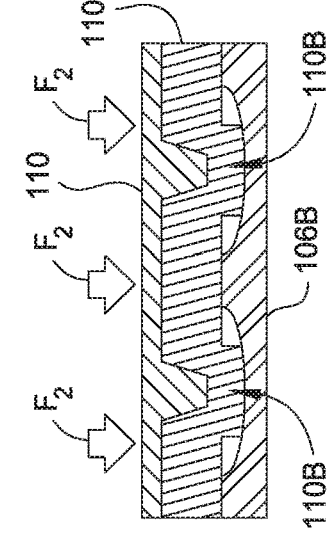
FIG. 1I is a schematic sectional view of a portion of a substrate that is being polished using the polishing station configuration illustrated in FIGS. 1D-1E.
Figure 1H:
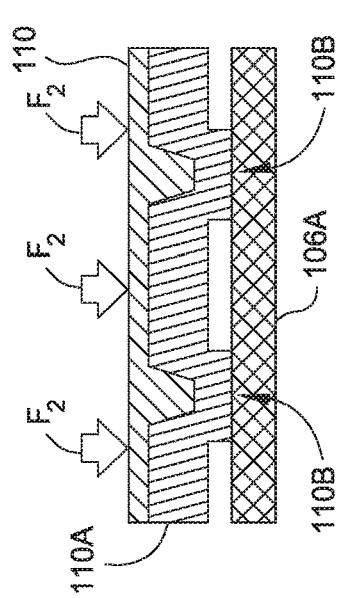
FIG. 1H is a schematic sectional view of a portion of a substrate that is being polished using the polishing station configuration illustrated in FIGS. 1B-1C.

FIG. 1H is a schematic sectional view of a portion of the substrate 110 that is being polished using the conventional "hard" polishing pad 106A. As shown, the substrate 110 includes a plurality of features 110B that are formed within the layer 110A, and are removed and/or planarized during the CMP process. In this example, the high storage modulus E', rigid and/or hard nature of the material used to form the "hard" polishing pad 106A will not allow it to significantly deform on a microscopic scale (e.g., 10 nm-1000 nm feature pitch) when the force $F_2$ is applied by the flexible diaphragm 111 to the substrate 110. In this case, the "hard" polishing pad 106A will generally deliver an acceptable amount of planarization and planarization efficiency on a microscopic scale, but achieve poor global planarization results for the reasons discussed above.

FIG. 1D illustrates a portion of an edge of a substrate 110 that is positioned within the carrier head 108 and over a portion of a conventional soft or low storage modulus E' polishing pad 106B before the polishing process is performed on the substrate 110. The substrate 110 includes a layer 110A that has one or more device features 1108 (FIG. 1I) that are to be removed and planarized during the subsequent CMP process. FIG. 1E illustrates the substrate 110 during a polishing process using the conventional soft or low storage modulus E' polishing pad 106B illustrated in FIG. 1D. It has been found that CMP processes that use soft or low storage modulus E' polishing pads tend to have non-uniform planarization results due to the relative ease that a soft or low storage modulus E' polishing pad deforms under the applied force $F_1$ generated by the retaining ring 109 and the applied force $F_2$ generated by the flexible diaphragm 111 during a CMP process. In other words, the soft, flexible and low storage modulus E' nature of the material used to form the soft or low storage modulus E' polishing pad 106B allows the effect that the force $F_1$, supplied by the retaining ring 109, to be minimized, which improves the ability of the pad to compensate for retaining ring 109 downforce. This compressive response of the low elastic modulus material allows for quick recover of retaining ring compression and a more consistent polishing rate seen between the center and edge of a substrate during the polishing process. Therefore, the use of a soft or low storage modulus E' polishing pad will lead to more global CMP planarization uniformity.

FIG. 1I is a schematic sectional view of a portion of a substrate that is being polished using the conventional soft or low storage modulus E' polishing pad 106B. In this example, the flexible or soft or low storage modulus E' nature of the material used to form the soft or low storage modulus E' polishing pad 106B allows the material to deform on a microscopic scale (e.g., 10 nm-1000 nm feature pitch) when the force $F_2$ is applied by the flexible diaphragm 111 to the substrate 110. As shown in FIG. 1I, the material in the soft or low storage modulus E' polishing pad 106B is able to deform and subsequently contact and polish regions of the layer 110A between the device features 110B. The act of simultaneously polishing the tops of the features 110B and portions of the regions between the features 110B will create planarization non-uniformities and other planarization problems. In this case, the soft or low storage modulus E' polishing pad 106B will generally deliver an acceptable amount of global planarization, but achieve a poor planarization efficiency and provide poor dishing results. Low storage modulus containing polishing pads provide the benefit on the microscopic scale of improved scratch performance as they allow hard defects, which can be disposed between the pad surface and the surface of the substrate, to be compressed and/or received within the pad matrix rather than forced against the substrate surface by a higher storage modulus material.

Advanced Polishing Pads

Embodiments of the present disclosure generally provide advanced polishing pads 200 that can be formed by use of an additive manufacturing process. The advanced polishing pads have a pad body that typically includes discrete features or regions that are formed from at least two different material compositions. FIGS. 1F-1G are schematic sectional views of a portion of the carrier head 108 and a pad body 202 of an advanced polishing pad 200 that are positioned in the polishing station 100. In general, it is desirable to form an advanced polishing pad 200 that is configured such that the load applied during the polishing process is distributed through regions of the polishing body 202 that include two or more material compositions to improve the advanced pad's mechanical, structural, and/or dynamic properties. In one embodiment, the pad body 202 may include a least a first polishing element 204 that is formed from a first storage modulus E' material (e.g., high storage modulus E' material), and a second polishing element 206 that may be formed from a second storage modulus E' material (e.g., medium or low storage modulus E' material). In one configuration, a height 150 of the first polishing element(s) 204 from the supporting surface 203 is higher than a height 151 of the second polishing element(s) 206 so that upper surfaces 208 of the first polishing element 204 protrude above the second polishing element(s) 206. In one example, as shown in FIG. 1G, the force $F_2$ is delivered by the flexible diaphragm 111 through the first polishing elements 204 to the second polishing element 206 that is supported by a supporting member, such as the platen 102 shown in FIG. 1A, so as to form an advanced polishing pad that has desired mechanical and dynamic properties that are a combination of materials in each of the polishing elements. By separating the higher storage modulus type polishing features from a low storage modulus type supporting feature the advanced polishing pad offers the benefit of improved global planarity, while maintaining the benefit of improved die and array level planarity offered by a higher storage modulus top pad.

FIG. 1J is a schematic sectional view of a portion of a substrate 110 that is being polished using an advanced polishing pad 200, according to an embodiment of the present disclosure. As illustrated in FIG. 1J, in some embodiments, a first polishing element 204 within the polishing body 202 is formed such that it is large enough to span the distance of at least two or more device features 110B (e.g., integrated circuit devices) that are formed on a surface of the substrate 110. In some embodiments, one or more of the first polishing elements 204 are sized such that they are smaller than the major dimension of the substrate (e.g., radius of a circular substrate), but larger than the smallest device feature size found on a substrate 110. In some embodiments, a plurality of the first polishing elements 204 each have a lateral dimension 208L, which is parallel to the polishing surface, that is between about 250 micrometers and about 3 mm in size. In one example, where the first polishing elements 204 have a circular, square, rectangular, or triangular cross-section at the polishing surface 208, the lateral dimension (e.g., length 208L) can be the diameter or leg of the square, rectangle, or triangle, respectively, of the first polishing element 204. In another example, where the first polishing elements 204 are toroid shaped or arc shaped at the polishing surface 208, the lateral dimension (e.g., width 214) can be the thickness of the toroid or arc when measured along its radius, or even the outer diameter of the toroid in some cases. The combination of the first polishing elements 204 and the one or more second polishing elements 206 can thus be used to adjust the advanced polishing pad properties and performance to improve the results of a polishing process performed on a substrate using the advanced polishing pad, as further discussed below.

In some embodiments, the advanced polishing pad 200 may contain at least one high storage modulus E', medium storage modulus E', and/or low storage modulus E' polishing element, and/or chemical structural feature. For example, a high storage modulus E' material composition may be at least one, or a mixture of, chemical groups and/or structural features including aromatic ring(s) and some aliphatic chains. In some cases, the high storage modulus E' materials have a crosslinking density greater than 2%. The high storage modulus E' compositions may be the most rigid element in an advanced polishing pad and have a high hardness value, and display the least elongation. Medium storage modulus E' compositions may contain a mixture of aromatic rings, crosslinking, but may contain a greater content of aliphatic chains, ether segments, and/or polyurethane segments, than high storage modulus E' compositions. The medium storage modulus E' compositions may have intermediate rigidity, hardness, and display a larger amount of elongation than the high storage modulus E' materials. Low storage modulus E' compositions may contain aliphatic chains, ether segments, and/or polyurethane segments, with minimal or no contribution from aromatic rings or crosslinking. The low storage modulus E' compositions may be flexible, soft, and/or rubber-like.

Materials having desirable low, medium, and/or high storage modulus E' properties at temperatures of 30° C. (E'30) are summarized in Table 1:

TABLE 1

| | Low Modulus Compositions | Medium Modulus Compositions | High Modulus Compositions |
|---|---|---|---|
| E'30 | 5 MPa-100 MPa | 100 MPa-500 MPa | 500 MPa-3000 MPa |

In one embodiment, and referring to Table 1, the polishing pad body 202 may be formed from at least one viscoelastic materials having different storage moduli E' and/or loss moduli E". As a result, the pad body may include a first material or a first composition of materials that have a first storage modulus E' and loss modulus E", and a second material or a second composition of materials that have a second storage modulus E' and loss modulus E" that is different than the first storage modulus E' and loss modulus E". In some embodiments, polishing pad surface features may include a plurality of features with one or more form factors or dimensions, and be a mixture of features that have different mechanical, thermal, interfacial and chemical properties. For example, the pad surface features, such as channels, grooves and/or proturbances, disposed over, upon, and within the pad body, may include both higher storage modulus E' properties derived from a first material or a first composition of materials and some lower storage modulus E' properties derived from a second material or a second composition of materials that are more elastic than the first material or the first composition of materials.

The term advanced polishing pad 200 as used herein is intended to broadly describe an advanced polishing pad that contains one or more of the attributes, materials, features and/or properties that are discussed above and further below. Specific configurations of advanced polishing pads are discussed in conjunction with the examples illustrated in FIGS. 2A-2K. Unless otherwise specified, the terms first polishing element(s) 204 and the second polishing element(s) 206 are intended to broadly describe portions, regions and/or features within the polishing body of the advanced polishing pad 200. The specific examples of different advanced polishing pad configurations, shown in FIGS. 2A-2K, are not intended to be limiting as to the scope of the disclosure provided herein, since other similar configurations may be formed by use of the one or more of the additive manufacturing processes described herein.

The advanced polishing pads may be formed by a layer by layer automated sequential deposition of at least one resin precursor composition followed by at least one curing step, wherein each layer may represent at least one polymer composition, and/or regions of different compositions. The compositions may include functional polymers, functional oligomers, reactive diluents, and curing agents. The functional polymers may include multifunctional acrylate precursor components. To form a plurality of solid polymeric layers, one or more curing steps may be used, such as exposure of one or more compositions to UV radiation and/or thermal energy. In this fashion, an entire polishing pad may be formed from a plurality of polymeric layers by 3D printing. A thickness of the cured layer may be from about 0.1 micron to about 1 mm, such as 5 micron to about 100 microns, and such as 25 microns to about 30 microns.

Polishing pads according to the present disclosure may have differing mechanical properties, such as storage modulus E' and loss modulus E", across the pad body 202, as reflected by at least one compositional gradient from polishing element to polishing element. Mechanical properties across the polishing pad 200 may be symmetric or non-symmetric, uniform or non-uniform to achieve target polishing pad properties, which may include static mechanical properties, dynamic mechanical properties and wear properties. The patterns of either of the polishing elements 204, 206 across the pad body 202 may be radial, concentric, rectangular, spiral, fractal or random according to achieve target properties including storage modulus E' and loss modulus E", across the polishing pad. Advantageously, the 3D printing process enables specific placement of material compositions with desired properties in specific pad areas of the pad, or over larger areas of the pad so the properties are combined and represent a greater average of properties or a "composite" of the properties.

Advanced Polishing Pad Configuration Examples

Figure 2A:
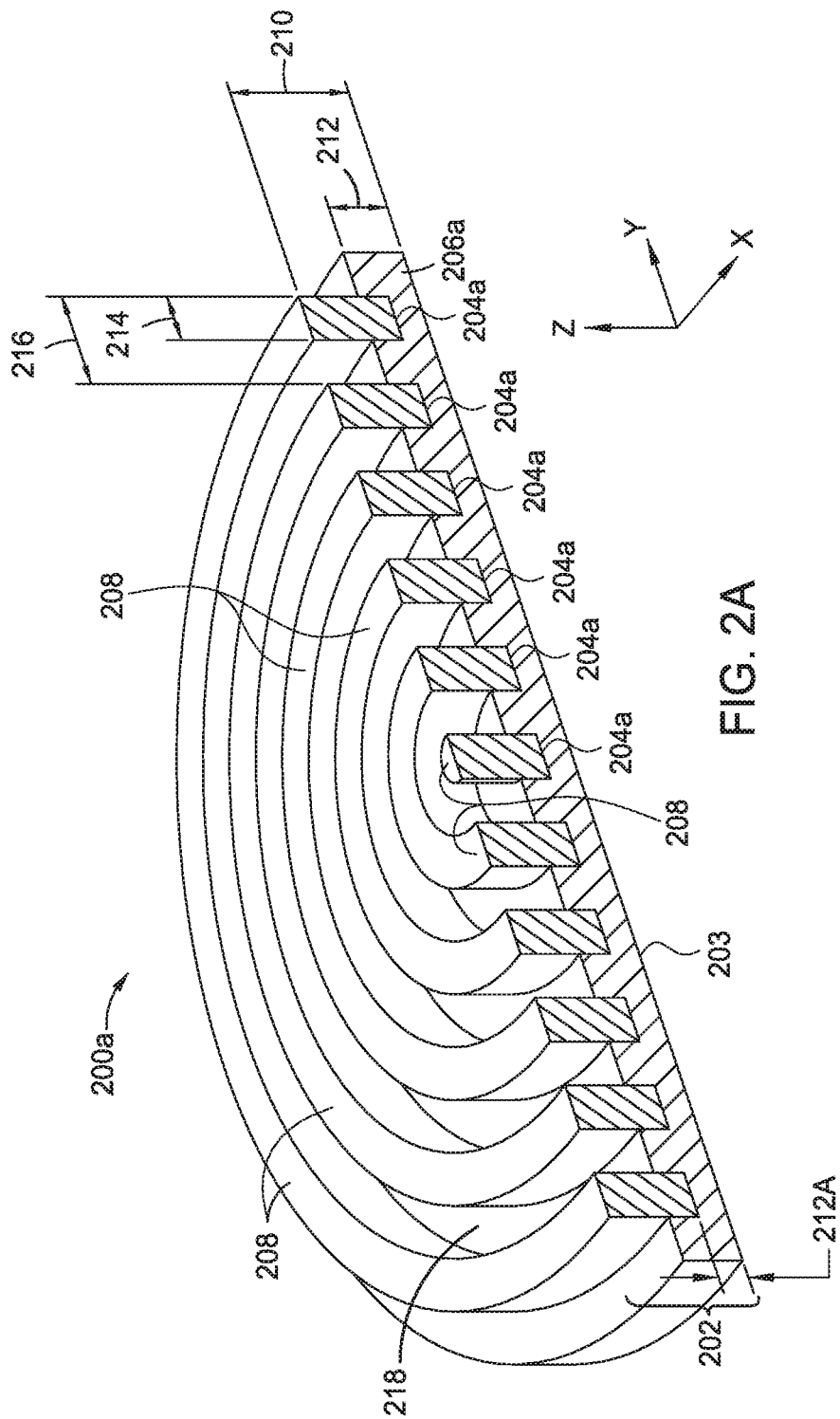
FIG. 2A is a schematic isometric and cross-sectional view of a polishing pad according to an embodiment of the present disclosure.

FIG. 2A is a schematic perspective sectional view of an advanced polishing pad 200a according to one embodiment of the present disclosure. One or more first polishing elements 204a may formed in alternating concentric rings that are coupled to one or more second polishing elements 206a to form a circular pad body 202. In one embodiment, a height 210 of the first polishing element(s) 204a from the supporting surface 203 is higher than a height 212 of the second polishing element(s) 206a so that the upper surfaces 208 of the first polishing element(s) 204a protrude above the second polishing element(s) 206a. In one embodiment, the first polishing element 204 is disposed over a portion 212A of the second polishing element(s) 206a. Grooves 218 or channels are formed between the first polishing element(s) 204a, and at least include a portion of the second polishing element(s) 206a. During polishing, the upper surfaces 208 of the first polishing elements 204a form a polishing surface that contacts the substrate, while the grooves 218 retain and channel the polishing fluid. In one embodiment, the first polishing element(s) 204a are thicker than the second polishing element(s) 206a in a direction normal to a plane parallel to the polishing surface, or upper surface 208, of the pad body 202 (i.e., Z-direction in FIG. 2A) so that the channels or grooves 218 are formed on the top surface of the pad body 202.

In one embodiment, a width 214 of the first polishing elements 204a may be between about 250 microns and about 5 millimeters. The pitch 216 between the hard first polishing element(s) 204a may be between about 0.5 millimeters and about 5 millimeters. Each first polishing element 204a may have a width within a range between about 250 microns and about 2 millimeters. The width 214 and/or the pitch 216 may vary across a radius of the advanced polishing pad 200 to define zones of varied hardness.

Figure 2B:
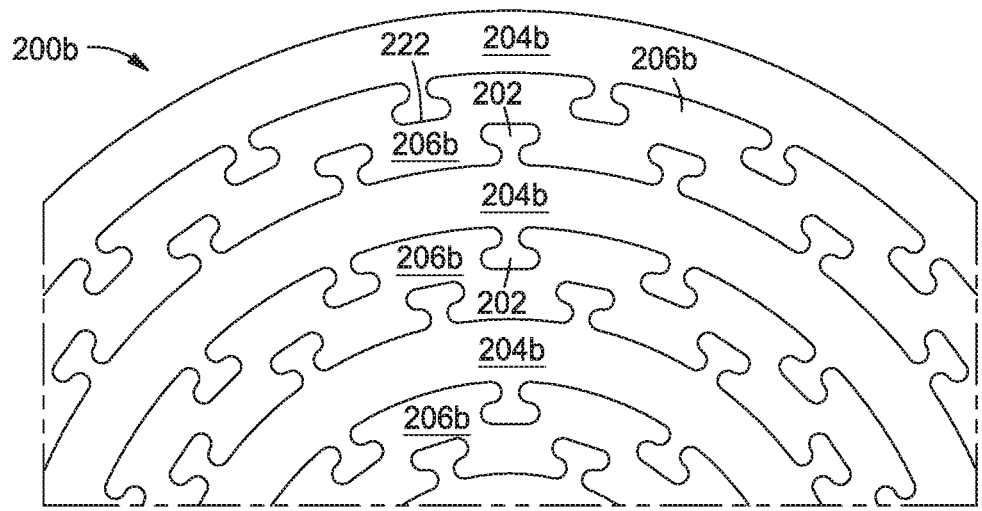
FIG. 2B is a schematic partial top view of a polishing pad according to an embodiment of the present disclosure.

FIG. 2B is a schematic partial top view of an advanced polishing pad 200b according to an embodiment of the present disclosure. The advanced polishing pad 200b is similar to the advanced polishing pad 200 of FIG. 2A except that the advanced polishing pad 200b includes interlocking first polishing elements 204b and second polishing elements 206b. The first polishing elements 204b and the second polishing elements 206b form a plurality of concentric rings. The first polishing elements 204b may include protruding vertical ridges 220 and the second polishing elements 206b may include vertical recesses 222 for receiving the vertical ridges 220. Alternatively, the second polishing elements 206b may include protruding ridges while the first polishing elements 204b include recesses. By having the second polishing elements 206b interlock with the first polishing elements 204b, the advanced polishing pad 200b will be mechanically stronger in relation to applied shear forces, which may be generated during the CMP process and/or material handling. In one embodiment, the first polishing elements and the second polishing elements may be interlocked to improve the strength of the polishing pad and improve physical integrity of the polishing pads. The interlocking of the features may be due to physical and/or chemical forces.

Figure 2C:
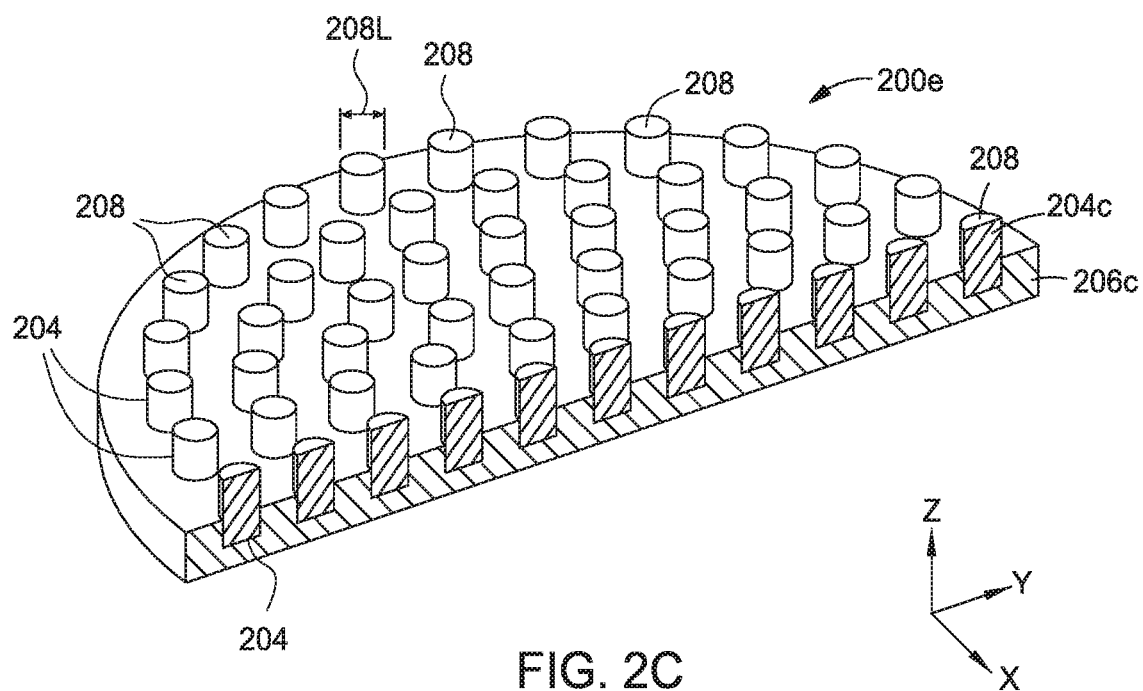
FIG. 2C is a schematic isometric and cross-sectional view of a polishing pad according to an embodiment of the present disclosure.

FIG. 2C is a schematic perspective sectional view of an advanced polishing pad 200c according to an embodiment of the present disclosure. The polishing pad 200c includes a plurality of first polishing elements 204c extending from a base material layer, such as the second polishing element 206c. Upper surfaces 208 of the first polishing elements 204c form a polishing surface for contacting the substrate during polishing. The first polishing elements 204c and the second polishing elements 206c have different material and structural properties. For example, the first polishing elements 204c may be formed from a hard material, while the second polishing elements 206c may be formed from an soft or low storage modulus E' material. The polishing pad 200c may be formed by 3D printing, similar to the advanced polishing pad 200.

The first polishing elements 204c may be substantially the same size, or may vary in size to create varied mechanical properties, such as varied storage modulus E' and/or varied loss modulus E", across the polishing pad 200c. The first polishing elements 204c may be uniformly distributed across the polishing pad 200c, or may be arranged in a non-uniform pattern to achieve target properties in the advanced polishing pad 200c.

In FIG. 2C, the first polishing elements 204c are shown to be circular columns extending from the second polishing elements 206c. Alternatively, the first polishing elements 204c may be of any suitable cross-sectional shape, for example columns with toroidal, partial toroidal (e.g., arc), oval, square, rectangular, triangular, polygonal, or other irregular section shapes, or combinations thereof. In one embodiment, the first polishing elements 204c may be of different cross-sectional shapes to tune hardness, mechanical strength or other desirable properties of the advanced polishing pad 200c.

Figure 2D:
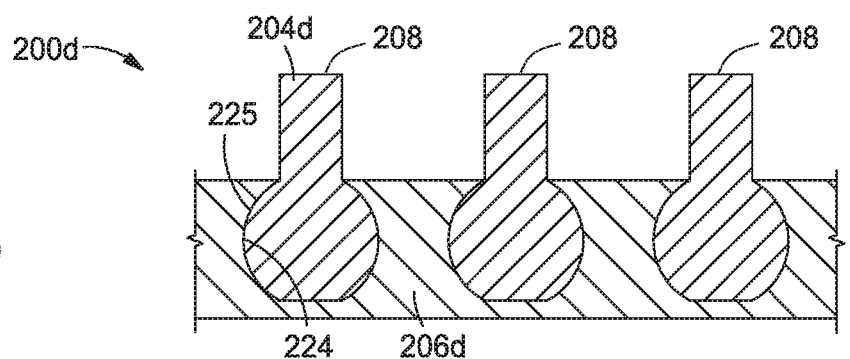
FIG. 2D is a schematic side cross-sectional view of a portion of a polishing pad according to an embodiment of the present disclosure.

FIG. 2D is a schematic partial side cross-sectional view of a polishing body 202 of an advanced polishing pad 200c according to an embodiment of the present disclosure. The advanced polishing pad 200d is similar to the advanced polishing pad 200a, 200b or 200c of FIGS. 2A-2C except that the advanced polishing pad 200d includes interlocking first polishing elements 204d and second polishing elements 206d. The first polishing elements 204d and the second polishing elements 206d may include a plurality of concentric rings and/or discrete elements that form part of the pad body 202, which are, for example, illustrated in FIGS. 2A, 2B or 2C. In one embodiment, the first polishing elements 204d may include protruding sidewalls 224 while the second polishing elements 206d may include regions 225 to receive the protruding sidewalls 224 of the first polishing elements 204d. Alternatively, the second polishing elements 206d may include protruding sidewalls while the first polishing elements 204d include regions that are configured to receive the protruding sidewalls. By interlocking the second polishing elements 206c with the first polishing elements 204d, the advanced polishing pad 200d may exhibit an increased tensile, compressive and/or shear strength. Additionally, the interlocking sidewalls prevent the advanced polishing pad 200d from being pulled apart.

In one embodiment, the boundaries between the first polishing elements 204d and second polishing elements 206d include a cohesive transition from at least one composition of material to another, such as a transition or compositional gradient from a first composition used to form the first polishing element 204d and a second composition used to form the second polishing element 206d. The cohesiveness of the materials is a direct result of the additive manufacturing process described herein, which enables micron scale control and intimate mixing of the two or more chemical compositions in a layer by layer additively formed structure.

Figure 2E:
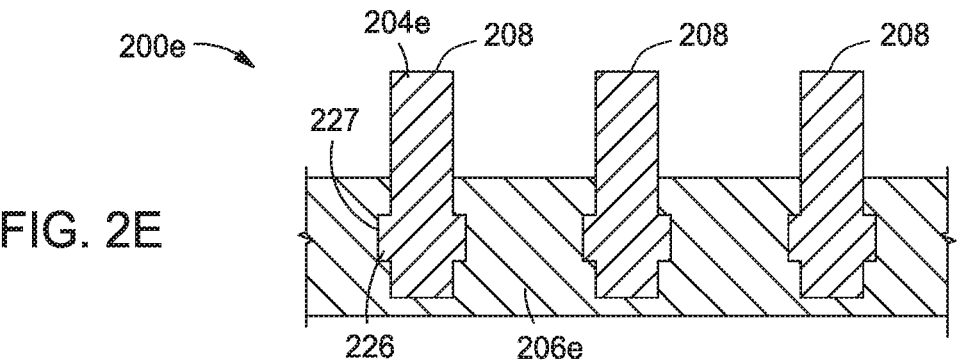
FIG. 2E is a schematic side cross-sectional view of a portion of a polishing pad according to an embodiment of the present disclosure.

FIG. 2E is a schematic partial sectional view of a polishing pad according to an embodiment of the present disclosure. The advanced polishing pad 200e is similar to the advanced polishing pad 200d of FIG. 2D except that the advanced polishing pad 200e includes differently configured interlocking features. The advanced polishing pad 200e may include first polishing elements 204e and second polishing elements 206e having a plurality of concentric rings and/or discrete elements. In one embodiment, the first polishing elements 204e may include horizontal ridges 226 while the second polishing elements 206e may include horizontal recesses 227 to receive the horizontal ridges 226 of the first polishing elements 204e. Alternatively, the second polishing elements 206e may include horizontal ridges while the first polishing elements 204e include horizontal recesses. In one embodiment, vertical interlocking features, such as the interlocking features of FIG. 2B and horizontal interlocking features, such as the interlocking features of FIGS. 2D and 2E, may be combined to form an advanced polishing pad.

FIGS. 2F-2K are schematic plan views of various polishing pad designs according to embodiments of the present disclosure. Each of the FIGS. 2F-2K include pixel charts having white regions (regions in white pixels) that represent the first polishing elements 204f-204k, respectively, for contacting and polishing a substrate, and black regions (regions in black pixels) that represent the second polishing element(s) 206f-206k. As similarly discussed herein, the white regions generally protrude over the black regions so that channels are formed in the black regions between the white regions. In one example, the pixels in a pixel chart are arranged in a rectangular pattern, such as an X and Y oriented array, that are used to define the position of the various materials within a layer, or a portion of layer, of an advanced polishing pad. In another example, the pixels in a pixel chart are arranged in a hexagonal close pack array type of pattern (e.g., one pixel surrounded by six nearest neighbors) that are used to define the position of the various materials within a layer, or a portion of layer of a polishing pad. Polishing slurry may flow through and be retained in the channels during polishing. The polishing pads shown in FIGS. 2F-2K may be formed by depositing a plurality of layers of materials using an additive manufacturing process. Each of the plurality of layers may include two or more materials to form the first polishing elements 204f-204k and second polishing element(s) 206f-206k. In one embodiment, the first polishing elements 204f-204k may be thicker than the second polishing element(s) 206f-206k in a direction normal to a plane that is parallel to the plurality of layers of materials so that grooves and/or channels are formed on a top surface of the polishing pad.

Figure 2F:
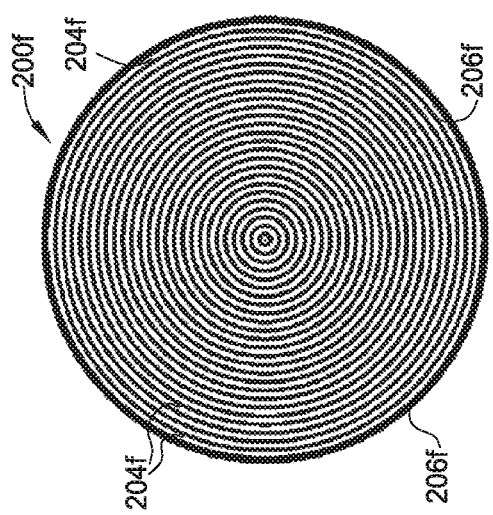
FIGS. 2F-2K are top views of polishing pad designs according to embodiments of the present disclosure.

FIG. 2F is a schematic pixel chart of an advanced polishing pad design 200f having a plurality of concentric polishing features 204f. The polishing features 204f may be concentric circles of equal width. In one embodiment, the second polishing element(s) 206f may also have equal width so that the pitch of the first polishing element(s) 204f is constant along the radial direction. During polishing, channels between the first polishing element(s) 204f retain the polishing slurry and prevent rapid loss of the polishing slurry due to a centrifugal force generated by rotation of the polishing pad about its central axis (i.e., center of concentric circles).

Figure 2G:
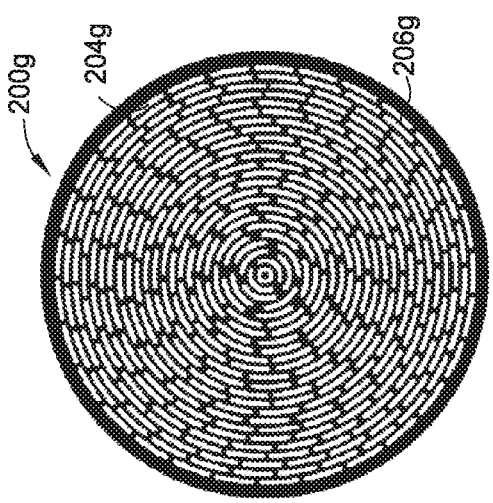

FIG. 2G is a schematic pixel chart of a polishing pad design 200g having a plurality of segmented first polishing elements 204g arranged in concentric circles. In one embodiment, the segmented first polishing elements 204g may have substantially equal length. The segmented first polishing elements 204g may form a plurality of concentric circles. In each circle, the segmented first polishing elements 204g may be equally distributed within each concentric circle. In one embodiment, the segmented first polishing elements 204g may have an equal width in the radial direction. In some embodiments, the segmented first polishing elements 204g have a substantially equal length irrespective of the radius of the concentric circle (e.g., equal arc length except for the center region of the polishing pad). In one embodiment, the second polishing element(s) 206g are disposed between the plurality of concentric circles and have an equal width so that the pitch of the concentric circles is constant. In one embodiment, gaps between the segmented first polishing elements 204g may be staggered from circle to circle to prevent polishing slurry from directly flowing out of the polishing pad under the centrifugal force generated by rotation of the polishing pad about its central axis.

Figure 2H:
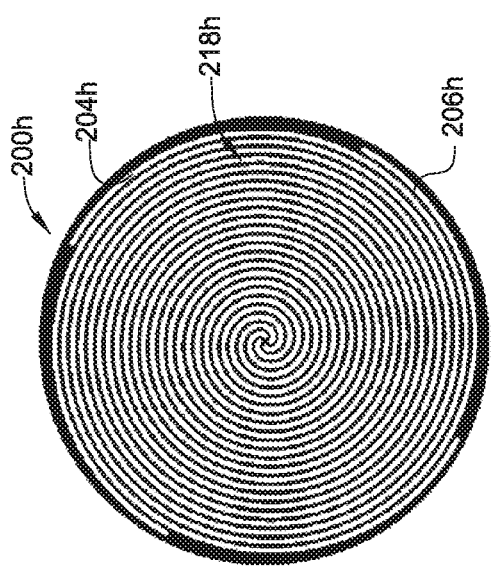

FIG. 2H is a schematic pixel chart of a polishing pad design 200h having spiral first polishing elements 204h disposed over second polishing element(s) 206h. In FIG. 2H, the polishing pad 200h has four spiral first polishing elements 204h extending from a center of the polishing pad to an edge of the polishing pad. Even though four spiral polishing features are shown, less or more numbers of spiral first polishing elements 204h may be arranged in similar manner. The spiral first polishing elements 204h define spiral channels 218h. In one embodiment, each of the spiral first polishing elements 204h has a constant width. In one embodiment, the spiral channels 218h also have a constant width. During polishing, the polishing pad may rotate about a central axis in a direction opposite to the direction of the spiral first polishing elements 204h to retain polishing slurry in the spiral channels. For example, in FIG. 2H, the spiral first polishing elements 204h and the spiral channels are formed in a counter-clockwise direction, and thus during polishing the polishing pad may be rotated clockwise to retain polishing slurry in the spiral channels and on the polishing pad. In some configurations, each of the spiral channels is continuous from the center of the polishing pad to the edge of the polishing pad. This continuous spiral channels allow polishing slurry along with any polishing waste to flow from the center of the polishing pad to the edge of the polishing pad. In one embodiment, the polishing pad may be cleaned by rotating the polishing pad in the same direction as the spiral first polishing elements 204h (e.g., counter-clockwise in FIG. 2H).

Figure 2I:
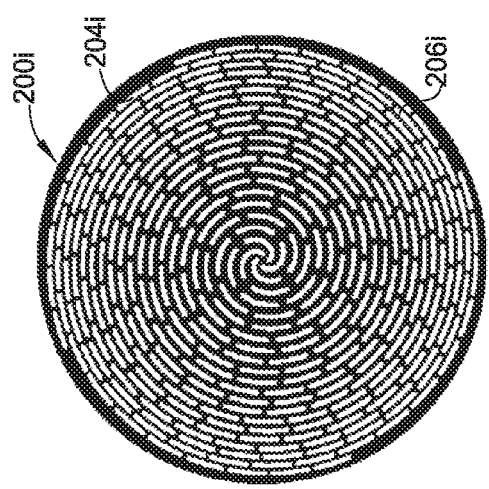

FIG. 2I is a schematic pixel chart of a polishing pad design 200i having segmented first polishing elements 204i arranged in a spiral pattern on second polishing element(s) 206i. The advanced polishing pad illustrated in FIG. 2I is similar to the polishing pad in FIG. 2H except that the first polishing elements 204i are segmented and the radial pitch of the first polishing elements 204i varies. In one embodiment, the radial pitch of the segmented first polishing elements 204i decreases from a center of the polishing pad to an edge region of the polishing pad to adjust and/or control the retention of the slurry on different regions of the surface of the polishing pad during processing.

Figure 2J:
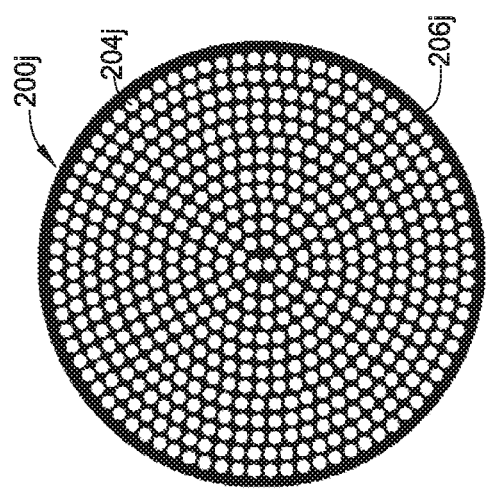

FIG. 2J is a schematic pixel chart of a polishing pad design 200j having a plurality of discrete first polishing elements 204j formed in a second polishing element(s) 206j. In one embodiment, each of the plurality of first polishing elements 204j may be a cylindrical post type structure, similar to the configuration illustrated in FIG. 2C. In one embodiment, the plurality of first polishing elements 204j may have the same dimension in the plane of the polishing surface. In one embodiment, the plurality of cylindrical first polishing elements 204j may be arranged in concentric circles. In one embodiment, the plurality of cylindrical first polishing elements 204j may be arranged in a regular 2D pattern relative to the plane of the polishing surface.

Figure 2K:
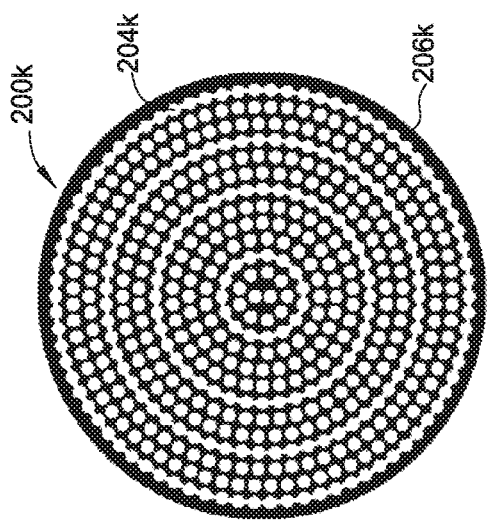

FIG. 2K is a schematic pixel chart of a polishing pad design 200k having a plurality of discrete first polishing elements 204k formed over a second polishing element(s) 206k. The polishing pad of FIG. 2K is similar to the polishing pad of FIG. 2J except that some first polishing elements 204k in FIG. 2K may be connected to form one or more closed circles. The one or more closed circles may create one or more dams to retain polishing slurry during polishing.

The first polishing elements 204a-204k in the designs of FIGS. 2A-2K may be formed from an identical material or identical compositions of materials. Alternatively, the material composition and/or material properties of the first polishing elements 204a-204k in the designs of FIG. 2A-2K may vary from polishing feature to polishing feature. Individualized material composition and/or material properties allows polishing pads to be tailored for specific needs.

Additive Manufacturing Apparatus and Process Examples

Figure 3A:
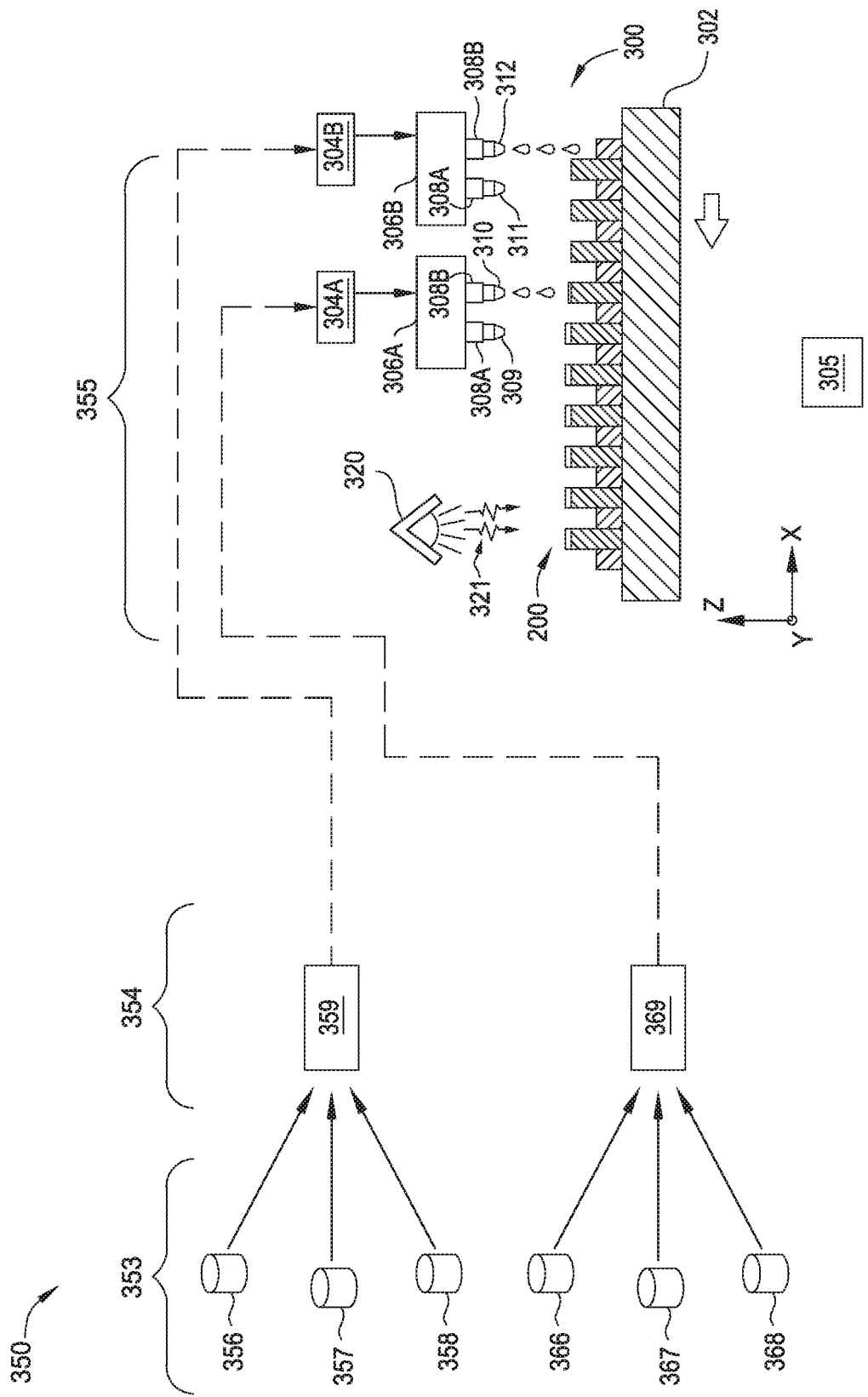
FIG. 3A is a schematic view of a system for manufacturing advanced polishing pads, according to an embodiment of the present disclosure.

FIG. 3A is a schematic sectional view of an additive manufacturing system 350 that can be used to form an advanced polishing pad using an additive manufacturing process according to one or more embodiments of the present disclosure. An additive manufacturing process may include, but are not limited to a process, such as a polyjet deposition process, inkjet printing process, fused deposition modeling process, binder jetting process, powder bed fusion process, selective laser sintering process, stereolithography process, vat photopolymerization digital light processing, sheet lamination process, directed energy deposition process, or other similar 3D deposition process.

The additive manufacturing system 350 generally includes a precursor delivery section 353, a precursor formulation section 354 and a deposition section 355. The deposition section 355 will generally include an additive manufacturing device, or hereafter printing station 300. The advanced polishing pad 200 may be printed on a support 302 within the printing station 300. Typically, the advanced polishing pad 200 is formed layer by layer using one or more droplet ejecting printers 306, such as printer 306A and printer 306B illustrated in FIG. 3A, from a CAD (computer-aided design) program. The printers 306A, 306B and the support 302 may move relative to each other during the printing process.

The droplet ejecting printer 306 may include one or more print heads 308 having one or more nozzles (e.g. nozzles 309-312) for dispensing liquid precursors. In the embodiment of FIG. 3A, the droplet ejecting printer 306A includes print head 308A that has a nozzle 309 and a print head 308B having a nozzle 310. The nozzle 309 may be configured to dispense a first liquid precursor composition to form a first polymer material, such as a soft or low storage modulus E' polymer, while the nozzle 310 may be used to dispense a second liquid precursor to form a second polymer material, such as a hard polymer, or a polymer exhibiting a high storage modulus E'. The liquid precursor compositions may be dispensed at selected locations or regions to form an advanced polishing pad that has desirable properties. These selected locations collectively form the target printing pattern that can be stored as a CAD-compatible file that is then read by an electronic controller 305, which controls the delivery of the droplets from the nozzles of the droplet ejecting printer 306.

The controller 305 is generally used to facilitate the control and automation of the components within the additive manufacturing system 350, including the printing station 300. The controller 305 can be, for example, a computer, a programmable logic controller, or an embedded controller. The controller 305 typically includes a central processing unit (CPU) (not shown), memory (not shown), and support circuits for inputs and outputs (I/O) (not shown). The CPU may be one of any form of computer processors that are used in industrial settings for controlling various system functions, substrate movement, chamber processes, and control support hardware (e.g., sensors, motors, heaters, etc.), and monitor the processes performed in the system. The memory is connected to the CPU, and may be one or more of a readily available non-volatile memory, such as random access memory (RAM), flash memory, read only memory (ROM), floppy disk, hard disk, or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, and the like. A program (or computer instructions) readable by the controller 305 determines which tasks are performable by the components in the additive manufacturing system 350. Preferably, the program is software readable by the controller 305 that includes code to perform tasks relating to monitoring, execution and control of the delivery and positioning of droplets delivered from the printer 306, and the movement, support, and/or positioning of the components within the printing station 300 along with the various process tasks and various sequences being performed in the controller 305.

After 3D printing, the advanced polishing pad 200 may be solidified by use of a curing device 320 that is disposed within the deposition section 355 of the additive manufacturing system 350. The curing process performed by the curing device 320 may be performed by heating the printed polishing pad to a curing temperature or exposing the pad to one or more forms of electromagnetic radiation or electron beam curing. In one example, the curing process may be performed by exposing the printed polishing pad to radiation 321 generated by an electromagnetic radiation source, such as a visible light source, an ultraviolet light source, and x-ray source, or other type of electromagnetic wave source that is disposed within the curing device 320.

The additive manufacturing process offers a convenient and highly controllable process for producing advanced polishing pads with discrete features formed from different materials and/or different compositions of materials. In one embodiment, soft or low storage modulus E' features and/or hard or high storage modulus E' features may be formed using the additive manufacturing process. For example, the soft or low storage modulus E' features of a polishing pad may be formed from the first composition containing polyurethane segments dispensed from the nozzle 312 of the printer 306B, and hard or high storage modulus E' features of the polishing pad may be formed from droplets of the second composition dispensed from the nozzle 310 of the printer 306A.

In another embodiment, the first polishing elements 204 and/or the second polishing element(s) 206 may each be formed from a mixture of two or more compositions. In one example, a first composition may be dispensed in the form of droplets by a first print head, such as the print head 308A, and the second composition may be dispensed in the form of droplets by a second print head, such as the print head 308B of the printer 306A. To form first polishing elements 204 with a mixture of the droplets delivered from multiple print heads requires/includes the alignment of the pixels corresponding to the first polishing elements 204 on predetermined pixels within a deposition map found in the controller 305. The print head 308A may then align with the pixels corresponding to where the first polishing elements 204 are to be formed and then dispense droplets on the predetermined pixels. The advanced polishing pad may thus be formed from a first composition of materials that is formed by depositing droplets of a first droplet composition and a second material that comprises a second composition of materials that is formed by depositing droplets of a second droplet composition.

FIG. 3B is a schematic cross-sectional view of a portion of the printing station 300 and advanced polishing pad 200 during the pad manufacturing process. The printing station 300, as shown in FIG. 3B, includes two printers 306A and 306B that are used to sequentially form a portion of the advanced polishing pad 200. The portion of the advanced polishing pad 200 shown in FIG. 3B may, for example, include part of either the first polishing element 204 or the second polishing elements 206 in the finally formed advanced polishing pad 200. During processing the printers 306A and 306B are configured to deliver droplets "A" or "B," respectively, to a first surface of the support 302 and then successively to a surface of the growing polishing pad that is disposed on the support 302 in a layer by layer process. As shown in FIG. 3B, a second layer 348 is deposited over a first layer 346 which has been formed on the support 302. In one embodiment, the second layer 348 is formed over the first layer 346 which has been processed by the curing device 320 that is disposed downstream from the printers 306A and 306B in the pad manufacturing process. In some embodiments, portions of the second layer 348 may be simultaneously processed by the curing device 320 while one or more of the printers 306A and 306B are depositing droplets "A" and/or "B" onto the surface 346A of the previously formed layer 346. In this case, the layer that is currently being formed may include a processed portion 348A and an unprocessed portion 348B that are disposed on either side of a curing zone 349A. The unprocessed portion 348B generally includes a pattern, such as an array, of dispensed droplets, such as dispensed droplets 343 and 347, which are deposited on the surface 346A of the previously formed layer 346 by use of the printers 306B and 306A, respectively.

FIG. 3C is a close up cross-sectional view of a dispensed droplet 343 that is disposed on a surface 346A of the previously formed layer 346. Based on the properties of the materials within the dispensed droplet 343, and due to surface energy of the surface 346A the dispensed droplet will spread across the surface an amount that is larger than the size of the original dispensed droplet (e.g., droplets "A" or "B"), due to surface tension. The amount of spread of the dispensed droplet will vary as a function of time from the instant that it is deposited on the surface 346A. However, after a very short period of time (e.g., <1 second) the spread of the droplet will reach an equilibrium size, and have an equilibrium contact angle α. The spread of the dispensed droplet across the surface affects the resolution of the placement of the droplets on the surface of the growing polishing pad, and thus the resolution of the features and material compositions found within various regions of the final polishing pad.

In some embodiments, it is desirable to expose one or both of the droplets "A" and "B" after they have been contact with the surface of the substrate for a period of time to cure, or "fix," each droplet at a desired size before the droplet has a chance to spread to its uncured equilibrium size on the surface of the substrate. In this case, the energy supplied to the dispensed droplet, and surface that it is placed on, by the curing device 320 and the droplet's material composition are adjusted to control the resolution of each of the dispensed droplets. Therefore, one important parameter to control or tune during a 3D printing process is the control of the dispensed droplet's surface tension relative to the surface that it is disposed on. In some embodiments, it is desirable to add one or more curing enhancement components (e.g., photoinitiators) to the droplet's formulation to control the kinetics of the curing process, prevent oxygen inhibition, and/or control the contact angle of the droplet on the surface that it is deposited on. One will note that the curing enhancement components will generally include materials that are able to adjust: 1) the amount of bulk curing that occurs in the material in the dispensed droplet during the initial exposure to a desired amount of electromagnetic radiation, 2) the amount of surface curing that occurs in the material in the dispensed droplet during the initial exposure to a desired amount of electromagnetic radiation, and 3) the amount of surface property modification (e.g., additives) to the surface cured region of the dispensed droplet. The amount of surface property modification to the surface cured region of the dispensed droplet generally includes the adjustment of the surface energy of the cured or partially cured polymer found at the surface of the dispensed and at least partially cured droplet.

It has been found that it is desirable to partially cure each dispensed droplet to "fix" its surface properties and dimensional size during the printing process. The ability to "fix" the droplet at a desirable size can be accomplished by adding a desired amount of at least one curing enhancement components to the droplet's material composition and delivering a sufficient amount of electromagnetic energy from the curing device 320 during the additive manufacturing process. In some embodiments, it is desirable to use a curing device 320 that is able to deliver between about 1 milli-joule per centimeter squared (mJ/cm$^2$) and 100 mJ/cm$^2$, such as about 10-20 mJ/cm$^2$, of ultraviolet (UV) light to the droplet during the additive layer formation process. The UV radiation may be provided by any UV source, such as mercury microwave arc lamps (e.g., H bulb, H+ bulb, D bulb, Q bulb, and V bulb type lamps), pulsed xenon flash lamps, high-efficiency UV light emitting diode arrays, and UV lasers. The UV radiation may have a wavelength between about 170 nm and about 500 nm.

In some embodiments, the size of dispensed droplets "A", "B" may be from about 10 to about 200 microns, such as about 50 to about 70 microns. Depending on the surface energy (dynes) of the substrate or polymer layer that the droplet is dispensed over and upon, the uncured droplet may spread on and across the surface to a size 343A of between about 10 and about 500 microns, such as between about 50 and about 200 microns. In one example, the height of such a droplet may be from about 5 to about 100 microns, depending on such factors as surface energy, wetting, and/or resin precursor composition which may include other additives, such as flow agents, thickening agents, and surfactants. One source for the additives is BYK-Gardner GmbH of Geretsried, Germany.

In some embodiments, it is generally desirable to select a photoinitiator, an amount of the photoinitiator in the droplet composition, and the amount of energy supplied by curing device 320 to allow the dispensed droplet to be "fixed" in less than about 1 second, such as less than about 0.5 seconds after the dispensed droplet has come in contact with the surface on which it is to be fixed. The actual time it takes to partially cure the dispensed droplet, due to the exposure to delivered curing energy, may be longer or shorter than the time that the droplet resides on the surface before it is exposed to the delivered radiation, since the curing time of the dispensed droplet will depend on the amount of radiant energy and wavelength of the energy provide from the curing source 320. In one example, an exposure time used to partially cure a 120 micrometer (μm) dispensed droplet is about 0.4 microseconds (μs) for a radiant exposure level of about 10-15 mJ/cm$^2$ of UV radiation. In an effort to "fix" the droplet in this short timeframe one must position the dispense nozzle of the droplet ejecting printer 306 a short distance from the surface of the surface of the polishing pad, such as between 0.1 and 10 millimeters (mm), or even 0.5 and 1 mm, while the surface 346A of the advanced polishing pad are exposed to the radiation 321 delivered from the curing device 320. It has also been found that by controlling droplet composition, the amount of cure of the previously formed layer (e.g., surface energy of the previously formed layer), the amount of energy from the curing device 320 and the amount of the photoinitiator in the droplet composition, the contact angle α of the droplet can be controlled to control the fixed droplet size, and thus the resolution of the printing process. In one example, the underlying layer cure may be a cure of about 70% acrylate conversion. A droplet that has been fixed, or at least partially cured, is also referred to herein as a cured droplet. In some embodiments, the fixed droplet size 343A is between about 10 and about 200 microns. In some embodiments, the contact angle, also referred to herein as the dynamic contact angle (e.g., non-equilibrium contact angle), for a "fixed" droplet can be desirably controlled to a value of at least 50°, such as greater than 55°, or even greater than 60°, or even greater than 70°.

The resolution of the pixels within a pixel chart that is used to form a layer, or a portion of a layer, by an additive manufacturing process can be defined by the average "fixed" size of a dispensed droplet. The material composition of a layer, or portion of a layer, can thus be defined by a "dispensed droplet composition", which a percentage of the total number of pixels within the layer, or portion of the layer, that include droplets of a certain droplet composition.

In one example, if a region of a layer of a formed advanced polishing pad is defined as having a dispensed droplet composition of a first dispensed droplet composition of 60%, then 60% percent of the pixels within the region will include a fixed droplet that includes the first material composition. In cases where a portion of a layer contains more than one material composition, it may also be desirable to define the material composition of a region within an advanced polishing pad as having a "material composition ratio." The material composition ratio is a ratio of the number of pixels that have a first material composition disposed thereon to the number of pixels that have a second material composition disposed thereon. In one example, if a region was defined as containing 1,000 pixels, which are disposed across an area of a surface, and 600 of the pixels contain a fixed droplet of a first droplet composition and 400 of the pixels contain a fixed droplet of a second droplet composition then the material composition ratio would include a 3:2 ratio of the first droplet composition to the second droplet composition. In configurations where each pixel may contain greater than one fixed droplet (e.g., 1.2 droplets per pixel) then the material composition ratio would be defined by the ratio of the number of fixed droplets of a first material to the number of fixed droplets of a second material that are found within a defined region. In one example, if a region was defined as containing 1,000 pixels, and there were 800 fixed droplet of a first droplet composition and 400 fixed droplets of a second droplet composition within the region, then the material composition ratio would be 2:1 for this region of the advanced polishing pad.

The amount of curing of the surface of the dispensed droplet that forms the next underlying layer is an important polishing pad formation process parameter, since the amount of curing in this "initial dose" affects the surface energy that the subsequent layer of dispensed droplets will be exposed to during the additive manufacturing process. The amount of the initial cure dose is also important since it will also affect the amount of curing that each deposited layer will finally achieve in the formed polishing pad, due to repetitive exposure of each deposited layer to additional transmitted curing radiation supplied through the subsequently deposited layers as they are grown thereon. It is generally desirable to prevent over curing of a formed layer, since it will affect the material properties of the over cured materials and/or the wettability of the surface of the cured layer to subsequently deposited dispensed droplets in subsequent steps. In one example, to effect polymerization of a 10-30 micron thick layer of dispensed droplets may be performed by dispensing each droplet on a surface and then exposing the dispensed droplet to UV radiation at a radiant exposure level of between about 10 and about 15 mJ/cm$^2$ after a period of time of between about 0.1 seconds and about 1 second has elapsed. However, in some embodiments, the radiation level delivered during the initial cure dose may be varied layer by layer. For example, due to differing dispensed droplet compositions in different layers, the amount of UV radiation exposure in each initial dose may be adjusted to provide a desirable level of cure in the currently exposed layer, and also to one or more of the underlying layers.

In some embodiments, it is desirable to control the droplet composition and the amount of energy delivered from the curing device 320 during the initial curing step, which is a step in which the deposited layer of dispensed droplets are directly exposed to the energy provided by the curing device 320, to cause the layer to only partially cure a desired amount. In general, it is desirable for the initial curing process to predominantly surface cure the dispensed droplet versus bulk cure the dispensed droplet, since controlling the surface energy of the formed layer is important for controlling the dispensed droplet size. In one example, the amount that a dispensed droplet is partially cured can be defined by the amount of chemical conversion of the materials in the dispensed droplet. In one example, the conversion of the acrylates found in a dispensed droplet that is used to form a urethane polyacrylate containing layer, is defined by a percentage x, which is calculated by the equation:

$$x = 1 - \frac{(A_{C=C}/A_{C=O})_x}{(A_{C=C}/A_{C=O})_0},$$

where $A_{C=C}$ and $A_{C=O}$ are the values of the C=C peak at 910 cm$^{-1}$ and the C=O peaks at 1700 cm$^{-1}$ found using FT-IR spectroscopy. During polymerization, C=C bonds within acrylates are converted to C—C bond, while C=O within acrylates has no conversion. The intensity of C=C to C=O hence indicates the acrylate conversion rate. The $A_{C=C}/A_{C=O}$ ratio refers to the relative ratio of C=C to C=O bonds within the cured droplet, and thus the $(A_{C=C}/A_{C=O})_0$ denotes the initial ratio of $A_{C=C}$ to $A_{C=O}$ in the droplet, while $(A_{C=C}/A_{C=O})_x$ denotes the ratio of $A_{C=C}$ to $A_{C=O}$ on the surface of the substrate after the droplet has been cured. In some embodiments, the amount that a layer is initially cured may be equal to or greater than about 70% of the dispensed droplet. In some configurations, it may be desirable to partially cure the material in the dispensed droplet during the initial exposure of the dispensed droplet to the curing energy to a level from about 70% to about 80%, so that the target contact angle of the dispensed droplet may be attained. It is believed that the uncured or partially acrylate materials on top surface are copolymerized with the subsequent droplets, and thus yield cohesion between the layers.

The process of partially curing a dispensed droplet during the initial layer formation step can also be important to assure that there will be some chemical bonding/adhesion between subsequently deposited layers, due to the presence of residual unbonded groups, such as residual acrylic groups. Since the residual unbonded groups have not been polymerized, they can be involved in forming chemical bonds with a subsequently deposited layer. The formation of chemical bonds between layers can thus increase the mechanical strength of the formed advanced polishing pad in the direction of the layer by layer growth during the pad formation process (e.g., Z-direction in FIG. 3B). As noted above, the bonding between layers may thus be formed by both physical and/or chemical forces.

The mixture of the dispensed droplet, or positioning of the dispensed droplets, can be adjusted on a layer by layer basis to form layers that individually have tunable properties, and a polishing pad that has desirable pad properties that are a composite of the formed layers. In one example, as shown in FIG. 3B, a mixture of dispensed droplets includes a 50:50 ratio of the dispensed droplets 343 and 347 (or a material composition ratio of 1:1), wherein the dispensed droplet 343 includes at least one different material from the material found in the dispensed droplet 347. The ratio of the of the dispensed droplets 343 to dispensed droplets 347 within each formed layer, or portion of a layer, may be adjusted in one or more directions to provide a gradient in materials properties in the one or more directions (e.g., X, Y and/or Z directions), as will be further discussed below. Properties of portions of the polishing body 202, such as the first polishing elements 204 and/or second polishing elements 206 may be adjusted or tuned according to the ratio and/or distribution of a first composition and a second composition that are formed from the positioning of the dispensed droplets during the deposition process. For example, the weight % of the first composition may be from about 1% by weight based on total composition weight to about 100% based on total composition weight. In a similar fashion, the second composition may be from about 1% by weight based on total composition weight to about 100% based on total composition weight. Depending on the material properties that are required, such as hardness and/or storage modulus, compositions of two or more materials can be mixed in different ratios to achieve a desired effect. In one embodiment, the composition of the first polishing elements 204 and/or second polishing elements 206 is controlled by selecting at least one composition or a mixture of compositions, and size, location, and/or density of the droplets dispensed by one or more printers. Therefore, the controller 305 is generally adapted to position the nozzles 309-310, 311-312 to form a layer that has interdigitated droplets that have been positioned in a desired density and pattern on the surface of the polishing pad that is being formed. In some configurations, dispensed droplets may be deposited in such a way as to ensure that each drop is placed in a location where it does not blend with other drops, and thus each remains a discrete material "island" prior to being cured. In some configurations, the dispensed droplets may also be placed on top of prior dispensed droplets within the same layer to increase the build rate or blend material properties. Placement of droplets relative to each other on a surface may also be adjusted to allow partial mixing behavior of each of the dispensed droplets in the layer. In some cases, it may be desirable to place the droplets closer together or farther apart to provide more or less mixing of the components in the neighboring droplets, respectively. It has been found that controlling droplet placement relative to other dispensed droplets and the composition of each droplet can have an effect on the mechanical and polishing properties of the formed advanced polishing pad.

Even though only two compositions are generally discussed herein for forming the first polishing elements 204 and/or second polishing elements 206, embodiments of the present disclosure encompass forming features on a polishing pad with a plurality of materials that are interconnected via compositional gradients. In some configurations, the composition of the first polishing elements 204 and/or second polishing elements 206 in a polishing pad are adjusted within a plane parallel to the polishing surface and/or through the thickness of the polishing pad, as discussed further below.

The ability to form compositional gradients and the ability to tune the chemical content locally, within, and across an advanced polishing pad are enabled by "ink jettable" low viscosity compositions, or low viscosity "inks" in the 3D printing arts that are used to form the droplets "A" and/or "B" illustrated in FIG. 3B. The low viscosity inks are "pre-polymer" compositions and are the "precursors" to the formed first polishing elements 204 and second polishing elements 206 found in the pad body 202. The low viscosity inks enable the delivery of a wide variety of chemistries and discrete compositions that are not available by conventional techniques (e.g., molding and casting), and thus enable controlled compositional transitions or gradients to be formed within different regions of the pad body 202. This is achieved by the addition and mixing of viscosity thinning reactive diluents to high viscosity functional oligomers to achieve the appropriate viscosity formulation, followed by copolymerization of the diluent(s) with the higher viscosity functional oligomers when exposed to a curing energy delivered by the curing device 320. The reactive diluents may also serve as a solvent, thus eliminating the use of inert non-reactive solvents or thinners that must be removed at each step.

Referring to the precursor delivery section 353 and precursor formulation section 354 of FIG. 3A, in one embodiment, a first precursor 356 is mixed with a second precursor 357 and a diluent 358 to form a first printable ink composition 359, which is delivered to reservoir 304B of the printer 306B, and used to form portions of the polishing body 202. Similarly, a third precursor 366 can be mixed with a fourth precursor 367 and a diluent 368 to form a second new printable ink composition 369, which is delivered to reservoir 304A of the printer 306A, and used to form another portion of the polishing body 202. In some embodiments, the first precursor 356 and the third precursor 366 each comprise an oligomer, such as multifunctional oligomer, the second precursor 357 and the fourth precursor 367 each comprise a multifunctional monomer, and diluent 358 and the diluent 368 each comprise a reactive diluent (e.g., monomer) and/or initiator (e.g., photoinitiator). One example of a first printable ink composition 359 may include a first precursor 356 which includes a reactive difunctional oligomer, comprising aliphatic chain segments, which may have a viscosity from about 1000 centipoise (cP) at 25° C., to about 12,000 cP at 25° C., is then mixed with and thus diluted by a 10 cP at 25° C. reactive diluent (e.g., diluent 358), such as monoacrylate, to create a new composition that has new viscosity. The printable composition thus obtained may exhibit a viscosity from about 80 cP to about 110 cP at 25° C., and a viscosity from about 15 cP to about 30 cP at 70° C., which may be effectively dispensed from a 3D printer ink jet nozzle.

FIGS. 4A-4F provide examples of an advanced polishing pads that include a compositional gradient across one or more regions of the polishing body. In FIGS. 4A-4D, the white pixel marks are intended to schematically illustrate where a dispensed droplet of a first material is dispensed while the black pixel marks illustrate where no material is dispensed within one or more layers used to form the polishing pad. In some processes, a second set of dispensed droplets of a second material may be dispensed at the black pixel mark locations, and thus adjacent to the previous white pixel marks where the first material was dispensed, to form a part of one or more of the layers within the polishing pad. By use of these techniques, compositional gradients in the cured material, or material formed by a plurality of cured droplets, can be formed in the printed layers used to form at least part of a complete polishing pad. The tailored composition of the printed layers within a polishing pad can be used to adjust and tailor the overall mechanical properties of the polishing pad. The composition of polishing features may vary in any suitable pattern. Although polishing pads described herein are shown to be formed from two kinds of materials, this configuration is not intended to be limiting of the scope of the disclosure provided herein, since polishing pads including three or more kinds of materials is within the scope of the present disclosure. It should be noted that the compositions of the polishing features in any designs of the polishing pad, such as the polishing pads in FIGS. 2A-2K, may be varied in similar manner as the polishing pads in FIGS. 4A-4F.

Figure 4A:
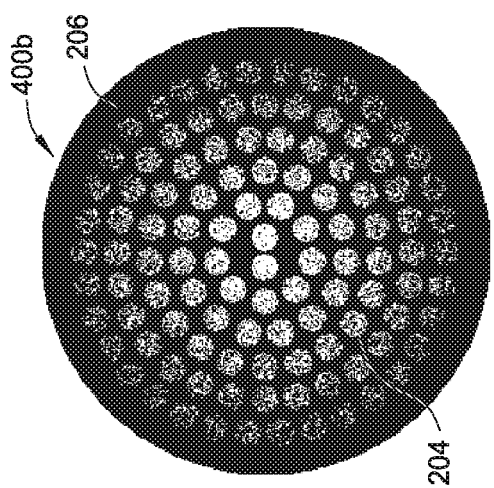
FIGS. 4A-4D are top views of pixel charts used to form an advanced polishing pad, according to at least one embodiment of the present disclosure.
Figure 4B:
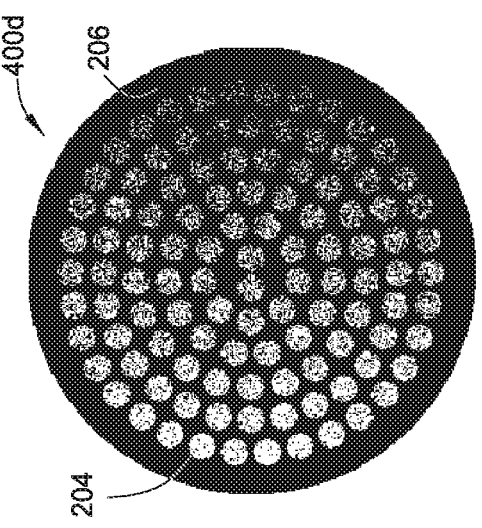

FIGS. 4A and 4B are black and white bitmap images reflecting pixel charts of a printed layer within an advanced polishing pad that includes portions of first polishing elements 204 and second polishing element(s) 206. In FIGS. 4A and 4B, the white pixel marks are where a droplet of a first material is dispensed while the black pixel marks are where no material is dispensed and cured. FIG. 4A is the pixel chart 400a of a first portion of a layer within an advanced polishing pad 200 and FIG. 4B is the pixel chart 400b of a second portion of the same advanced polishing pad. The first portion may be dispensed by a first print head according to the pixel chart 400a and the second portion may be dispensed by a second print head according to the pixel chart 400b. The two print heads superimpose the pixel charts 400a, 400b together to form one or more layers that contain discrete polishing features. The polishing features near an edge region of the polishing pad include more of the first material than the second material. The polishing features near a center region of the polishing pad include more of the second material than the first material. In this example, each polishing feature has a unique combination of the first material and the second material. In one example, the first polishing elements 204 include a first combination of the first material and the second material and the second polishing elements 206 include a different second combination of the first material and the second material. Therefore, by use of pixel charts, the polishing body can be sequentially formed so that a desired gradient in material composition is achieved in different parts of the polishing body to achieve a desired polishing performance of the advanced polishing pad.

Figure 4C:
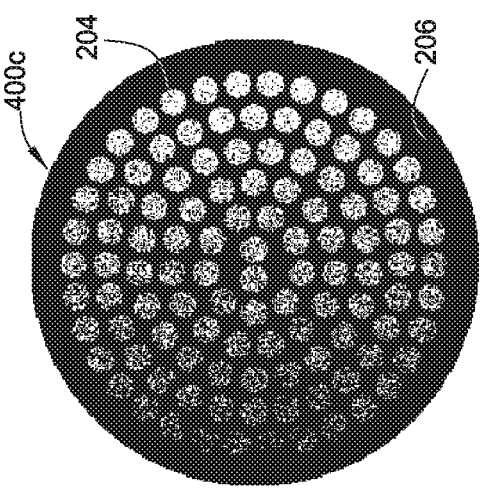
Figure 4D:
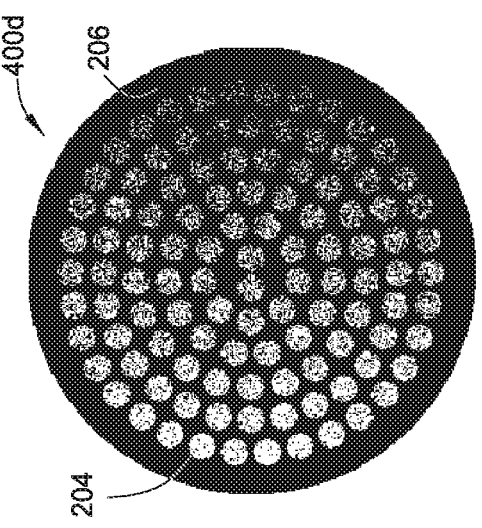

FIGS. 4C and 4D are schematic pixel charts 400c, 400d of a polishing pad having features. In some embodiments, FIG. 4C is the pixel chart 400c of a first portion of a polishing pad and FIG. 4D is the pixel chart 400d of a second portion of the same polishing pad. The polishing pad according to FIGS. 4C, 4D is similar to the polishing pad of FIGS. 4A, 4B except the gradient in the material composition of the polishing body varies from left to right across the polishing pad.

FIG. 4E is a schematic view of a web based polishing pad 400e that is formed using an additive manufacturing process to form a polishing surface 208 that has a gradient in material composition across the polishing surface 208 (e.g., Y-direction). As shown in FIG. 4E the polishing material may be disposed over a platen 102 between a first roll 481 and a second roll 482. By building a web, or even standard polishing pad, with differing regions of high and low storage modulus the substrate can be moved over different locations on the polishing pad 400e during different portion of the polishing process, so as to provide the desired mechanical properties during each phase of the polishing process. One example may involve a substrate having an initial surface texture removed rapidly using a planarizing portion of the polishing pad 400e that has a high elastic modulus and then moving the substrate to a second portion of the polishing pad 400e that has a lower elastic modulus to buff the substrate surface and reduce scratch defects.

FIG. 4F is schematic side cross-sectional view of an advanced polishing pad 400f that is formed using an additive manufacturing process to form a polishing base layer 491 that has a gradient in material composition in the Z-direction. Gradients in the material composition and/or material properties of the stacked printed layers of the polishing base layer 491 can vary from a high concentration to a low concentration of a first material to a second material in one direction, or vice versa. In some cases, one or more regions within the polishing pad may include more complex concentration gradients, such as a high/low/high or low/high/low concentration gradient of at least two materials that have differing material properties. In one example, at least two materials that form the concentration gradient have different storage modulus E', E'30/E'90 ratio, tan delta or other similar parameter. In some configurations, the advanced polishing pad 400f may include a polishing element region 494 that may include discrete regions that include at least a first polishing element 204 and a second polishing element 206. In one example, the polishing element region 494 may include a portion of a polishing body 202 that contains one or more of the structures shown in FIGS. 2A-2K.

In one embodiment, the base layer 491 includes a homogeneous mixture of two or more different materials in each layer formed within the base layer 491. In one example, the homogeneous mixture may include a mixture of the materials used to form the first polishing element 204 and the second polishing element 206 in each layer formed within the base layer 491. In some configurations, it is desirable to vary the composition of the homogeneous mixture of materials layer by layer to form a gradient in material composition in the layer growth direction (e.g., Z-direction in FIG. 3B). The phrase homogeneous mixture is intended to generally describe a material that has been formed by dispensing and curing printed droplets that have at least two different compositions within each layer, and thus may contain a mixture of small regions of the at least two different compositions that are each sized at a desired resolution. The interface between the polishing base layer 491 and the polishing element region 494 may include a homogeneous blend of the materials found at the upper surface of the polishing base layer 491 and the lower surface of the polishing element region 494, or include a discrete transition where the differing material composition in the first deposited layer of the polishing element region 494 is directly deposited on the surface of the polishing base layer 491.

In some embodiments of the polishing element region 494, or more generally any of the polishing bodies 202 described above, it is desirable to form a gradient in the material composition in the first polishing elements 204 and/or second polishing elements 206 in a direction normal to the polishing surface of the polishing pad. In one example, it is desirable to have higher concentrations of a material composition used to form the soft or low storage modulus E' features in the printed layers near the base of the polishing pad (e.g., opposite to the polishing surface), and higher concentrations of a material composition used to form the hard or high storage modulus E' features in the printed layers near the polishing surface of the polishing pad. In another example, it is desirable to have higher concentrations of a material composition used to form the hard or high storage modulus E' features in the printed layers near the base of the polishing pad, and a higher concentration of a material composition used to form the soft or low storage modulus E' features in the printed layers near the polishing surface of the polishing pad. Surface features use low storage modulus E' can be used for defect removal and scratch reduction, and high storage modulus E' features can be used to enhance die and array scale planarization.

In one embodiment, it is desirable to form a gradient in the material composition within the material used to form the first and/or second polishing elements in a direction normal to the polishing surface of the polishing pad. In one example, it is desirable to have higher concentrations of a material composition used to form the second polishing elements 206 in the printed layers near the base of the polishing pad (e.g., opposite to the polishing surface), and higher concentrations of a material composition used to form the first polishing elements 204 in the printed layers near the polishing surface of the polishing pad. In another example, it is desirable to have higher concentrations of a material composition used to form the first polishing elements 204 in the printed layers near the base of the polishing pad, and a higher concentration of a material composition used to form the second polishing elements 206 in the printed layers near the polishing surface of the polishing pad. For example, a first layer may have a material composition ratio of the first printed composition to the second printed composition of 1:1, a material composition ratio of the first printed composition to the second printed composition of 2:1 in a second layer and a material composition ratio of the first printed composition to the second printed composition of 3:1 in a third layer. In one example, the first printed composition has a higher storage modulus E' containing material than the second printed composition, and the direction of sequential growth of the first, second and third layers is away from a supporting surface of the advanced polishing pad. A gradient can also be formed within different parts of a single layer by adjusting the placement of the printed droplets, or pattern of droplets, within the plane of the deposited layer.

Advance Polishing Pad Formation Process Example

In some embodiments, the construction of an advanced polishing pad 200 begins by creating a CAD model of the polishing pad design. This can be done through the use of existing CAD design software, such as Unigraphics or other similar software. An output file, which is generated by the modelling software, is then loaded to an analysis program to ensure that the advanced polishing pad design meets the design requirements (e.g., water tight, mass density). The output file is then rendered, and the 3D model is then "sliced" into a series of 2D data bitmaps, or pixel charts. As noted above, the 2D bitmaps, or pixel charts, are used to define the locations across an X and Y plane where the layers in the advanced polishing pad will be built. In some additive manufacturing process applications these locations will define where a laser will pulse, and in other applications the location where a nozzle will eject a droplet of a material.

The coordinates found in the pixel charts are used to define the location at which a specific droplet of uncured polymer will be placed using, for example, a poly jet print head. Every coordinate for an X and Y location and a given pad supporting Z stage position will be defined based on the pixel charts. Each X, Y and Z location will include either a droplet dispense or droplet non-dispense condition. Print heads may be assembled in an array in the X and/or Y directions to increase build rate or to deposit additional types of materials. In the examples shown in FIGS. 4A-4D, the black pixels indicate locations where nozzles will not deposit materials and the white pixels indicate where nozzles will deposit materials. By combining the material maps, or pixel charts, in each formed layer a polishing pad of any desirable shape or structural configuration can be printed by the positioning of the discrete droplets near one another.

An additive manufacturing device, such as a 3D printer can be used to form an advanced polishing pad by depositing thermoplastic polymers, depositing and curing of a photo-sensitive resin precursor compositions, and/or laser pulse type sintering and fusing of a dispensed powder layer. In some embodiments, the advanced polishing pad formation process may include a method of polyjet printing of UV sensitive materials. In this configuration, droplets of a precursor formulation (e.g., first printable ink composition 359) are ejected from a nozzle in the droplet ejecting printer 306 and resin precursor composition is deposited onto the build stage. As material is deposited from an array of nozzles, the material may be leveled with the use of a roller or other means to smooth drops into a flat film layer or transfer away excess material. While the droplet is being dispensed, and/or shortly thereafter, a UV lamp or LED radiation source passes over the deposited layer to cure or partially cure the dispensed droplets into a solid polymer network. In some embodiments, a monochromatic light source (e.g., LED light source) is used that has a narrow emitted wavelength range and/or a narrow spot size that is specifically tailored to substantially or partially cure one or more dispensed droplets, and thus not adversely affect other surrounding regions or prior formed layers of the formed advanced polishing pad. In some embodiments, the monochromatic light source is configured to deliver wavelengths of light within a range between 100 nm and 500 nm, such as between about 170 nm and 400 nm. In one example, a UV LED source is configured to deliver UV light within a band of +/−10 nm at a central wavelength of 240 nm, 254 nm, 365 nm, 385 nm, 395 nm or 405 nm wavelengths. This process is built layer on top of layer with adequate cohesion within the layer and between layers to ensure the final embodiment of the pad model is mechanically sound.

In order to better control the polymer stress through the build process, heat may be added during the formation of one or more of the layers. The delivery of heat allows the polymer network formed in each cured or partially cured layer to relax and thereby reduce stress and remove stress history in the film. Stress in the film can result in unwanted deformation of the polishing pad during or after the polishing pad formation process. Heating the partially formed polishing pad while it is on the printer's build tray ensures that the final pad properties are set through the layer by layer process and a predictable pad composition and polishing result can be achieved. In addition to inducing heat into the polishing pad formation process, the area surrounding the growing polishing pad may be modified to reduce the oxygen exposure to the uncured resin. This can be done by employing vacuum or by flooding the build chamber with nitrogen ($N_2$) or other inert gas. The reduction in oxygen over the growing pad will reduce the inhibition of the free radical polymerization reaction, and ensures a more complete surface cure of the dispensed droplets.

Porosity Formation by Additive Manufacturing

In some embodiments, a formed advanced polishing pad 200 includes pores that are formed within the unitary pad body 202 in a desirable distribution or pattern so that the properties of a formed layer within, for example, the first or the second polishing elements or overall pad structure will have desirable thermal and/or mechanical properties. Thus, by tailoring the composition of the various material(s) and formed porosity within portions of the pad body, via an additive manufacturing process, the properties of one or more regions of the advanced polishing pad can be controlled. It is believed that the formation of porosity in at least the surface of the formed pad will help to increase pad surface interaction with slurry and slurry nanoparticle (e.g., ceria oxide and silicon dioxide) loading on the pad, which can enhance the polishing removal rate and reduce the common wafer-to-wafer removal rate deviations typically found in CMP processes.

FIG. 5A illustrates a schematic plan view of a pixel chart that is used to form a region 500 of a layer 522 (FIG. 5B) of a first or a second polishing element of a polishing pad that contains pore-forming regions according to one or more implementations of the present disclosure. In this example, the pixel chart includes a rectangular pattern of pore-forming regions 502 that are formed by dispensing one or more droplets of a porosity-forming agent 504 (FIG. 5B) from a first print head onto a surface and then at least partially surrounding the pore-forming regions 502 with one or more structural material containing regions 501 that include a material that is formed by dispensing droplets of one or more resin precursor compositions from at least a second print head. The porosity-forming agent 504 can then later be removed in a post processing step or during a polishing process to form pores in one or more layers of the polishing pad. In one example, the porosity-forming agent material is removed from a formed advanced polishing pad 200 when the polishing pad is used in a CMP polishing process. In this example, the porosity-forming agent material may be removed due to the interaction of the porosity-forming agent disposed at a surface 520 of the first or second polishing elements in the advanced polishing pad with one or more components found within a slurry that is disposed between the first and/or second polishing elements and a substrate that is being polished. As shown in FIG. 5A, the pore-forming regions 502 are surrounded by a structural material containing region 501 that is formed by dispensing droplets of a resin-precursor formulation across a surface on which the layer 522 is formed. By use of the various techniques described herein, compositional gradients in the cured structural material found within the structural material containing region 501 and/or gradients in the size and density of the pore-forming regions 502 can be used to form at least part of a complete polishing pad that has desirable mechanical and thermal properties. The composition of the pore-forming material disposed within the pore-forming regions 502 and distribution and size of the pore-forming regions 502 across of the polishing pad 200 (i.e., X-Y plane) or through the thickness of the polishing element (i.e., Z direction) may vary in any suitable pattern. Although polishing pads described herein are shown to be formed from two kinds of materials, this configuration is not intended to be limiting of the scope of the disclosure provided herein, since polishing pads including three or more kinds of materials is within the scope of the present disclosure. It should be noted that the compositions of the structural material found within a polishing pad, such as the polishing pad designs illustrated in FIGS. 2A-2K, may be varied in a similar manner as discussed above in conjunction with FIGS. 4A-4F. Thus, in some embodiments, the material found within a formed structural material containing region 501 may include a mixture of two or more different materials that varies in one or more directions across (e.g., X and/or Y direction) or through (e.g., Z direction) the formed layer.

FIG. 5B is a side cross-sectional view of a portion of the region 500 illustrated in FIG. 5A according to one or more aspects of the present disclosure. The portion shown in FIG. 5B includes a plurality of layers 522 that are formed on an optional base layer 521 by use of an additive manufacturing process as described herein. For clarity of discussion purposes, the layers are shown in FIG. 5B as being disposed between two dashed lines, however, due to the processes described herein at least the structural material containing region 501 parts of adjacent layers may be formed such that there is no distinct physical division between layers in a formed polishing pad 200. The layers 522 each include pore-forming regions 502 that are interspersed between regions of the structural material containing region 501. As noted above, due to the interaction of the porosity-forming agent disposed within the pore-forming regions 502 at the surface 520 (i.e., polishing surface 112) of the polishing pad 200 with a slurry (not shown), which is disposed within a polishing region 530, the porosity-forming agent 504 may be easily removed leaving an unfilled void within the pore-forming regions 502, and thus forming a pore 503.

In one embodiment, the pixel charts used to form each layer 522 includes pattern that includes an array of porosity-forming agent 504 containing pore-forming regions 502 that are formed in a desired pattern across the surface of the formed layer. As noted above, in some embodiments, the pattern of porosity-forming agent 504 containing pore-forming regions 502 can be formed in a rectangular array that has a desirable pitch in both the X and Y directions. However, the pattern of porosity-forming agent 504 containing pore-forming regions 502 may be formed in any desirable pattern including a hexagonal array of pore-forming regions 502, a directionally varying pattern of pore-forming regions 502, a random pattern of pore-forming regions 502 or other useful pattern of pore-forming regions 502. In some embodiments, the pixel charts used to form adjacent layers 522 are shifted a desired distance 525 in one or more directions (e.g., X, Y or X and Y directions) relative to each other, or formed in differing relative X-Y patterns, so that the pore-forming regions 502 are not placed on top of each other in adjacently positioned layers as the polishing pad is formed. In one embodiment, similarly configured patterns of pore-forming regions 502 in adjacent layers may be staggered a desired distance in one or more directions relative to each other so that the pore-forming regions 502 are not placed on top of each other in the adjacently positioned layers.

FIG. 5C illustrates is a side cross-sectional view of a portion of the region 500 illustrated in FIG. 5A according to another aspect of the present disclosure. In some embodiments, two or more of the deposited layers may be aligned with each other so that the layers are formed directly on top of each other. In one example, as shown in FIG. 5C, two layers 522A and 522B are formed so that the 522A layer is directly on top of the layer 522B so that the pore-forming regions 502 are placed one on top of the other. The next or subsequent layers may then be shifted a desired distance 525 relative to the layers 522A-B, so that the pore-forming regions 502 in the subsequent layers are not placed on top of the layers 522A-B. This configuration in which two or more layers, within a larger stack of layers, are formed directly on top of each other may be useful in cases where the fixed droplet size resolution in the X and Y directions may be greater than the thickness of the layer in the Z direction. In one example, the fixed droplet size in the X and Y directions is twice as large as the thickness in the Z direction, thus allowing a regular pattern of printed material to be formed in the X, Y and Z directions when two layers are placed on top of each other.

Referring back to FIG. 5A, the pixel charts used to form the pore-forming regions 502 and the surrounding structural material containing region 501 within a layer can be used to create portions of the polishing features that have a consistent or varying porosity in one or more directions X, Y, or Z. In one example, the polishing features near an edge region of the advanced polishing pad may include more of the resin precursor formulation used to form the structural material within the structural material containing region 501 than the porosity-forming agent 504 containing pore-forming regions 502. The polishing features near a center region of the polishing pad may also include a higher percentage of pore-forming regions 502 per layer (e.g., higher density) than the polishing features near the edge region. In this example, each polishing feature of the same type (e.g., first polishing elements 204), or of different types (e.g., first and second polishing elements 204, 206), has a unique combination of the resin precursor formulation, the porosity-forming agent and the density of the pore-forming regions 502 per layer and/or per polishing element. In one example, the first polishing elements 204 include a first combination of the resin precursor formulation and the porosity-forming agent and the second polishing elements 206 include a different second combination of the resin precursor formulation and the porosity-forming agent. Therefore, by use of pixel charts, the polishing body can be sequentially formed so that a desired porosity gradient is achieved in different parts of the polishing body to achieve a desired polishing performance of the advanced polishing pad.

A method of forming a layer of a porous advanced polishing pad according to implementations described herein may include the following steps. First, one or more droplets of a resin composition, such as described herein, are dispensed in a desired X and Y pattern to form the structural material portion of a formed layer. In one implementation, the one or more droplets of a resin composition are dispensed on a support if the one or more droplets constitute a first layer. In some implementations, the one or more droplets of a resin composition are dispensed on a previously deposited layer (e.g., second layer, etc.). Second, one or more droplets of a porosity forming composition containing a porosity-forming agent 504 are dispensed in a desired X and Y pattern to form the pore-forming regions 502 within the formed layer. In one implementation, the one or more droplets of the porosity forming composition are dispensed on a support if the one or more droplets constitute a first layer. In some implementations, the one or more droplets of the porosity forming composition are dispensed on a previously deposited layer. The dispensing processes of the first and second operations are typically performed separately in time and at different X-Y coordinates. Next, or third, the dispensed one or more droplets of the curable resin precursor and the dispensed one or more droplets of the porosity forming composition are at least partially cured. Next, at the optional fourth step, the dispensed one or more droplets of the curable resin precursor and the dispensed one or more droplets of the porosity forming composition are exposed to at least one of an annealing process, a rinsing process, or both to remove the porosity-forming agent. The rinsing process may include rinsing with water, another solvent such as alcohol (e.g., isopropanol) or both. The annealing process may include heating the deposited pad structure to a low temperature (e.g., about 100 degrees Celsius) under a low pressure to vaporize the porosity-forming agent. Next, at the fifth step, an optional second curing process is performed on the formed layer or final pad to form the final porous pad structure. In some cases, the first, second, third and fifth processing steps may also be sequentially repeated in any desired order to form a number of stacked layers before the fourth step is completed.

In some embodiments, the porosity-forming agent 504 may include materials that have hydrophilic and/or have hydro-degradable behaviors, such as hydrogels, poly(lactic-co-glycolic acid) (PLGA), and Polyethylene glycol (PEG), which degrade in the presence of an aqueous solutions. In some configurations, during a CMP polishing process, the porosity-forming agent 504 disposed within a formed polishing pad is configured to degrade, such as dissolve into an aqueous slurry (e.g., porosity-forming agent is soluble in the slurry) or break down in the presence of slurry, and leave a pore (e.g., 100 nm-1 µm opening or void) in the exposed surface of the advanced polishing pad. The porosity-forming agent 504 may include an oligomeric and/or polymeric material that is mixed with an inert soluble component. The inert soluble components may include ethylene glycol, polyethylene glycol, propylene glycol, diethylene glycol, dipropylene glycol, triethylene glycol, tetraethylene glycol and glycerol. The inert soluble components may also include corresponding mono alkyl or dialky ethers and alkyl groups that may include methyl, ethyl, propyl, isopropyl, butyl or isobutyl groups. In one embodiment, the porosity-forming agent 504 includes PEG and about 5% to 15% of an oligomeric and/or polymeric material, such as an acrylate material. In some configurations, a hydrogel material may be used that is based on polyethylene glycol acrylates or methacrylates. These types of materials can be made from polar materials that are not soluble in most resin precursor formulations. The hydrogel materials can be made into pore-forming materials by cross-linking with diacrylates and dimethacrylates in a ratio of about 1 to 10%. The hydrogel materials are formed in this way will still have solubility in water and can be washed away with water to generate pores.

In some embodiments, the structural material containing region 501 may include a material that is formed from one or more of the resin precursor components disclosed herein. For example, the structural material containing region 501 may include a material that is formed by use of a resin precursor component that is selected from, but not restricted to, at least one of the materials listed in Table 3 or families of materials in which the materials listed in Table 3 are from. Other useful resin precursor components that may be used alone or in combination with one or more of the resin precursor components disclosed herein may also include the thiol-ene and thiol-yne type, epoxy, Michael addition type, ring-opening polymerization (ROP), and ring forming or Diels-Alder polymerization (DAP) type components described herein.

In one embodiment, the pores formed with a pad body 202 may be formed by causing the porosity-forming agent 504 change phase, such as vaporize, during a subsequent advanced polishing pad formation process. In one example, the porosity within the formed pad may be generated by delivering electromagnetic radiation to a portion of the polishing pad to induce the generation change in phase of the porosity-forming agent material. In one embodiment, an advanced polishing pad pre-polymer composition may contain compounds, polymers, or oligomers that are thermally labile and that may contain of thermally labile groups. These porogen and thermally labile groups may be cyclic groups, such as unsaturated cyclic organic groups. The porogen may comprise a cyclic hydrocarbon compound. Some exemplary porogens include, but are not restricted to: norbornadiene (BCHD, bicycle(2.2.1)hepta-2,5-diene), alpha-terpinene (ATP), vinylcyclohexane (VCH), phenylacetate, butadiene, isoprene, and cyclohexadiene. In one embodiment, a pre-polymer layer is deposited that contains a radiation curable oligomer with a covalently bound porogen group. After exposure to UV radiation and heat, a porous polymer layer may be formed by the effusion of the porogen group. In another embodiment, an advanced polishing pad pre-polymer composition may contain compounds, polymers, or oligomers that are mixed with a water containing compound. In this example, a plurality of porous layers may be formed by sequential layer deposition and then driving out the water containing compound to form a pore. In other embodiments, pores may be generated by thermally induced decomposition of compounds that form a gas by-product, such as azo compounds, which decompose to form nitrogen gas.

Alternately, in some embodiments, the resin precursor composition may include polymer spheres, such as 100 nm-1 µm of diameter sized polymer nano-spheres or microspheres that are disposed within the droplets that are used to form the advanced polishing pad. In some embodiments, the polymer sphere is between 100 nm and 20 µm in size, such as between 100 nm and 5 µm in size. In some additive manufacturing embodiments, it may be desirable to dispense a resin precursor composition containing droplet out of a first nozzle and also dispense a droplet of a polymer sphere containing formulation out of a second nozzle so that the two dispensed droplets can mix to form a complete droplet that can then be partially or fully cured to form part of the growing polishing pad. In some configurations, during a CMP polishing process, the polymer spheres are configured to degrade, such as dissolve into the aqueous slurry or break down in the presence of slurry, and leave a pore (e.g., 100 nm-1 µm pore feature) in the exposed surface of the advanced polishing pad.

The polymer spheres may comprise one or more solid polymer materials that have desirable mechanical properties, thermal properties, wear properties, degradation properties, or other useful property for use within the formed advanced polishing pad. Alternately, the polymer spheres may comprise a solid polymer shell that encloses a liquid (e.g., water) or gas material so that the polymer sphere will provide desirable mechanical, thermal, wear, or other useful property to the formed advanced polishing pad. The polymer spheres may also be used to form pores within regions of a fixed droplet that is used to form one or more regions within portions of a formed polishing element (e.g., polishing elements 204 and/or 206) to provide desirable mechanical, thermal, wear, or other useful property to these portions of a formed advanced polishing pad. The polymer spheres may include materials that have hydrophilic and/or have hydrodegradable behaviors, such as hydrogels and poly(lactic-co-glycolic acid), PLGA, which degrade in the presence of an aqueous solutions. The polymer spheres are typically uniformly dispersed in the droplet formulations and in the cured materials after performing the additive manufacturing process (e.g., 3D printing).

In some configurations, hydrogel particles may be used that are based on polyethylene glycol acrylates or methacrylates. These types of particles are made from polar materials and are not soluble in most formulations. The hydrogel particles can be made into particle form by cross-linking with diacrylates and dimethacrylates in a ratio of about 1 to 15%. The hydrogel particles formed in this way will still have solubility in water and can be washed away with water to generate pores.

Formulation and Material Examples

As discussed above, the materials used to form portions of the pad body 202, such as the first polishing element 204 and second polishing element 206 may each be formed from at least one ink jettable pre-polymer composition that may be a mixture of functional polymers, functional oligomers, reactive diluents, and curing agents to achieve the desired properties of an advanced polishing pad. In general, the pre-polymer inks or compositions may be processed after being deposited by use of any number of means including exposure or contact with radiation or thermal energy, with or without a curing agent or chemical initiator. In general, the deposited material can be exposed to electromagnetic radiation, which may include ultraviolet radiation (UV), gamma radiation, X-ray radiation, visible radiation, IR radiation, and microwave radiation and also accelerated electrons and ion beams may be used to initiate polymerization reactions. For the purposes of this disclosure, we do not restrict the method of cure, or the use of additives to aid the polymerization, such as sensitizers, initiators, and/or curing agents, such as through cure agents or oxygen inhibitors.

In one embodiment, two or more polishing elements, such as the first and second polishing elements 204 and 206, within a unitary pad body 202, may be formed from the sequential deposition and post deposition processing of at least one radiation curable resin precursor composition, wherein the compositions contain functional polymers, functional oligomers, monomers, and/or reactive diluents that have unsaturated chemical moieties or groups, including but not restricted to: vinyl groups, acrylic groups, methacrylic groups, allyl groups, and acetylene groups. During the polishing pad formation process, the unsaturated groups may undergo free radical polymerization when exposed to radiation, such as UV radiation, in the presence of a curing agent, such as a free radical generating photoinitiator, such as an Irgacure® product manufactured by BASF of Ludwigshafen, Germany.

Two types of free radical photoinitiators may be used in one or more of the embodiments of the disclosure provided herein. The first type of photoinitiator, which is also referred to herein as a bulk cure photoinitiator, is an initiator which cleaves upon exposure to UV radiation, yielding a free radical immediately, which may initiate a polymerization. The first type of photoinitiator can be useful for both surface and through or bulk cure of the dispensed droplets. The first type of photoinitiator may be selected from the group including, but not restricted to: benzoin ethers, benzyl ketals, acetyl phenones, alkyl phenones, and phosphine oxides. The second type of photoinitiator, which is also referred to herein as a surface cure photoinitiator, is a photoinitiator that is activated by UV radiation and forms free radicals by hydrogen abstraction from a second compound, which becomes the actual initiating free radical. This second compound is often called a co-initiator or polymerization synergist, and may be an amine synergist. Amine synergists are used to diminish oxygen inhibition, and therefore, the second type of photoinitiator may be useful for fast surface cure. The second type of photoinitiator may be selected from the group including but not restricted to benzophenone compounds and thioxanthone compounds. An amine synergist may be an amine with an active hydrogen, and in one embodiment an amine synergist, such as an amine containing acrylate may be combined with a benzophenone photoinitiator in a resin precursor composition formulation to: a) limit oxygen inhibition, b) fast cure a droplet or layer surface so as to fix the dimensions of the droplet or layer surface, and c), increase layer stability through the curing process. In some cases, to retard or prevent free radical quenching by diatomic oxygen, which slows or inhibits the free radical curing mechanism, one may choose a curing atmosphere or environment that is oxygen limited or free of oxygen, such as an inert gas atmosphere, and chemical reagents that are dry, degassed and mostly free of oxygen.

It has been found that controlling the amount of the chemical initiator in the printed formulation is an important factor in controlling the properties of a formed advanced polishing pad, since the repeated exposure of underlying layers to the curing energy as the advanced polishing pad is formed will affect the properties of these underlying layers. In other words, the repeated exposure of the deposited layers to some amount of the curing energy (e.g., UV light, heat, etc.) will affect the degree of cure, or over curing the surface of that layer, within each of the formed layers. Therefore, in some embodiments, it is desirable to ensure that the surface cure kinetics are not faster than through-cure (bulk-cure), as the surface will cure first and block additional UV light from reaching the material below the surface cured region; thus causing the overall partially cured structure to be "undercured." In some embodiments, it is desirable to reduce the amount of photoinitiator to ensure proper chain extension and cross linking. In general higher molecular weight polymers will form with a slower controlled polymerization. It is believed that if the reaction products contain too many radicals, reaction kinetics may proceed too quickly and molecular weights will be low which will in turn reduce mechanical properties of the cured material.

In some embodiments, the resin precursor composition includes a polymeric photoinitiator and/or an oligomer photoinitiator that has a moderate to high molecular weight that is selected so that it is relatively immobile within bulk region of a dispensed droplet prior to, during and/or after performing a curing process on the droplet. The moderate to high molecular weight type of photoinitiator is typically selected such that it will not, or at least minimally, migrate within a partially cured droplet. In one example, after UV or UV LED curing a droplet that has a moderate to high molecular weight type of photoinitiator, as compared with the traditional small molecular weight photoinitiator, the polymeric and oligomeric photoinitiators will tend to be immobilized within the bulk region of cured material and not migrate to or vaporize from the surface or interfacial region of the cured material, due to the photoinitiators relatively high molecular weight. Since the moderate to high molecular weight type of photoinitiator is relative immobile within the formed droplet, the curing, composition and mechanical properties of the bulk region and the curing, composition, mechanical properties and surface properties (e.g., hydrophilicity) of the surface of the dispensed droplet will remain relatively uniform and stable. In one example, the moderate to high molecular weight type of photoinitiator may be a material that has a molecular weight that is greater than 600, such as greater than 1000. In one example, the moderate to high molecular weight type of photoinitiator may be a material that is selected from the group of PL Industries PL-150 and IGM Resins Omnipol 1001, 2702, 2712, 682, 910, 9210, 9220, BP, and TX. The immobile feature of the polymeric and oligomeric photoinitiators, in comparison to small molecular photoinitiators, will also enhance the health, safety, and environmental impact of the additive manufacturing process used to form an advanced polishing pad.

In some embodiments, a moderate to high molecular weight type of photoinitiator is selected for use in a droplet formulation such that it will not significantly alter the viscosity of the final formulation used to form the droplet that is dispensed on the surface of the growing polishing pad. Traditionally, lower molecular weight photoinitiator undesirably alter the viscosity of the formulation used to form the droplet. Therefore, by selecting a desirable moderate to high molecular weight type of photoinitiator the viscosity of the final droplet formulation can be adjusted or maintained at a level that can be easily dispensed by the deposition hardware, such as a print head, during an additive manufacturing process (e.g., 3D printing process). Some of the desirable formulations have a very low viscosity (10-12 cP at 70° C.). However, in some cases the printing hardware, such as the Connex500 printing tool, the viscosity has to be 13-17 cP at 70° C. In order to increase viscosity, oligomeric content in the formulation has to be increased. Increasing the oligomeric content will have an impact on the mechanical properties of the formed layers. Thus, if one adds a polymeric photoinitiator, it will increase viscosity automatically and will have smaller impact on the mechanical properties on the formed layer. In addition, migration of small molecule photoinitiator is a concern since it will influence the surface hydrophobicity of the formed layer, which will affect the print resolution of the formed droplets and the contact angle of the formed layer. In one example, the photoinitiator is styrene based, which is available from Synasia, IGM Resins, and PL Industries. Another example of a desirable type of moderate to high molecular weight type of photoinitiator is shown in chemical structure (PI) below.

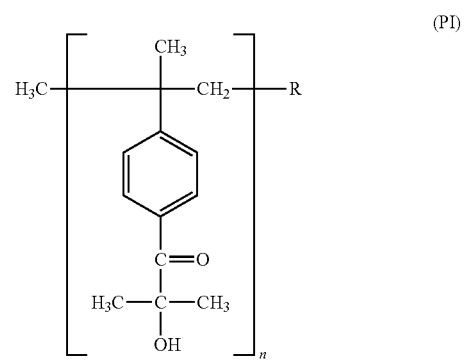

(PI)

In some embodiments, the first and second polishing elements 204 and 206 may contain at least one oligomeric and/or polymeric segments, compounds, or materials selected from: polyamides, polycarbonates, polyesters, polyether ketones, polyethers, polyoxymethylenes, polyether sulfone, polyetherimides, polyimides, polyolefins, polysiloxanes, polysulfones, polyphenylenes, polyphenylene sulfides, polyurethanes, polystyrene, polyacrylonitriles, polyacrylates, polymethylmethacrylates, polyurethane acrylates, polyester acrylates, polyether acrylates, epoxy acrylates, polycarbonates, polyesters, melamines, polysulfones, polyvinyl materials, acrylonitrile butadiene styrene (ABS), copolymers derived from styrene, copolymers derived from butadiene, halogenated polymers, block copolymers and copolymers thereof. Production and synthesis of the compositions used to form the first polishing element 204 and second polishing element 206 may be achieved using at least one UV radiation curable functional and reactive oligomer with at least one of the aforementioned polymeric and/or molecular segments, such as that shown in chemical structure (A):

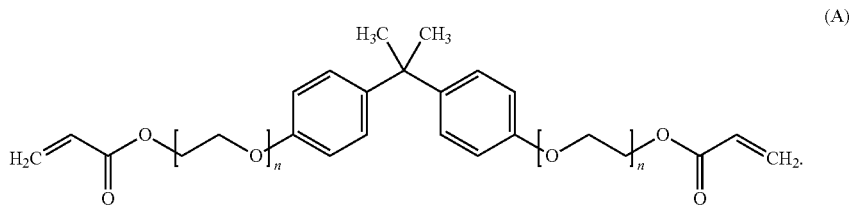

(A)

The difunctional oligomer as represented in chemical structure A, bisphenol-A ethoxylate diacrylate, contains segments that may contribute to the low, medium, and high storage modulus E' character of materials found in the first polishing element 204 and second polishing element 206 in the pad body 202. For example, the aromatic groups may impart added stiffness to pad body 202 because of some local rigidity imparted by the phenyl rings. However, those skilled in the art will recognize that by increasing the ether chain segment "n" will lower the storage modulus E' and thus produce a softer material with increased flexibility. In one embodiment, a rubber-like reactive oligomer, polybutadiene diacrylate, may be used to create a softer and more elastic composition with some rubber-like elastic elongation as shown in chemical structure (B):

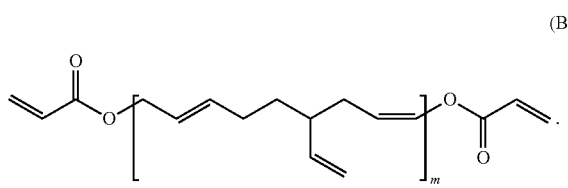

(B)

Polybutadiene diacrylate includes pendant allylic functionality (shown), which may undergo a crosslinking reaction with other unreacted sites of unsaturation. In some embodiments, the residual double bonds in the polybutadiene segment "m" are reacted to create crosslinks which may lead to reversible elastomeric properties. In one embodiment, an advanced polishing pad containing compositional crosslinks may have a percent elongation from about 5% to about 40%, and a E'30:E'90 ratio of about 6 to about 15. Examples of some crosslinking chemistries include sulfur vulcanization and peroxide, such as tert-butyl perbenzoate, dicumyl peroxide, benzoyl peroxide, di-tert-butyl peroxide and the like. In one embodiment, 3% benzoyl peroxide, by total formulation weight, is reacted with polybutadiene diacrylate to form crosslinks such that the crosslink density is at least about 2%.

Chemical structure (C) represents another type of reactive oligomer, a polyurethane acrylate, a material that may impart flexibility and elongation to the advanced polishing pad. An acrylate that contains urethane groups may be an aliphatic or an aromatic polyurethane acrylate, and the R or R' groups shown in the structure may be aliphatic, aromatic, oligomeric, and may contain heteroatoms such as oxygen.

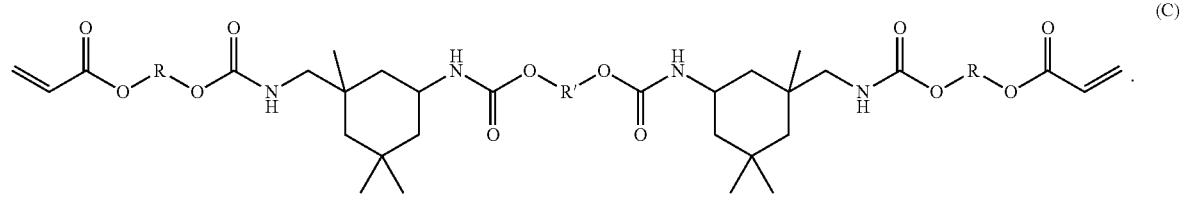

(C)

Reactive oligomers may contain at least one reactive site, such as an acrylic site, and may be monofunctional, difunctional, trifunctional, tetrafunctional, pentafunctional and/or hexafunctional and therefore serve as foci for crosslinking. FIG. 7B is a plot of stress vs. strain for some cured reactive oligomers that may be useful for creating 3D printable ink compositions. The oligomers may represent "soft" or a low storage modulus E' materials, "medium soft" or medium storage modulus E' materials, or "hard" or high storage modulus E' materials (e.g., Table 1). As shown, the storage modulus E' (e.g., slope, or $\Delta y/\Delta x$) increases from a soft and flexible and stretchable polyurethane acrylate to an acrylic acrylate, then to a polyester acrylate, and then to the hardest in the series, a hard and high storage modulus E'' epoxy acrylate. FIG. 7B illustrates how one may choose a storage modulus E' material, or a range or mixture of storage modulus E' materials, that may be useful for production of an advanced polishing pad. Functional oligomers may be obtained from a variety of sources including Sartomer USA of Exton, Pa., Dymax Corporation of Torrington, Conn., USA, and Allnex Corporation of Alpharetta, Ga., USA.

In embodiments of the disclosure, multifunctional acrylates, including di, tri, tetra, and higher functionality acrylates, may be used to create crosslinks within the material used to form, and/or between the materials found in, the first polishing element 204 and second polishing element 206, and thus adjust polishing pad properties including storage modulus E', viscous dampening, rebound, compression, elasticity, elongation, and the glass transition temperature. It has been found that by controlling the degree of crosslinking within the various materials used to form the first polishing element 204 and second polishing element 206 desirable pad properties can be formed. In some configurations, multifunctional acrylates may be advantageously used in lieu of rigid aromatics in a polishing pad formulation, because the low viscosity family of materials provides a greater variety of molecular architectures, such as linear, branched, and/or cyclic, as well as a broader range of molecular weights, which in turn widens the formulation and process window. Some examples of multifunctional acrylates are shown in chemical structures (D) (1,3,5-triacryloylhexahydro-1,3,5-triazine), and (E) (trimethylolpropane triacrylate):

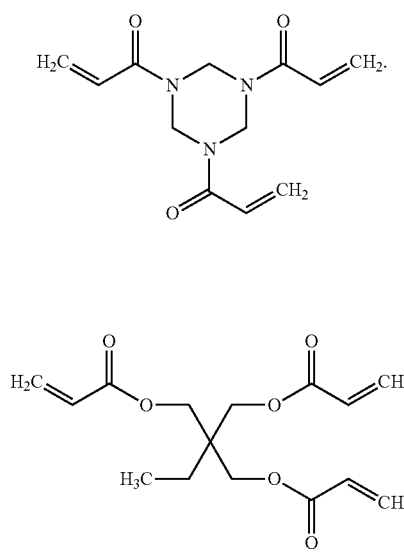

The type or crosslinking agent, chemical structure, or the mechanism(s) by which the crosslinks are formed are not restricted in the embodiments of this disclosure. For example, an amine containing oligomer may undergo a Michael addition type reaction with acrylic moiety to form a covalent crosslink, or an amine group may react with an epoxide group to create a covalent crosslink. In other embodiments, the crosslinks may be formed by ionic or hydrogen bonding. The crosslinking agent may contain linear, branched, or cyclic molecular segments, and may further contain oligomeric and/or polymeric segments, and may contain heteroatoms such as nitrogen and oxygen. Crosslinking chemical compounds that may be useful for polishing pad compositions are available from a variety of sources including: Sigma-Aldrich of St. Louis, Mo., USA, Sartomer USA of Exton, Pa., Dymax Corporation of Torrington, Conn., USA, and Allnex Corporation of Alpharetta, Ga., USA.

As mentioned herein, reactive diluents can be used as viscosity thinning solvents that are mixed with high viscosity functional oligomers to achieve the appropriate viscosity formulation, followed by copolymerization of the diluent(s) with the higher viscosity functional oligomers when exposed to a curing energy. In one embodiment, when n~4, the viscosity of bisphenol-A ethoxylate diacrylate may be about 1350 centipoise (cP) at 25° C., a viscosity which may be too high to effect dispense of a such a material in a 3D printing process. Therefore, it may be desirable to mix bisphenol-A ethoxylate diacrylate with a lower viscosity reactive diluents, such as low molecular weight acrylates, to lower the viscosity to about 1 cP to about 100 cP at 25° C., such as about 1 cP to about 20 cP at 25° C. The amount of reactive diluent used depends on the viscosity of the formulation components and the diluent(s) themselves. For example, a reactive oligomer of 1000 cP may require at least 40% dilution by weight of formulation to achieve a target viscosity. Examples of reactive diluents are shown in chemical structures (F) (isobornyl acrylate), (G) (decyl acrylate), and (H) (glycidyl methacrylate):

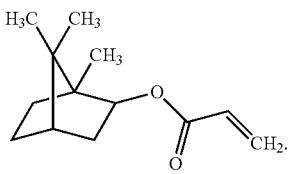

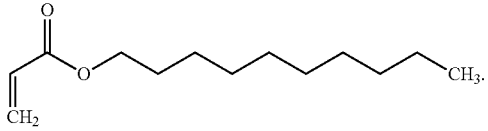

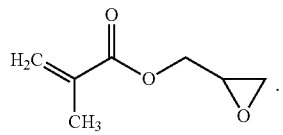

The respective viscosities of F-G at 25° C. are 9.5 cP, 2.5 cP, and 2.7 cP, respectively. Reactive diluents may also be multifunctional, and therefore may undergo crosslinking reactions or other chemical reactions that create polymer networks. In one embodiment, glycidyl methacrylate (H), serves as a reactive diluent, and is mixed with a difunctional aliphatic urethane acrylates, so that the viscosity of the mixture is about 15 cP. The approximate dilution factor may be from about 2:1 to about 10:1, such as about 5:1. An amine acrylate may be added to this mixture, such as dimethylaminoethyl methacrylate, so that it is about 10% by weight of the formulation. Heating the mixture from about 25° C. to about 75° C. causes the reaction of the amine with the epoxide, and formation of the adduct of the acrylated amine and the acrylated epoxide. A suitable free radical photoinitiator, such as Irgacure® 651, may be then added at 2% by weight of formulation, and the mixture may be dispensed by a suitable 3D printer so that a 20 micron thick layer is formed on a substrate. The layer may then be cured by exposing the droplet or layer for between about 0.1 μs to about 10 seconds, such as about 0.5 seconds, to UV light from about 200 nm to about 400 nm using a scanning UV diode laser at an intensity of about 10 to about 50 mJ/cm² to create a thin polymer film. Reactive diluent chemical compounds that may be useful for 3D printed polishing pad compositions are available from a variety of sources including Sigma-Aldrich of St. Louis, Mo., USA, Sartomer USA of Exton, Pa., Dymax Corporation of Torrington, Conn., USA, and Allnex Corporation of Alpharetta, Ga., USA.

Another method of radiation cure that may be useful in the production of polishing pads is cationic cure, initiated by UV or low energy electron beam(s). Epoxy group containing materials may be cationically curable, wherein the ring opening polymerization (ROP) of epoxy groups may be initiated by cations such as protons and Lewis acids. The epoxy materials may be monomers, oligomers or polymers, and may have aliphatic, aromatic, cycloaliphatic, arylaliphatic or heterocyclic structures; and they can also include epoxide groups as side groups or groups that form part of an alicyclic or heterocyclic ring system.

UV-initiated cationic photopolymerization exhibits several advantages compared to the free-radical photopolymerization including lower shrinkage, better clarity, better through cure via living polymerization, and the lack of oxygen inhibition. UV cationic polymerization involves an acid catalyst which causes the ring opening of a cyclic group, such as an epoxide group. Sometimes known as cationic ring opening polymerization (CROP), the technique may polymerize important classes of monomers which cannot be polymerized by free radical means, such as epoxides, vinyl ethers, propenyl ethers, siloxanes, oxetanes, cyclic acetals and formals, cyclic sulfides, lactones and lactams. These cationically polymerizable monomers include both unsaturated monomers, such as glycidyl methacrylate (chemical structure H) that may also undergo free-radical polymerization through the carbon-carbon double bonds as described herein. Photoinitiators that generate a photoacid when irradiated with UV light 225 to 300 nm) or electron beams include, but are not limited to aryl onium salts, such as iodonium and sulfonium salts, such as triarylsulfonium hexafluorophosphate salts, which may be obtained from BASF of Ludwigshafen, Germany (Irgacure® product).

In one embodiment, the material(s) used to form the first polishing element 204 and the second polishing element 206, and thus the unitary pad body 202, may be formed from the sequential deposition and cationic cure of at least one radiation curable resin precursor composition, wherein the compositions contain functional polymers, functional oligomers, monomers, and/or reactive diluents that have epoxy groups. Mixed free radical and cationic cure systems may be used to save cost and balance physical properties. In one embodiment, the first polishing element 204 and the second polishing element 206, may be formed from the sequential deposition and cationic and free radical cure of at least one radiation curable resin precursor composition, wherein the compositions contain functional polymers, functional oligomers, monomers, reactive diluents that have acrylic groups and epoxy groups. In another embodiment, to take advantage of the clarity and lack of light absorption inherent in some cationically cured systems, an observation window or CMP end-point detection window, which is discussed further below, may be formed from a composition cured by the cationic method. In some embodiments, some of the layers in the formed advanced polishing pad may be formed by use of a cationic curing method and some of the layers may be formed from a free radical curing method.

Addition Type Polymer Examples

In addition to the aforementioned acrylic free radical and cationic epoxy polymerizations, other "addition type" polymerization reactions and compounds may be useful for preparing printed polishing articles, such as CMP pads, that have a pad body 202, a first polishing element 204 and a second polishing element 206. In the process of printing of polymer layers in a polishing article, it is an advantage to use an addition type polymerization that is free of solid, liquid, or gaseous by-products. It is believed that the generation of one or more types of by-products can cause material, structural and environmental issues, such as by-product entrapment, void formation, blistering, and outgassing of potentially toxic substances. In contrast to an addition type polymerization process, a condensation polymerization reaction may produce at least one by-product, such as water or other compounds, and thus is not a desirable synthetic pathway to form a printed polishing article. Useful and alternative addition type polymerizations, in addition to the aforementioned acrylic free radical and cationic epoxy polymerizations include, but are not restricted to, thiol-ene and thiol-yne type, epoxy reactions with amines and/or alcohols, Michael addition type, ring-opening polymerization (ROP), and ring forming or Diels-Alder polymerization (DAP) type. In general, and for the purposes of this disclosure, "addition type" polymerization reactions may involve the reaction of at least one compound with another compound and/or the use of electromagnetic radiation to form a polymeric material with desirable properties, but without the generation of by-product(s). Further, a compound that undergoes an addition polymerization reaction with another compound may be also be described herein as an "addition polymer precursor component," and may also be referred to as "part A" and/or "part B" in a synthetic material formation process involving at least one addition polymer precursor component.

Importantly, the aforementioned addition polymerizations, such as thiol-ene and ROP types, may enable the tuning and manipulation of physical properties that are important in the production of printed polymer layers and polishing articles, including, but not restricted to: storage modulus (E'), loss modulus (E"), viscous dampening, rebound, compression, elasticity, elongation, and the glass transition temperature. One will note that many of the fundamental synthetic formulation and/or material formation schemes, and chemical fundamentals, previously described herein for the acrylate materials hold true for the addition polymer reactions discussed below. For example, the alternate addition polymers may contain segments that may contribute to the low, medium, and high storage modulus E' character of materials found in the first polishing element 204 and second polishing element 206 in the pad body 202. In one example, aromatic groups may impart added stiffness to the pad body 202 because of some local rigidity imparted by the phenyl rings. It is also believed that increasing the length of alkyl and/or ether chain segments of the alternate addition polymers described herein will lower the storage modulus E' and thus produce a softer material with increased flexibility. The alternate addition polymers may also contain R groups that may be aliphatic, aromatic, oligomeric, and may contain heteroatoms such as oxygen. The alternate addition polymers may also have R groups that are monofunctional, difunctional, trifunctional, tetrafunctional, pentafunctional and/or hexafunctional, and therefore serve as foci for crosslinking, the manipulation of which may produce "soft" or a low storage modulus E' materials, "medium soft" or medium storage modulus E' materials, or "hard" or high storage modulus E' materials.

Additionally, addition polymers and R groups may have water soluble groups that may contain negative and/or positive charges, or may be neutrally charged, including, but not restricted to: amides, imidazoles, ethylene and propylene glycol derivatives, carboxylates, sulfonates, sulfates, phosphates, hydroxyl and quaternary ammonium compounds. Some water soluble compounds that may be polymerized include, but are not restricted to: 1-vinyl-2-pyrrolidone, vinylimidazole, polyethylene glycol diacrylate, acrylic acid, sodium styrenesulfonate, Hitenol BC10®, Maxemul 6106®, hydroxyethyl acrylate and [2-(methacryloyloxy)ethyltrimethylammonium chloride, 3-allyloxy-2-hydroxy-1-propanesulfonic acid sodium, sodium 4-vinylbenzenesulfonate, [2-(methacryloyloxy)ethyl]dimethyl-(3-sulfopropyl) ammonium hydroxide, 2-acrylamido-2-methyl-1-propanesulfonic acid, vinylphosphonic acid, allyltriphenylphosphonium chloride, (vinylbenzyl)trimethylammonium chloride, allyltriphenylphosphonium chloride, (vinylbenzyl)trimethylammonium chloride, E-SPERSE RS-1618, E-SPERSERS-1596, Methoxy Polyethylene Glycol Monoacrylate, Methoxy Polyethylene Glycol Diacrylate, Methoxy Polyethylene Glycol Triacrylate.

In some embodiments, the addition polymers may include one or more linear polymers. Examples of these types of polymers may include, but are not limited to poly(methyl methacrylate), poly(styrene-co-methyl methacrylate), poly(styrene-co-methacrylic acid), poly(styrene-co-acrylonitrile), poly(methyl methacrylate-co-ethyl acrylate) and poly(benzyl methacrylate).

In some embodiments, a thiol-ene type addition reaction may be used to produce printed polymer layers and polishing articles such as CMP pads. Thiol-ene/thiol-yne reactions involve the addition of an S—H bond across a double or triple bond by either a free radical or ionic mechanism. Thiol-ene reactions may be thought of as the sulfur version of the hydrosilylation reaction, and may also be used produce sulfur centered radical species that undergo polymerization reactions with compounds containing unsaturated carbon-carbon bonds. Advantages of thiol-ene addition polymerizations include: no oxygen inhibition, polymerization efficiency approaching 100%, reaction with allylic groups (in addition to acrylic), and a high degree macromolecular structural control which in turn provides the ability to tune the storage or loss modulus and tan delta properties of the formed polishing article, in contrast to conventional acrylic free radical polymerization formed polishing article materials. Additionally, mixed polymerizations involving a mixture of at least one compound with acrylic and allylic groups, may be performed to broaden a material's tan delta and to adjust its mechanical properties, such as flexibility, elongation, and hardness, and to save cost and balance physical properties, such as storage modulus. For example, in one embodiment, an aliphatic allyl ether may be mixed in a 25:75 mole ratio to an acrylic ester, prior to deposition, in a single reservoir. The acrylic compounds may be used to increase modulus and crosslinking after curing, and to achieve a lower cost/mole of monomer(s), in certain regions of a polishing article.

Figure 3D:
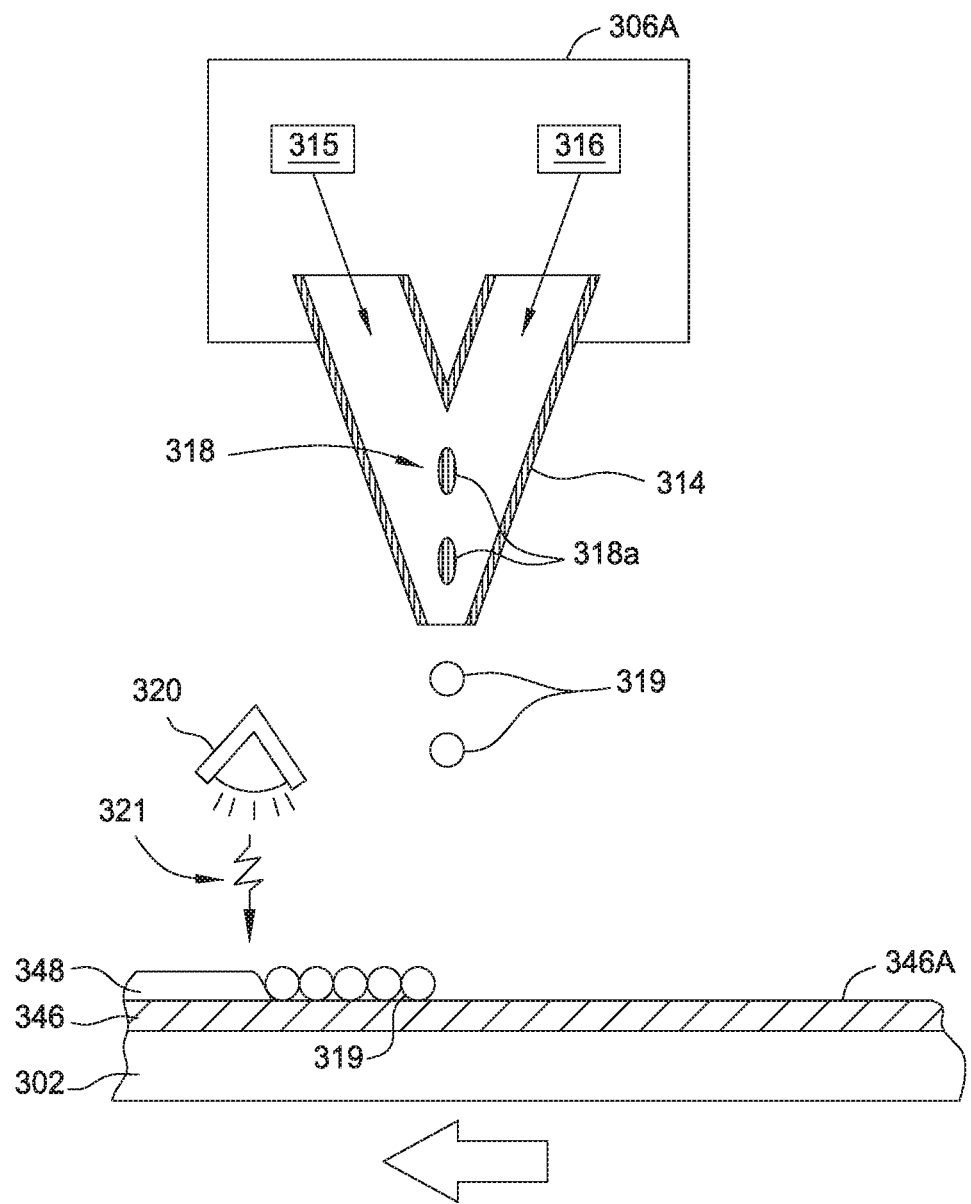
FIG. 3D is a schematic view of a nozzle assembly used in a system for manufacturing advanced polishing pads, according to an embodiment of the present disclosure.

FIG. 3D is a schematic view of a nozzle assembly that can be used to mix and dispense one or more of the resin precursor components that may contain the addition polymer precursors or compounds, such as a part A and a part B for a thiol-ene polymerization, according to an embodiment of this disclosure. As shown, the droplet ejecting printer 306A may contain a nozzle 314, and a reservoir 315 and a reservoir 316 that each deliver at least one resin precursor component to a mixing region 318. The resin precursor components delivered to the mixing region 318 are mixed at the point of use by turbulence inducing elements 318a to form one or more droplets 319 that contains a mixture of the mixed resin precursor composition. The turbulence inducing elements 318a may also include a spiral tortuous path through which the resin precursor components are mixed. In another embodiment the mixture may be premixed and contained in a single reservoir. After mixing, the droplets 319 are delivered to a surface of a substrate, such as a polishing article, as illustrated in FIGS. 3A-3B and 3D. After dispense of the mixed resin precursor components, the droplets are cured. It is noted that the containment, mixing and dispense schemes illustrated in FIG. 3D may be suitable for any of the following chemistries described herein, as for example, such as a thiol-ene polymerization used for the printing of a polishing article.

Thiol-ene addition polymerization reactions typically require UV irradiation to cure the dispensed droplet, such as UV radiation with a wavelength from between about 150 nm to about 350 nm, such as 254 nm, and with or without a photoinitiator, such as Irgacure TPO-L®, benzophenone or dimethoxyphenyl acetophenone. Examples of thiols that may be useful in producing 3D printed polymer layers by thiol-ene chemistry are: (I.) 1,3-propanedithiol, (J.) 2,2'-(ethylenedioxy)diethanethiol, and (K.) trimethylolpropane tris(3-mercaptopropionate).

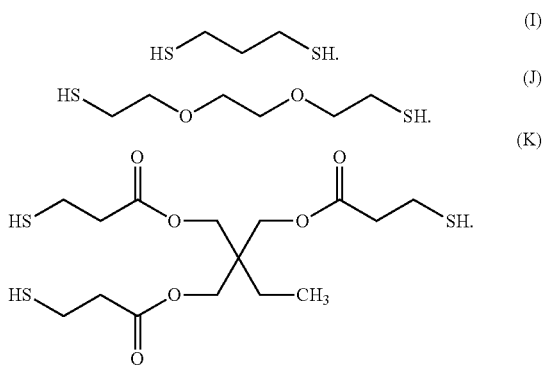

Examples of unsaturated compounds that may be useful in producing printed polymer layers by use of a thiol-ene chemistry include: (L.) 1,4-butanediol divinyl ether, (M.) 1,4-cyclohexanedimethanol divinyl ether, and (N.) 1,3,5-triallyl-1,3,5-triazine-2,4,6(1H,3H,5H)-trione.

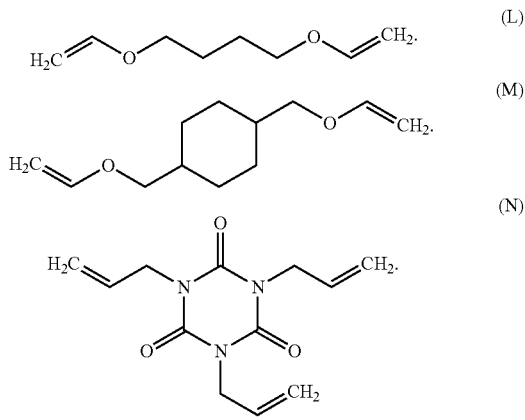

The aforementioned chemical compounds that undergo a thiol-ene polymerization reaction serve as non-limiting illustrative examples, and are not intended to restrict aspects of this disclosure or methods used herein to prepare thiol-ene addition polymers. Chemical compounds for thiol-ene polymerization reactions may be obtained from suppliers such as BASF of Ludwigshafen, Germany, Sigma-Aldrich of St. Louis, Mo., USA, and Sartomer USA of Exton, Pa.

Reactions of amines and alcohols (nucleophiles) with electron deficient carbon centers, such as those found in epoxide groups, is another type of an addition polymerization (e.g., thermoset) that may be useful for the production of printed polymer layers and polishing articles such as CMP pads. The control of crosslinking and the nature of the interchain bonds give cured epoxies many desirable characteristics. These characteristics include excellent adhesion to many substrates, high strength (tensile, compressive and flexural), chemical resistance, fatigue resistance, and corrosion resistance. Properties of the uncured epoxy resins such as viscosity, which are important in processing, as well as final properties of cured epoxies such as strength or chemical resistance, can be optimized by appropriate selection of the epoxy monomer and the curing agent or catalyst. The chemical structures of both amine and alcohol curing agents and epoxides may be varied to obtain the desired physical property such as storage modulus (E'), hardness, adhesion, flexibility and elongation. As described prior, one may also choose different degrees of functionality to achieve a desired crosslink density, and thus tune the physical properties of the formed material, such as the storage modulus (E').

In one embodiment, an amine-epoxy type addition polymerization reaction may be used to produce printed polymer layers and polishing articles by co-mixing a part A (e.g. diamine hardener) with a part B (e.g. diepoxide). This may be achieved as previously described and shown in FIG. 3D. In one embodiment, after mixing and dispensing the one or more mixed droplets, one or more amine-epoxy addition polymer layers (approximately 1-200 µm thick) may then be formed by rapidly curing the dispensed droplets to a solid state using a heat source, such as a flash xenon lamp or an IR laser. Various thermal curing accelerants may also be used for curing epoxy thermoset polymer layers to form a printed polishing article, and include, but are not restricted to: phenyl ureas, boron trichloride amine complexes, imidazoles, aliphatic bis ureas, phenols, and resorcinol. In an alternate embodiment, a one-pack thermoset formulation may be used to produce printed polymer layers and CMP pads, which are dispensed from a single reservoir. Herein, at least one diepoxide or multifunctional epoxide may be contained in a single reservoir at a certain temperature, such as 25° C., with a thermal latent initiator such as dicyanodiamide (DICY), with or without an accelerant, such as 4,4' methylene bis (phenyl dimethyl urea). Such a mixture may be stable for some period of time, such as hours (depending on the reactivity of the components), until heat is applied. As noted above, heat can be applied by use of a flash xenon lamp or an IR laser, which causes the activation of the DICY compound and cure to a solid state.

The epoxy compounds or resins may include bisphenol-F diglycidyl ether, bisphenol-A diglycidyl ether, epoxidized phenol novolac resins, epoxidized cresol novolac resins, epoxidized rubbers, epoxidized oils, epoxidized urethanes, epoxy ethers, polycyclic aliphatic epoxies, polycyclic aromatic epoxies, and combinations thereof. The epoxies may be monomeric, oligomeric, or polymeric. By judicious choice of the epoxy resin, and consideration of the chemical structure and the degree of epoxidation or epoxy functionalization, one can build a printed polishing article containing polymer layers that have moduli that can be adjusted within a desired range of values. In one embodiment, an epoxy modified polyurethane or rubber may be mixed with a low viscosity aromatic epoxide, resorcinol diglycidyl ether, to achieve a desired modulus upon amine curing at a temperature from about 25° C. to about 200° C., such as 75° C. Further examples of epoxides that may be useful in producing printed polymer layers are: (O.) resorcinol diglycidyl ether, (P.) poly(propylene glycol) diglycidyl ether, and (Q.) 4,4'-methylenebis(N,N-diglycidylaniline).

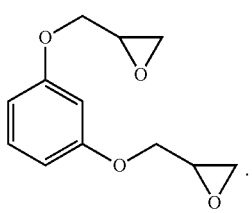
(O)

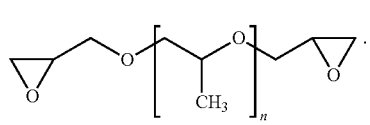
(P)

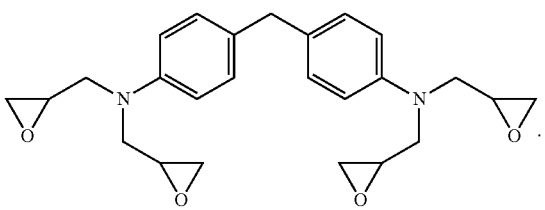
(Q)

Likewise, a number of amine compounds are available for the production of printed polymer layers and CMP pads. The amines may be monomeric, oligomeric, and polymeric in form, and contain at least one amine group per molecule, with at least one amine active hydrogen. Suitable amines include, but not restricted to: aliphatic amines, cycloaliphatic amines, polyetheramines, polyethylenimine, dendritic amines, and aromatic amines. Some examples of amines that may be useful in producing printed polymer layers are: (R.) 1,3-cyclohexanediamine, (S.) m-xylylenediamine, and (T.) Jeffamine D®.

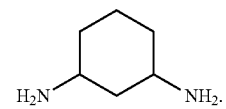
(R)

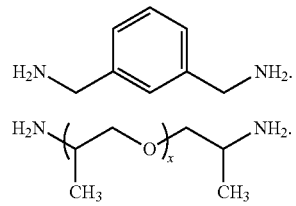
(S)

(T)

The aforementioned epoxy and amine chemical compounds that may undergo epoxy addition polymerization reactions serve as non-limiting illustrative examples, and do not restrict any aspects this disclosure or methods used herein to prepare polymer layers or polishing articles via printing processes. Chemical compounds that may undergo epoxy addition polymerization reactions may be obtained from suppliers such as BASF of Ludwigshafen, Germany, Sigma-Aldrich of St. Louis, Mo., USA, CVC Thermoset Specialties of Emerald Performance Materials, Moorestown, N.J., USA, and Huntsman Advanced Materials, The Woodlands, Tex., USA.

Multifunctional amines, such as diamines, are useful in other addition polymerization reactions. One such reaction is known as a Michael addition reaction (a 1,4-conjugate addition), in which a primary or secondary amine reacts with an electron deficient double bond. Specifically, the Michael addition is a reaction between nucleophiles and activated olefin and alkyne functionalities, wherein the nucleophile adds across a carbon-carbon multiple bond that is adjacent to an electron withdrawing and resonance stabilizing activating group, such as a carbonyl group. The Michael addition nucleophile is known as the "Michael donor", the activated electrophilic olefin is known as the "Michael acceptor", and reaction product of the two components is known as the "Michael adduct". Examples of Michael donors include, but are not restricted to: amines, thiols, phosphines, carbanions, and alkoxides. Examples of Michael acceptors include, but are not restricted to: acrylate esters, alkyl methacrylates, acrylonitrile, acrylamides, maleimides, cyanoacrylates and vinyl sulfones, vinyl ketones, nitro ethylenes, a,b-unsaturated aldehydes, vinyl phosphonates, acrylonitrile, vinyl pyridines, azo compounds, beta-keto acetylenes and acetylene esters. It is further noted that any number of different Michael acceptors and/or mixtures may be used to obtain or tune a desired physical property, such as flexibility, elongation, hardness, toughness, modulus, and the hydrophobic or hydrophilic nature of the article. For example, the Michael acceptor may be mono, di, tri, and tetra functional, and each group R may have different molecular weights, chain lengths, and molecular structures. Similarly, the Michael donor may be chosen or identified based on the aforementioned characteristics. In one embodiment, a printed polishing article may be produced using a diacrylate, 1,4-butanediol diacrylate (10.1 mmol), and a diamine, piperazine (10 mmol), as illustrated by reaction example 1.

REACTION EXAMPLE 1

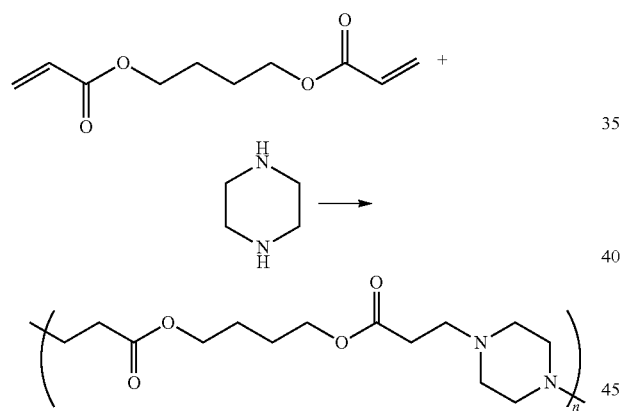

As illustrated in FIG. 3D, in one embodiment, the diacrylate and diamine, may reside in two separate reservoirs 315, 316, and then may be mixed within the mixing region 318 of a tortuous path dispense nozzle 314, and dispensed as droplets, and then thermally cured with a Xenon flash lamp to form a polymer layer.

There are a number of useful acrylates that can be used to produce a Michael addition polymer, including, but not restricted to the previously described acrylates A-H. Similarly, amines that contain at least two primary or secondary amine groups may include, but are not restricted to, the previously described amines R-T. Sources for these compounds include Sigma-Aldrich of St. Louis, Mo., USA, Sartomer USA of Exton, Pa., Dymax Corporation of Torrington, Conn., USA, Allnex Corporation of Alpharetta, Ga., USA, BASF of Ludwigshafen, Germany, and Huntsman Advanced Materials, The Woodlands, Tex., USA.

In another embodiment, a printed polishing article, may be produced using a ring opening polymerization (ROP). A ROP involves the ring opening of cyclic monomers to create linear, branched and network polymer materials. Cyclic monomers that may be useful for ROP include, but are not restricted to olefins, ethers, thioethers, amines (e.g. aziridine and oxazoline), thiolactones, disulfides, sulfides, anhydrides, carbonates, silicones, phosphazenes and phosphonites epoxides, acetals and formals, lactones and lactams. The cyclic ROP starting materials, or reagents, may be multifunctional, monomeric, oligomeric, polymeric, and branched, and may ring open by any number of mechanisms including: radical ROP (RROP), cationic ROP (CROP), anionic ROP (AROP) and ring-opening metathesis polymerization (ROMP).

In most cases, ROP polymerizations do not create undesirable by-products such as water, and may provide "dry" pathways to polymers that normally produce water by-product, such as a conventional condensation polymerization that may be produce a polycarbonate. For example, a ROP of ketene acetals may produce a useful polyester that is free of water by-product. Another example, as mentioned above, is the ROP that involves a positively charged or cationic intermediate (cationic ROP or CROP), which may produce polymers including polyacetals, copolymers of 1,3, 5-trioxaneand oxirane or 1,3,5-trioxane and 1,3-dioxolane, polytetrahydrofurans, copolymers of tetrahydrofuran and oxirane, poly (3,3-bis(chloro-methyl)oxetanes), polysiloxanes, polymers of ethyleneimine and polyphosphazenes. Other useful polymers produced by a ROP include, but are not restricted to: polycyclooctenes, polycarbonates, polynorbornenes, polyethylene oxides, polysiloxanes, polyethylenimines, polyglycolides, and polylactides.

By judicious choice of the cyclic ROP precursor chemical structure, such as ring size, side group substitution, and the degree of functionalization, one can tune the physical properties of a printed polishing article, such as a flexibility, elongation, hardness, and toughness, storage modulus (E'), and the hydrophobic or hydrophilic nature of the formed article. Examples of ROP cyclic monomers that may be useful in producing a printed polishing article include: (U.) δ-valerolactone which produces a polyester, (V.) ε-caprolactam which produces a polyamide, and (W.) 2-ethyl-2-oxazoline, which produces a polyoxazoline.

(U)

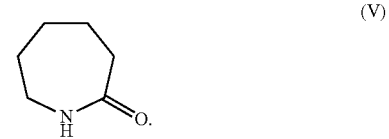

(V)

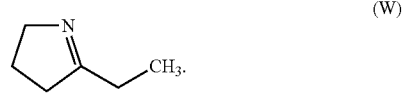

(W)

In a further embodiment of this disclosure, a Diels-Alder (DA) reaction may be used to produce a printed polishing article. The classical DA reaction is a [4+2] cycloaddition reaction between a conjugated diene and a second component ("dienophile") to give a stable cyclohexene derivative ("adduct"). The selection of the diene and dienophile can include cyclic, heterocyclic and highly substituted materials containing complex functional groups and/or protected or latent functional groups. Dienes may be understood to be any conjugated diene in which the two double bonds are separated by a single bond and the dienophiles may be compounds with a double bond that is preferably adjacent to an electron withdrawing group. The diene precursor may consist of any 5 to 8 membered ring containing a conjugated diene wherein all of the ring members are either carbon atoms or a mixture of carbon atoms with hetero atoms selected from nitrogen, oxygen, sulfur and mixtures thereof in the conjugated diene system. The ring atoms may be unsubstituted or contain electron donating substituents (e.g., alkyl, aryl, arylalkyl, alkoxy, aryloxy, alkylthio, arylthio, amino, alkyl-substituted amino, aryl-substituted amino, alkoxy-substituted amino groups and the like). The dienophile may consist of any unsaturated group capable of undergoing a DA reaction. As mentioned, the dienophile may be unsubstituted or substituted with electron withdrawing groups such as cyano, amido, carboxy, carboxy ester, nitro or aromatic rings containing electron withdrawing groups. Alternatively, the dienophile may be a double bond within a ring structure that is conjugated with one or more electron withdrawing groups. The DA reaction may also display a thermally reversible character, which allows decoupling of the adduct to occur by increasing the temperature. For purposes of this disclosure, suitable dienes and dienophiles may be any such materials capable of participating in a DA reaction that are not likely to undergo a reverse or "retro" DA reaction at temperatures likely to be encountered in a typical user's environment, such as those temperatures found during a polishing process. In one embodiment, a polishing article may recycled back to the monomers at temperatures well above those found during a polishing process.

In one embodiment, the Diels-Alder reaction may be used to produce printed polymer layers and polishing articles such as a CMP pad. As exemplified by reaction example 2, a bismaleimide compound may be reacted with a bisfuran compound to form a polymer:

REACTION EXAMPLE 2

For polymerization, a requirement of the diene and dienophile molecules is that they contain at least two diene or dienophile reactive sites, respectively, separated by one or more connecting groups. Moreover, the DA polymerization reaction products could encompass linear co-polymers, branched chain polymers or co-polymers, block co-polymers, and star or dendritic polymers. A source for diene and dieneophile compounds is Sigma-Aldrich of St. Louis, Mo., USA.

In an embodiment of this disclosure, aromatic compounds containing photoresponsive groups may be used to produce polymer layers and printed polishing articles. The photoresponsive groups may engage in a polymerization and/or the bonding of portions of a polymer and/or a greater polymer network when exposed to UV light. Reactions of this type may proceed by either a [4π+4π] or [2π+2π] cycloaddition mechanism that can be reversed upon application of an appropriate wavelength of light, if so desired. In the case of the [2π+2π] cycloaddition reaction, a photodimerisation may occur between two alkenes to form a cyclobutane dimer. Useful photoresponsive monomers, oligomers and polymers may contain photoresponsive groups including not restricted to: anthracene, cinnamic acid, coumarin, thymine, and stilbene groups, which may react by either a [4π+4π] or [2π+2π] cycloaddition mechanism. One illustrative example is reaction example 3, wherein cinnamic acid undergoes a [2π+2π] cycloaddition reaction to produce a cyclobutane group. One will note that such a bond forming reaction may be used to create polymeric materials when exposed to a UV light source or other forms of radiation of the appropriate wavelength, using multifunctional monomers and oligomers that undergo the [4π+4π] or [2π+2π] cycloaddition reactions. One example of a [4π+4π] or [2π+2π] cycloaddition reaction may include reaction example 3:

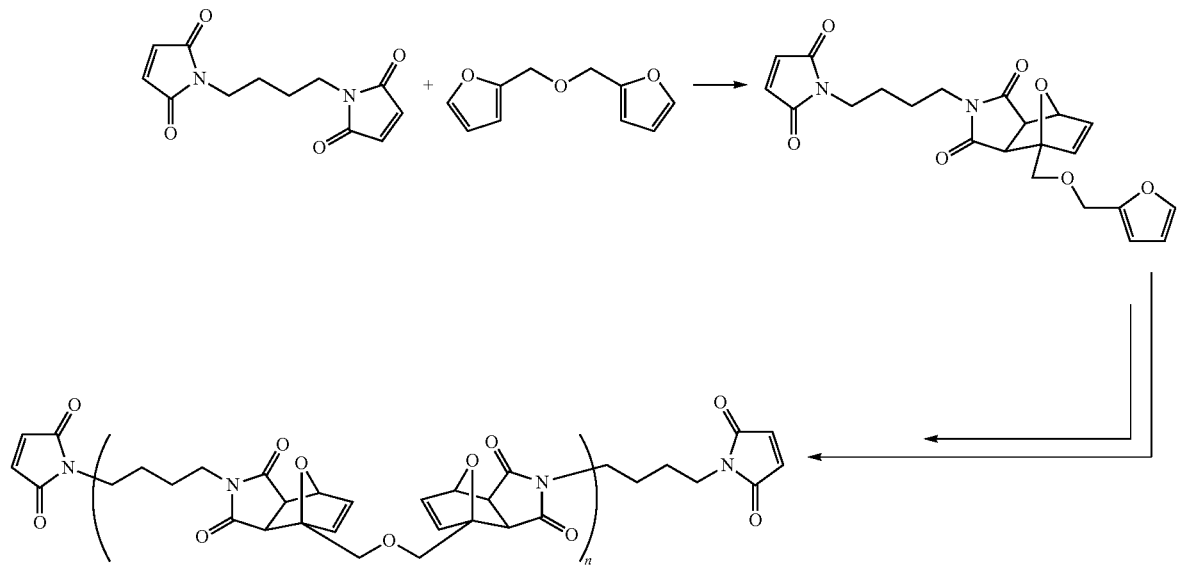

REACTION EXAMPLE 3

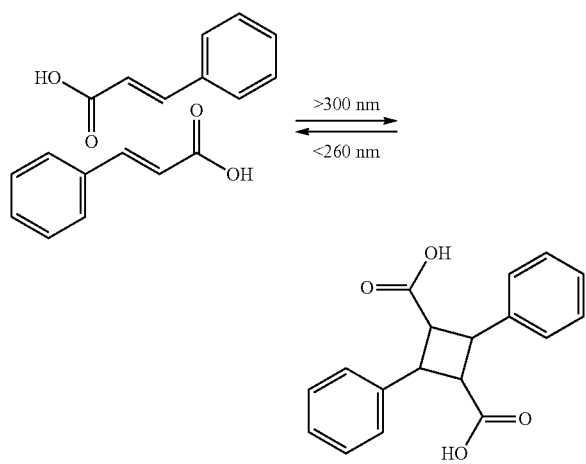

Generally, a [4π+4π] or [2π+2π] cycloaddition reaction or polymerization will initiate at a UV radiation wavelength at a radiant exposure level of between about 0.1 J/cm² and about 500 J/cm² for a period of time of between about 0.1 seconds and about 100 seconds. The UV radiation dosage and intensity may be adjusted to achieve a desired level of conversion, which may depend of film thickness and other factors. The UV radiation may be provided by any UV source, such as mercury microwave arc lamps (e.g., H bulb, H+ bulb, D bulb, Q bulb, and V bulb type lamps), pulsed xenon flash lamps, high-efficiency UV light emitting diode arrays, and UV lasers. Suitable optics may be employed, if desired, to pattern the radiation or confine exposure only to desired areas. The UV radiation may have a wavelength between about 170 nm and about 500 nm. A useful range of temperatures for the photoreactions may be from about −25° C. to about 25° C. Sources for these compounds include Sigma-Aldrich of St. Louis, Mo., USA.

In another embodiment of this disclosure, benzocyclobutene (BCB) compounds are may be used to produce printed polishing article, such as a CMP pad. Benzocyclobutene compounds are thermally polymerizable monomers which contain at least one BCB group per molecule. As shown in reaction example 4, the first equilibrium step involves the thermally activated ring opening of the BCB four-membered ring, to afford the highly reactive o-xylylene ($k_1/k_2$). This reactive intermediate then readily undergoes a [2π+4π] DA reaction ($k_3$) to form a polymer.

REACTION EXAMPLE 4

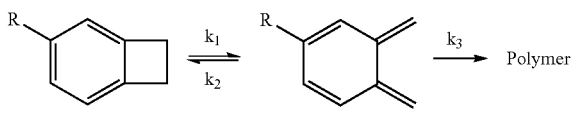

Depending upon their functionality, BCBs can be polymerized to yield either thermoset or thermoplastic materials, and may be cured using any suitable method after droplet dispense, such as an xenon flash lamp or an IR laser. The polymers typically exhibit good thermal stability and retention of mechanical properties at temperatures found in a polishing process. Those skilled in the art will appreciate that the chemical structures of BCBs may be varied to obtain the desired physical property such as storage modulus (E'), hardness, adhesion, flexibility and elongation which are most suited to a polishing article. Sources for BCB compounds include Sigma-Aldrich of St. Louis, Mo., USA and Dow Chemical Company of Midland, Mich., USA (Cyclotene).

Typically, formulations that are used to form the more rigid materials within an advanced polishing pad, form materials that often do not possess a desired level of elongation when a load is applied during the normal use of the advanced polishing pad. In some embodiments, to resolve this problem it may be desirable to introduce an elastomeric material to the formulation and thus cured material, so that the elongation of the formed material can be increased while maintaining a desired tensile strength. In some cases, these improved materials can be achieved by use of polyurethane oligomeric methacrylate based materials in combination with acrylic monomers. In an effort to prevent any degradation in the ability to cure the dispensed new formulation, Exothene type of materials may be used.

Interpenetrating Polymer Networks

As discussed above, the additive manufacturing processes described herein enable specific placement of material compositions with desired properties in specific pad areas of the advanced polishing pad, so that the properties of the deposited compositions can be combined to create a polishing pad that has properties that are an average of the properties, or a "composite" of the properties, of the individual materials. In another aspect of this disclosure, it has been discovered that the average of the properties, or a "composite" of the properties may be uniquely tuned or adjusted within a layer, and/or layer by layer, by the creation or a production of an "interpenetrating polymer network" of materials within a layer, or layer by layer, by judicious choice of resin precursor components selected from, but not restricted to those materials in Table 3 or other related resin precursor components described herein.

An interpenetrating polymer network (IPN) may be defined as a blend of two or more polymers in a network with at least one of the polymers synthesized in the presence of another. This may produce a "physically crosslinked" network wherein polymer chains of one polymer are entangled with and/or penetrate the network formed by another polymer. Each individual network retains its individual properties, so that synergistic improvements in properties including E'30, E'90, E'30/E'90, strength, toughness, compression and elongation may be realized. An IPN may be distinguished from a polymer blend in the way that an IPN may swell but may not dissolve in solvents, and wherein material creep and flow are suppressed. In some cases, because of the intimate polymer entanglement and/or network structures, IPNs may be known as "polymer alloys", by which polymer blends can be made chemically compatible and/or well mixed to achieve the desired phase morphology and associated properties. An IPN can be distinguished from the other multiple systems or networks through their multi-continuous structure ideally formed by the physical entanglement or interlacement of at least two polymers that are in intimate physical contact, but may or may not be chemically bonded to one another.

In embodiments of this disclosure, IPNs are used to tune and adjust the properties of polishing pads to create a desired composite of properties within a layer and/or layer by layer, such as those properties including E'30, E'90, E'30/E'90, strength, toughness, compression, and elongation. In some embodiments a polymer may be added to the formulation mixture or mixture of resin precursor components from between about 1% by weight to about 50% by weight, such as between about 5% by weight to about 25% by weight, and about 10% by weight. Importantly, the molecular weight, chain length and branching of the polymer may play a role in the weight percent of polymer due to such factors that include polymer miscibility and mixture viscosity. For example, a linear polymer may create a more viscous mixture than a branched polymer. In some embodiments, the polymer in the pre-cured mixture may be inert to UV light and may not participate in a polymerization with other functional resin precursor components such as monomers or oligomers. In other embodiments, the added polymer may contain chemical functionality or groups, such as acrylic groups and epoxy groups that may engage in a polymerization with resin precursor components such as monomers or oligomers. In this disclosure we do not restrict the method of IPN synthesis, nor do we restrict the types of resin precursor components or polymers used to create the IPNs.

In further embodiments of this disclosure, an IPN may be created in which a linear polymer may be trapped within a growing crosslinked network that may be produced from the UV photopolymerization of resin precursor components such as monomers or oligomers. In one case, the properties of a linear polymer (e.g. elongation) may be maintained within an IPN that also contains a hard crosslinked material that may have low elongation, thereby creating a "composite" or average of the overall properties. Depending on the continuity, distribution, and weight or mole percent the soft, medium hard, or hard phases or materials therein, IPNs may exhibit a wide range of properties, such as reinforced rubber-like properties to hard high impact plastic properties. In some embodiments of this disclosure, polishing pads containing IPNs may be produced with high flexibility, elongation (e.g. 100% to 400%), and toughness (≥2 Mpa). In some embodiments, IPNs are produced that contain a polymer such as poly(butyl methacrylate-co-methyl methacrylate) (A3 of Table 3), that may be used to increase the elongation of a polishing pad while maintaining the appropriate tensile strength. Some experiments representing these embodiments are presented in Table 8. Item 1 of Table 8 serves as an experimental control without the A3 polymer (non-IPN), and items 2-3 represent IPNs produced under different conditions that involve increasing the weight percent of A3 in the IPN. The results demonstrate the utility of IPNs use in polishing pads. The tensile-elongation results shown in this table are according to ASTM D638 tensile test methodology.

TABLE 8

| Item No. | Material Composition (See Table 3 Ref. Name) | Formulation Composition (wt %) | Viscosity (cP) 70° C. | Tensile Strength (Mpa) | Elongation (%) | Elastic Recovery |
|---|---|---|---|---|---|---|
| 1 | O8:A3:M2:P5 | 10:0:90:2 | 4.5 | 0.60 | ~100 | Yes |
| 2 | O8:A3:M2:P5 | 10:5:85:2 | 9.4 | 1.5-1.9 | 162-211 | Yes |
| 3 | O8:A3:M2:P5 | 10:10:80:2 | 25.5 | 1.5-2.0 | 283-350 | Yes |

In further embodiments of this disclosure, IPNs may be formed using two or more polymer materials that form parts of the pad body 202, such as a blended material that includes urethane, ester, thiol-ene, and epoxy polymers. It is believed that mixtures of urethane acrylates and epoxy polymers that contain less than 5% epoxy will produce a material in which the epoxy polymer acts as a plasticizer for the urethane acrylate network. However, it is believed that mixtures of urethane and epoxy polymers that contain more than 5% epoxy will produce a material, where the epoxy polymer will interlace with the urethane acrylate networks which will affect the formed material's mechanical properties, such as % elongation, hardness and ultimate tensile strength. Other examples of materials that can be used to form IPNs include poly(methyl methacrylate), poly(butyl methacrylate), poly(isobutyl methacrylate), poly(butyl methacrylate-co-methyl methacrylate), polystyrene, poly(styrene-co-α-methylstyrene), poly(tert-butyl acrylate-co-ethyl acrylate-co-methacrylic acid), poly(benzyl methacrylate).

In some embodiments, the formulation mixture or mixture of resin precursor components may contain from between about 5% and about 50% of a thermoplastic polymer that is fully dissolved into the formulation that is dispensed by the deposition hardware, such as a print head, during an additive manufacturing process (e.g., 3D printing process). It is believed that a thermoplastic polymer containing formulation, after photo curing, will tend to form polymers that are interlaced with thermoplastic polymers to form an interpenetrating polymer network. In one example, the thermoplastic polymers used to form the IPNs include linear chained polymers, such as polyurethane, polyester, polyether, polystyrene, polyacrylate, polymethacrylates, polyethylene, polypropylene, PEEK, PEKK. The addition of the thermoplastic polymers to form IPNs will tend to improve the mechanical performance of cured materials including storage modulus, loss modulus, tensile strength, elongation, and flexibility. Since the incorporation of methacrylate polymer chains during UV curing with methacrylate monomers is very difficult, a pre-polymerized methacrylate monomer can be easily introduced into the droplet formulation by dissolution of this linear polymer.

In some embodiments, the additive manufacturing process may alternatively or also include the use of an inkjetable resin precursor composition that includes 20-70% oligomers/monomers that are photo-curable and 30-80% of oligomers/monomers that are thermally curable (e.g., annealed) post printing. The photo curable part is mostly acrylate (polyester/polyether) based formulations and the thermal curable part includes blocked isocyanates with diols that allow the deblocking of the group at the elevated annealing temperatures resulting in the reaction of isocyanate with diol to form a urethane, such as in the reaction example:

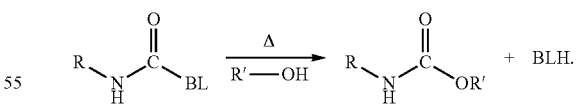

Examples of deblocking groups include phenols, oximes and caprolactams that have a de-blocking temperature of 170° C., 140° C. and 170° C., respectively. Other examples of blocked isocyanates include isocyanatoethyl (meth)acrylate blocked with phenol or diethyl oxime, which are prepared from isocyanatoethyl (meth)acrylate with either the addition of phenol or diethyl oxime. It is believed that these types of resin precursor compositions will allow a highly selective network to be formed unlike most current photocurable inks that have selectivity based on the energy budget provide by the delivery of the electromagnetic radiation (e.g., UV light). Therefore, the mechanical properties of the formed material using these resin precursor compositions can be better controlled or tailored by controlling the desired formulation composition to meet the desired needs of the components within the advanced polishing pad.

In one embodiment, the printed polymer layers may contain inorganic and/or organic particles that are used to enhance one or more pad properties of selected material layers found in the formed advanced polishing pad 200. Because the 3D printing process involves layer by layer sequential deposition of at least one composition per layer, it may also be desirable to additionally deposit inorganic or organic particles disposed upon or within a pad layer to obtain a certain pad property and/or to perform a certain function. The inorganic or organic particles may be in the 1 nanometer (nm) to 100 micrometer (µm) range in size and may be added to the precursor materials prior to being dispensed by the droplet ejecting printer 306 or added to an uncured printed layer in a ratio of between 1 and about 50 weight percent (wt %). The inorganic or organic particles may be added during the advanced polishing pad formation process to improve the ultimate tensile strength, improve yield strength, improve the stability of the storage modulus over a temperature range, improve heat transfer, adjust a surfaces zeta potential, and/or adjust a surface's surface energy. The particle type, chemical composition, or size, and the added particles may vary by application or desired effect that is to be achieved. In some embodiments, the particles may include intermetallics, ceramics, metals, polymers and/or metal oxides, such as ceria, alumina, silica, zirconia, nitrides, carbides, or a combination thereof. In one example, the inorganic or organic particles disposed upon, over or within a pad may include particles of high performance polymers, such PEEK, PEK, PPS, and other similar materials to improve the mechanical properties and/or thermal conductivity of the advanced polishing pad. The particles that are integrated in a 3D printed polishing pad may also serve as foci for crosslinking, which may lead to a higher storage modulus E' depending on a percent by weight loading. In another example, a polymer composition containing polar particles, such as ceria, may have a further affinity for polar materials and liquids at the pad surface, such as CMP slurries.

Advanced Polishing Pad Properties

An advantage of forming an advanced polishing pad 200 that has a pad body 202 that includes at least a first polishing element 204 and a second polishing element 206 is the ability to form a structure that has mechanical, structural and dynamic properties that are not found in a pad body that is formed from a single material composition. In some embodiments, it is desirable to form a polishing body 202 that includes at least one region in which the first polishing element 204 is disposed over and supported by a portion (e.g., portion 212A in FIG. 2A) of the second polishing element 206. In this configuration, the combination of the properties of the two materials and structural configuration can be used to form an advanced polishing pad that has desirable mechanical, structural and dynamic properties, and improved polishing performance over conventional polishing pad designs.

Materials and chemical structure of the materials in the first polishing element(s) 204 and/or the second polishing element(s) 206 may be selected to achieve a "tuned" bulk material by use of the aforementioned chemistries. An advanced polishing pad 200 formed with this "tuned" bulk material has various advantages, such as improved polishing results, reduced cost of manufacturing, and elongated pad life. In one embodiment, an advanced polishing pad 200, when measured as a whole, may have a hardness between about 25 shore A to about 75 shore D, a tensile strength of between 5 MPa and about 75 MPa, an elongation at break of between about 5% and about 350%, a shear strength of above about 10 MPa, and a storage modulus E' modulus between about 5 MPa and about 3000 MPa.

As discussed above, materials having different mechanical properties may be selected for use in the first polishing element 204 and/or second polishing element 206 to achieve an improved polishing result on a polished substrate. The mechanical properties, such as storage modulus E' of the material(s) found in the formed first polishing element 204 and/or second polishing element 206, may be created by selecting different materials, material compositions and/or choosing different post deposition processing steps (e.g., curing processes) used during the polishing element forming process. In one embodiment, the second polishing element 206 may have a lower hardness value and a lower value of storage modulus E', while the first polishing element 204 may have a higher hardness value and a higher value of storage modulus E'. In another embodiment, storage modulus E' may be adjusted within each polishing element 204, 206 and/or at various different locations across the polishing surface of the polishing pad. In one embodiment, the first polishing elements 204 may have a hardness of about 40 Shore D scale to about 90 Shore D scale. The second polishing element 206 may have a hardness value between about 26 Shore A scale to about 95 Shore A scale. The first polishing element 204 and second polishing element 206 may each include different chemical compositions that are co-mingled and chemically bonded together at multiple boundaries within the unitary pad body 202.

In some embodiments, the hardness, storage modulus E' and/or loss modulus E" of the material(s) used to form the first polishing elements 204 and the second polishing elements 206 are each configured to improve one or more polishing process parameters and/or the lifetime of the polishing pad. In some configurations, the hardness, storage modulus E' and/or loss modulus E" of the material(s) used to form the first polishing elements 204 and the second polishing elements 206 within the advanced polishing pad are configured to provide an improved polishing rate and polishing uniformity (e.g., WiW uniformity, WtW uniformity). It has been found that by controlling the hardness of the second polishing elements 206, which are positioned to support the first polishing elements as generally shown in FIGS. 1F-1G, 2A and 2C, can greatly help improve the polishing uniformity and polishing rate of the formed advanced polishing pad. FIGS. 6A-6B generally illustrate the effect of varying material hardness of a polishing element within an advanced polishing pad (i.e., Samples 1, 2 and 3) that has a structure that is similar to the advanced polishing pad construction illustrated in FIG. 2A. FIG. 6A illustrates a plot of polishing rate versus the effect of varying the material hardness of similarly configured second polishing elements of an advanced polishing pad (e.g., Samples 1, 2 and 3). One will note that the advanced polishing pad structure used to collect the illustrated data included a similarly configured first polishing element 204 (e.g., materials and structural shape) in each sample, while the material properties (e.g., hardness) of the second polishing elements 206 were varied by adjusting the material composition ratio of the droplets of a hard material formulation to droplets of a soft material formulation within the second polishing elements 206. In these examples, the first polishing elements 204 used in each sample were formed such that they had a hardness that was greater than the hardness of the second polishing elements 206, and had a Shore D hardness of about 80 and storage modulus of between about 1700 and 2000 MPa. As illustrated in FIG. 6A, one will note that Samples 2 and 3, which had an 80 Shore A hardness and a 70 Shore A hardness and a 13 MPa storage modulus and a 5 MPa storage modulus, respectively, had relative high average material removal rates compared to Sample 1, which had a 90 Shore A hardness and 43 MPa storage modulus. However, as illustrated in FIG. 6B, Sample 3 had the highest polishing rate uniformity versus Samples 1 and 2. Advanced polishing pads that exhibit high polishing rate non-uniformities, such as Samples 1 and 2 versus Sample 3, will cause the final polishing results on the substrate to be non-uniform. Therefore, in some embodiments, it is desirable to adjust the material composition ratio in one or more layers within the second polishing elements 206 to achieve a hardness that is less than a 90 Shore A hardness. In some configurations, the material composition ratio in one or more layers within the second polishing elements 206 are adjusted to achieve a hardness that is less than an 80 Shore A hardness, such as less than a 70 Shore A hardness, or less than a 60 Shore A hardness, or less than a 50 Shore A hardness, or even less than a 40 Shore A hardness. In some configurations, the material composition ratio in one or more layers within the second polishing elements 206 are adjusted to achieve a hardness that is between a 10 Shore A hardness and a 80 Shore A hardness, such as between a 10 Shore A hardness and a 70 Shore A hardness, or even between a 20 Shore A hardness and a 60 Shore A hardness. In some alternate embodiments, it may be desirable to vary the resin precursor composition of at least one of the formulations used to form the second polishing elements 206 to adjust the hardness of the material that forms the second polishing elements 206.

For the purposes of this disclosure, and without intending to limit the scope of the disclosure provided herein, materials having desirable low, medium, and/or high storage modulus E' properties at temperatures of 30° C. (E'30) and 90° C. (E'90) for the first polishing elements 204 and the second polishing elements 206 in an advanced polishing pad 200, are summarized in Table 2:

TABLE 2

| | Low Storage Modulus Compositions | Medium Storage Modulus Compositions | High Storage Modulus Compositions |
|---|---|---|---|
| E'30 | 5 MPa-100 MPa | 100 MPa-500 MPa | 500 MPa-3000 MPa |
| E'90 | <17 MPa | <83 MPa | <500 MPa |

In one embodiment of an advanced polishing pad 200, a plurality of first polishing elements 204 are configured to protrude above one or more second polishing elements 206, so that during a polishing process the surface of a substrate 110 is polished using the polishing surface 208 of the first polishing elements 204. In one embodiment, to assure that a desirable planarity, polishing efficiency, and reduced dishing during a bulk material polishing step it is desirable to form the first polishing elements 204, which contact the surface of the substrate during the polishing process, with a material that has a high storage modulus E', such as defined in Table 2. However, in one embodiment, to assure that a desirable planarity, polishing efficiency, and reduced dishing during a buffing or residual material clearing step it may be desirable to form the first polishing elements 204, which contact the surface of the substrate during the polishing process, with a material that has a low or medium storage modulus E'.

In some embodiments, the storage modulus of the first polishing elements 204 is adjusted to minimize the effect of pad glazing, which cause the polishing process removal rates to reduce over time in the absence of a process of abrading the glazed surface of the used polishing pad (i.e., pad conditioning). It is believed that pad glazing is caused by the plastic deformation of the materials that contact the surface of the substrate, which is inversely proportional to the shear modulus (G') as shear forces on the pad surface cause the "cold flow" or plastic deformation of the contacting material. For an isotropic solid, the shear modulus is generally related to the storage modulus by the following equation: $G'=E'/2(1+v)$, where v is Poison's ratio. Thus, the materials used to form the first polishing elements 204 that have a low shear modulus, and thus storage modulus, would have a faster rate of plastic deformation and thus formation of glazed areas. Therefore, it is also desirable to form the first polishing elements 204 with a material that has a high storage modulus E' and/or hardness, as defined above.

To assure that a glazed surface of a polishing pad can be rejuvenated by use of a pad conditioning process, it is also desirable for the material(s) used to form the first polishing elements 204 to have desirable tensile strength and percent elongation at fracture. In some embodiments, the ultimate tensile strength (UTS) of the material used to form the first polishing elements 204 is between about 250 psi and 9,000 psi. It is believed that the higher the UTS of the material used to form the first polishing elements 204 the more durable and less particulate formation prone the polishing pad material will be before, during or after performing the pad conditioning process. In one example, the UTS of the material used to form the first polishing elements 204 is between about 5,000 psi and about 9,000 psi. In some embodiments, the elongation at fracture of the material used to form the first polishing elements 204 is between about 5% and 200%. It is believed that the lower the elongation at fracture of the material used to form the first polishing elements 204 the less deformable the material will be, and thus the easier to maintain the surface micro-texture or asperities which allow for abrasive capture and slurry transport. In one embodiment, the elongation at fracture of the material used to form the first polishing elements 204 that is configured to touch the polished surface of a substrate is adjusted to be between about 5% and about 40%.

There is a need to also provide a polishing pad that has desirable dampening properties to reduce the elastic rebound of a pad during polishing, which can cause dishing and other negative attributes relating to the cyclic deformation of the pad during processing. Therefore, to compensate for the need for a high storage modulus E' material to contact the surface of the substrate during polishing, the second polishing element 206, which is positioned to support the first polishing element 204, is formed from a material that has lower storage modulus E'.

Figure 7A:
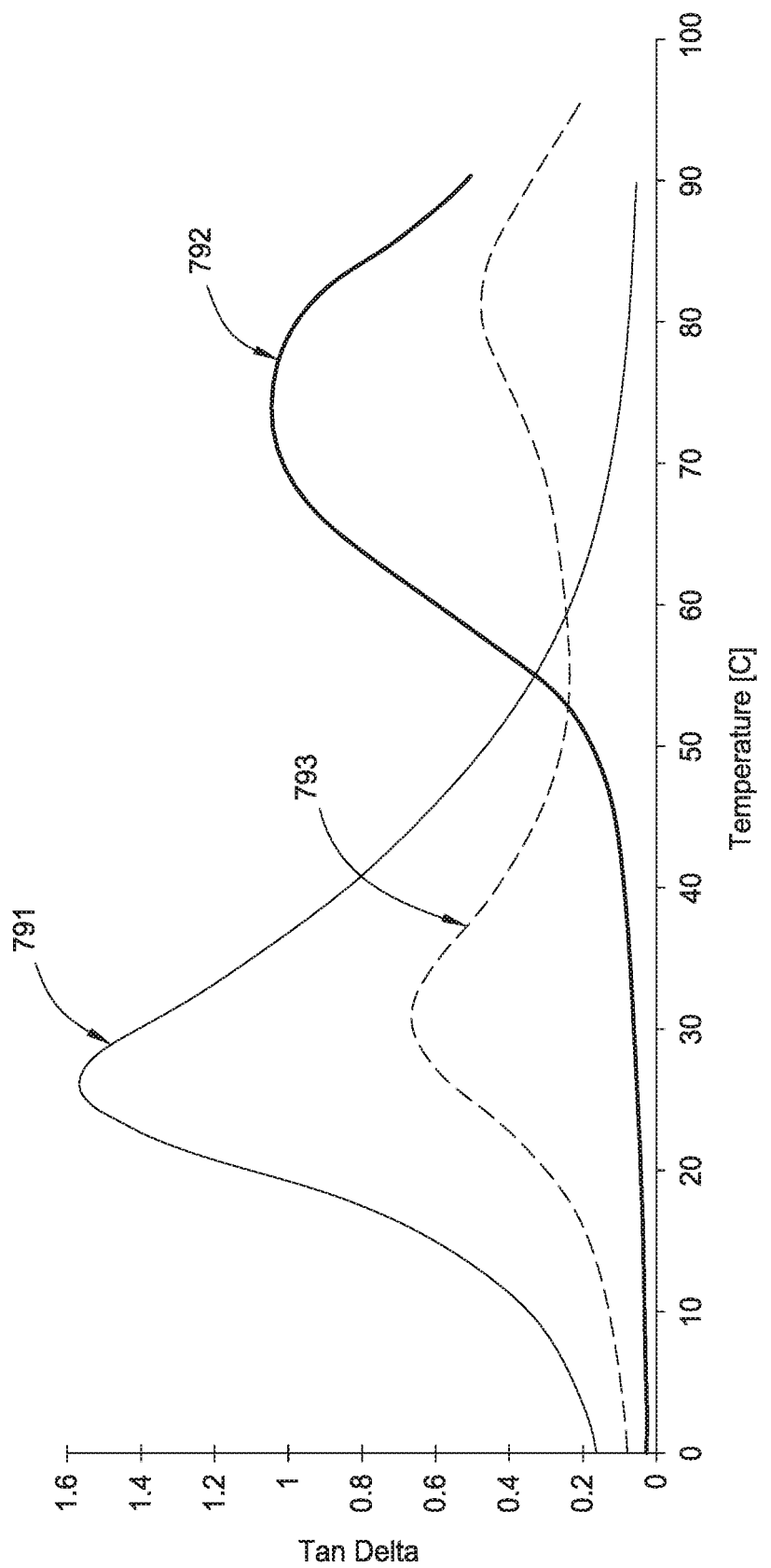
FIG. 7A illustrates a plot of tan delta versus temperature for various materials and an advanced polishing pad, according to an embodiment of the present disclosure.
Figure 7B:
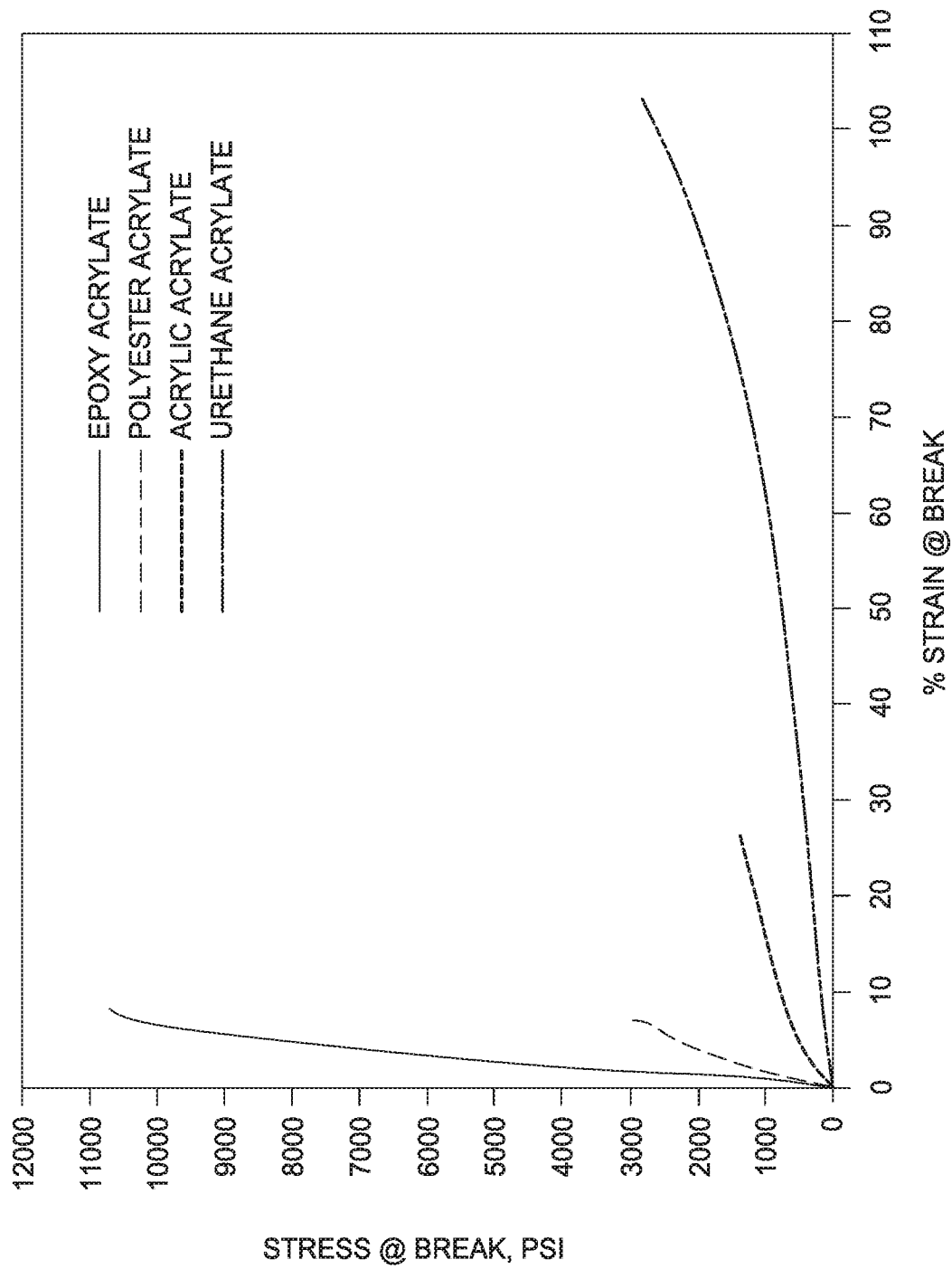
FIG. 7B illustrates a plot of stress versus strain for materials that can be used in an advanced polishing pad, according to an embodiment of the present disclosure.

In one example, an advanced polishing pad 200 may include the tan δ properties illustrated in FIG. 7A. FIG. 7A includes tan δ data (1 Hz, ramp rate 5° C./min) for a first polishing pad material (e.g., curve 791), a second polishing pad material (e.g., curve 792), and an advanced polishing pad configuration (e.g., curve 793) that contains regions that include either the first polishing pad material (e.g., soft material) or the second polishing pad material (e.g., hard material). As illustrated, the tan δ data contains separate and discrete tan δ peaks for the first and second materials, as shown by curves 791 and 792. In contrast the tan δ peaks for the advanced polishing pad material, curve 793, are broadened and coalesced, which is indicative of molecular scale mixing, chain entanglement, chemical bonding and/or a compositional gradient between the first polishing pad material, such as found in a second polishing element 206, and the second polishing pad material, such as found in a first polishing element 204. It has been found that a tan δ maximum of between about 0.1 and about 3 between a temperature of 30° C. and 90° C. is useful to minimize the amount of dishing, planarization efficiency and other related polishing non-uniformity.

Figure 7C:
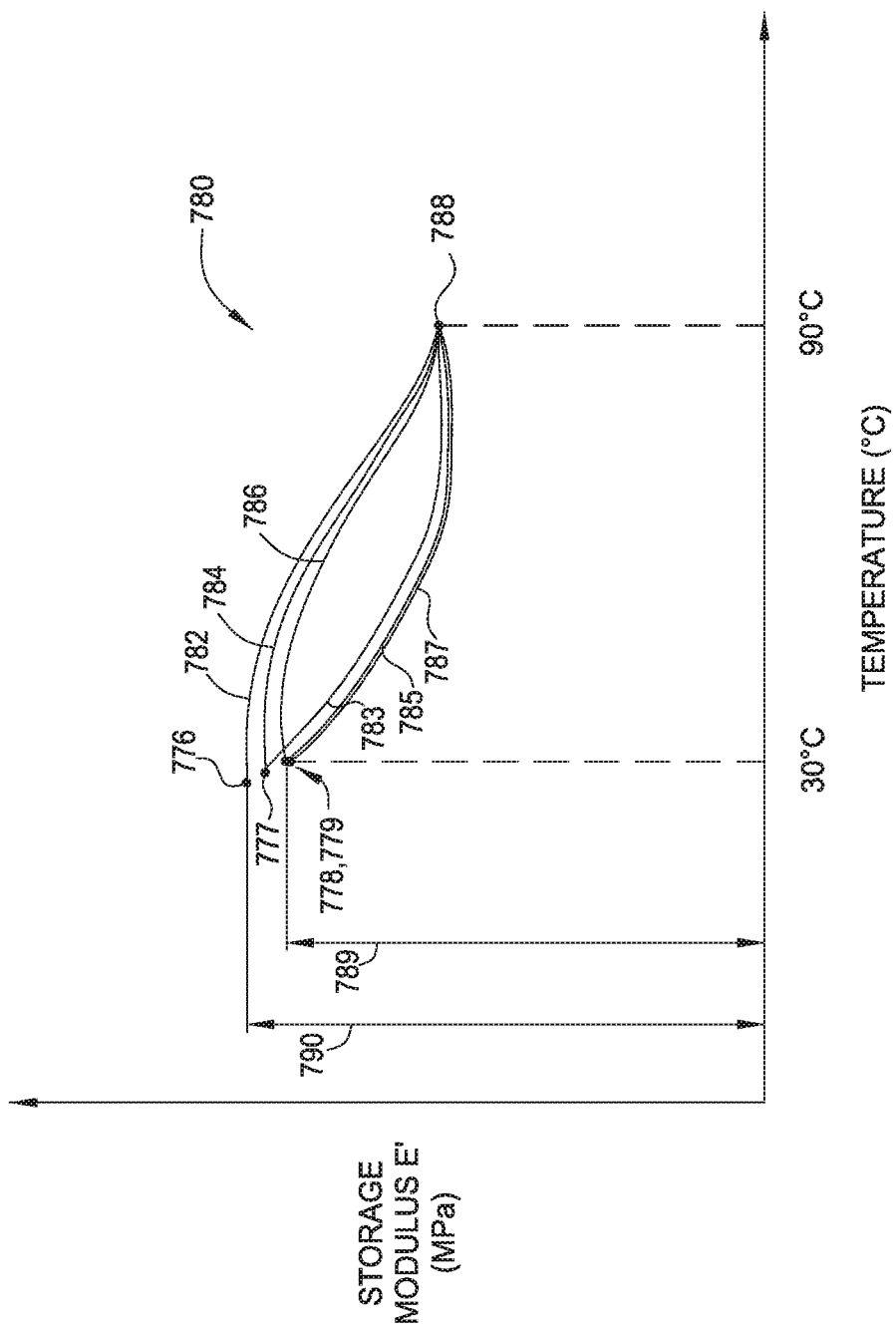
FIG. 7C illustrates a plot of the change in storage modulus versus temperature for pad materials that are subjected to cyclical processing in polishing system, according to an embodiment of the present disclosure.

In an effort to further control process repeatability, another parameter that can be controlled in an advanced polishing pad is a pad material's "recovery." FIG. 7C illustrates a plot of storage modulus E' as a function of temperature taken over a number of simulated polishing cycles for a material that may form part of the first polishing elements 204 or the second polishing element 206. The plot 780 includes a plurality of curves that measure the drop in storage modulus E' from an initial starting storage modulus value 776 as the polishing pad heats up from a starting temperature of about 30° C. to a final steady state polishing temperature about 90° C. (e.g., storage modulus value 788), and as the pad cools down from about 90° C. to a final temperature about 30° C. during each polishing cycle. For illustration purposes and clarity of discussion the plot in FIG. 7C illustrates data for three polishing cycles, which includes a first polishing cycle that includes curves 782 and 783, a second polishing cycle that includes curves 784 and 785 and a third polishing cycle that includes curves 786 and 787. As shown in FIG. 7C, at the end of each cycle 777-779 there is a drop in the measured storage modulus due to relaxation of the stress found in the polishing pad material and/or at least partial reconfiguration of bonding structure of the polymeric materials that likely occurs at the higher polishing temperatures when a higher load is applied during the polishing process. How well a material recovers after a number of successive cycles is known as a material's ability to "recover." Recovery is typically measured as a percentage of the drop in the magnitude of a property of a material (e.g., storage modulus) from the starting point 776 to a stable equilibrium point 779 that is measured at the same point in a polishing cycle. Recovery can be calculated by measuring the ratio of the ending value 789 to the starting value 790 times a hundred. To assure polishing process stability, it is generally desirable for the recovery of the materials in a polishing pad to be as large as possible, and thus it is believed that the recovery needs to be at least greater than 50%, or even greater than or equal to about 70% using a dynamic mechanical analysis (DMA) test that is configured to simulate a CMP process. In one example, the DMA test is between about 5-10 minutes long, such as about 8 minutes long, and the maximum temperature ramp rate is about 5° C./min, which is intended to simulate a standard CMP process. The DMA test is used to emulate pad heating which takes place on the polisher due to friction between the substrate, slurry, retaining ring, and polishing pad. Heat tends to build up through the polishing run and is then rapidly quenched between substrate processing steps, due to normal fluid convection or conduction of heat away from the pad. In some embodiments, to assure the polishing pad has a desirable recovery, and thus assure that the polishing process is stable, it is desirable to adjust the composition of the precursor formulation and/or curing process parameters to control the stress in the formed layer and/or degree of cross linking. In some embodiments, it may also be desirable to thermally treat, plasma treat, chemically treat and/or expose the surface of the advanced polishing pad to electromagnetic radiation to improve a surface and/or a bulk material property prior to use in a polishing process. In example, it may be desirable to thermally treat portions of the advanced polishing pad, such as thermally treating at least a portion of the advanced polishing pad after forming each partially cured layer, or forming multiple partially cured layers, or even after forming the complete advanced polishing pad.

Figure 6C:
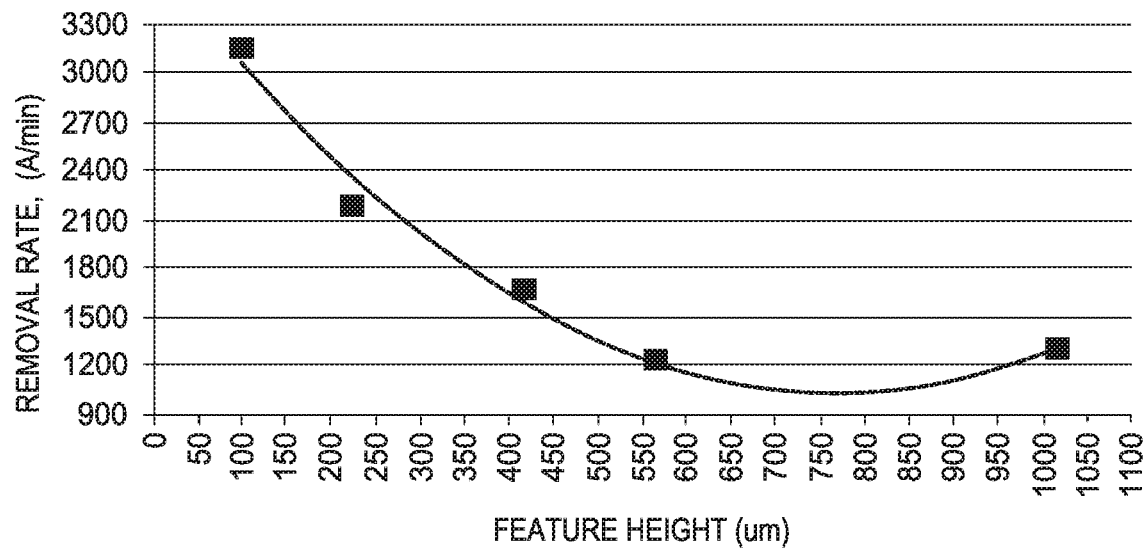
FIG. 6C illustrates a plot of polished material removal rate versus feature height of a polishing pad, according to an embodiment of the present disclosure.
Figure 6D:
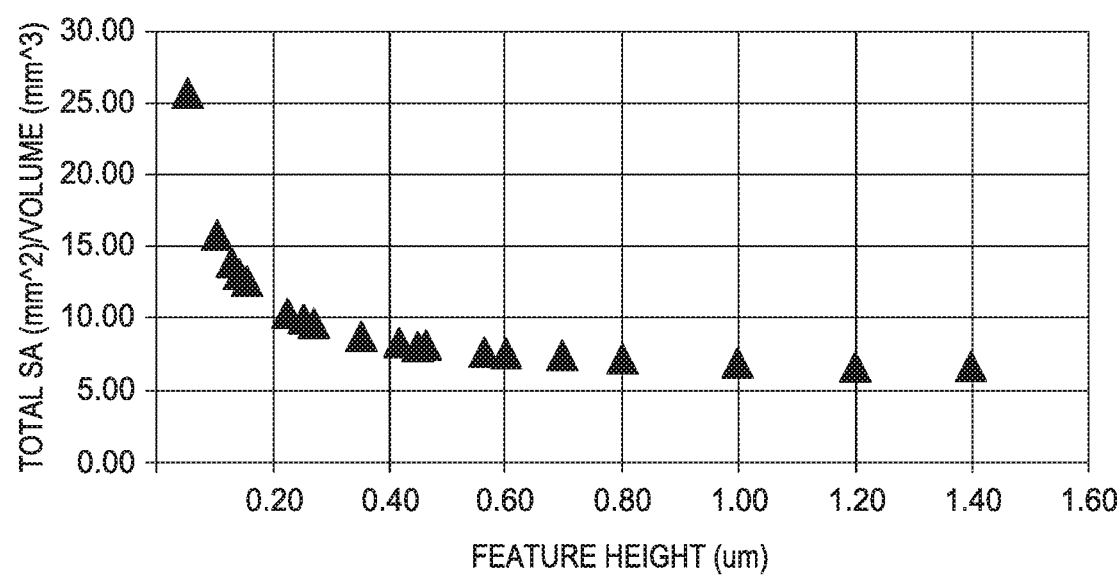
FIG. 6D illustrates a plot of surface area to volume ratio versus feature height of a polishing pad, according to an embodiment of the present disclosure.
Figure 6E:
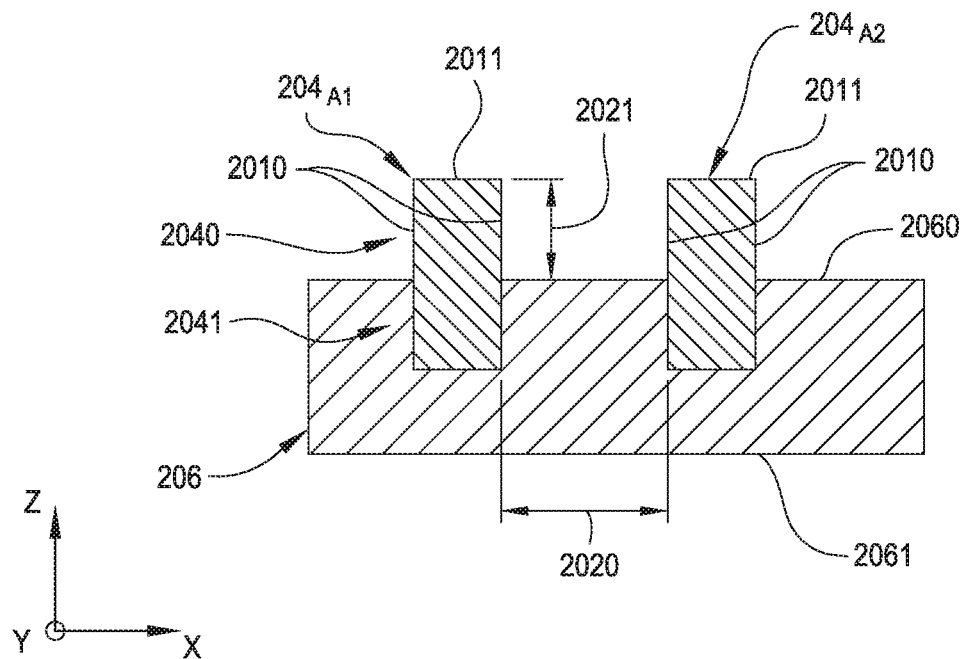
FIG. 6E is a schematic cross-sectional view of a polishing pad according to an embodiment of the present disclosure.
Figure 6F:
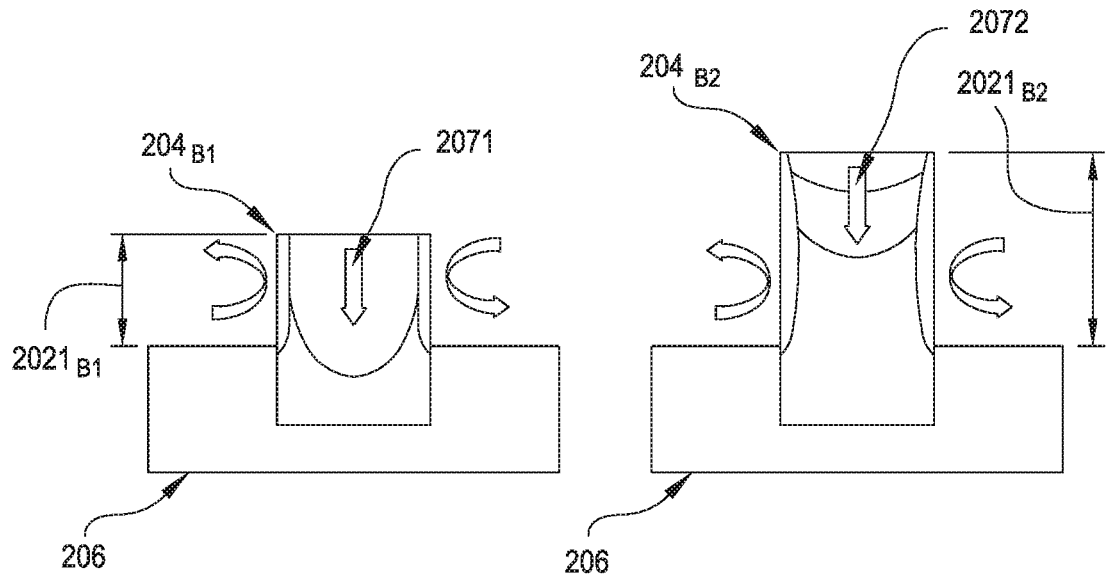
FIG. 6F is a schematic cross-sectional view of a polishing pad according to an embodiment of the present disclosure.

Referring to FIGS. 6E-6F, it has been found that the structural configuration of the first polishing elements 204 relative to the second polishing elements 206 can also be used to control polishing process repeatability and improve the polishing rate of a polishing process. One such structural configuration relates to the relative physical layout of the first polishing elements 204 to the second polishing elements 206 in a formed advanced polishing pad, and is known herein as the total exposed surface area to volume ratio (SAVR) of the first polishing elements 204 within a formed advanced polishing pad. It is believed that by adjusting the total exposed surface area to volume ratio by controlling the relative physical layout of the first polishing elements 204 relative to the second polishing elements 206 and the mechanical properties (e.g., thermal conductivity, hardness, loss modulus, polishing contact area, etc.) of the materials used to form the first polishing elements 204 and/or the second polishing elements 206, the polishing process repeatability and substrate polishing rate can, along with other polishing parameter, be greatly improved. In one example, the mechanical properties of the material(s) within the first polishing elements 204 include a thermal diffusivity ($m^2/s$) that is less than about 6.0 E-6, such as between about 1.0E-7 and 6.0E-6 $m^2/s$.

FIG. 6E illustrates two first polishing elements $204_{A1}$ and $204_{A2}$ that are supported by a second polishing element 206, such that a portion of the each of the first polishing elements $204_{A1}$ and $204_{A2}$ is embedded within a portion of the second polishing element 206. The second polishing element 206 has a base surface 2061 which is supported by components in a polishing tool (not shown). The embedded region of the first polishing element is generally described herein as being an unexposed portion 2041 and the portion of the first polishing elements that is not embedded within the second polishing element 206 is referred to herein as the exposed portion 2040. Each of the first polishing elements $204_{A1}$ and $204_{A2}$ have a feature height 2021 that extends from the surface 2060 of the second polishing element 206 to the top surface 2011 of each first polishing element 204. The first polishing elements $204_{A1}$ and $204_{A2}$, which are formed within an array of first polishing elements, have a spacing 2020 that may be constant or vary within the X-Y plane depending on the configuration of the advanced polishing pad. In some embodiments, as illustrated in FIGS. 2A and 2F-2K the spacing 2020 within the array may be oriented in a radial direction (e.g., X-Y plane) and an arc direction (e.g., X-Y plane), and may be constant or vary in one or more of these directions, as discussed above.

Structurally the first polishing elements $204_{A1}$, $204_{A2}$ each have an exposed surface that includes a portion of the sides 2010 that is above the surface 2060 of the second polishing element 206 and a top surface 2011, on which a substrate is placed during polishing. In one example, first polishing elements, which are configured similarly to the first polishing elements illustrated in FIG. 2A, have a total surface area that varies depending on the radial position of each of the first polishing elements (e.g., concentric rings of differing diameters). Whereas, in another example, for the first polishing elements that are configured similarly to the first polishing elements illustrated in FIG. 2C, the total exposed surface area of each first polishing element may not vary from one first polishing element to the next. In general, the total exposed surface area (TESA) of each first polishing element 204 includes the substrate contact area (SCA), which is the area of the top surface 2011, and the total exposed side-wall area of the first polishing element, which is the sum of the areas of the exposed portions of each of the sides 2010. One will note that the total surface contact area, which is generally the area that a substrate contacts as it is being polished, is the sum of all of the areas of the top surfaces 2011 of all of the first polishing elements 204 in an advanced polishing pad. However, the percent contact area is the total contact area of the first polishing elements 204 divided by the total pad surface area of the polishing pad (e.g., $\pi D^2/4$, where D is the outer diameter of the pad). The volume (V) of a first polishing element, is generally the total internal volume of a first polishing element 204, such as, for example, the volume of a cylinder for the first polishing elements 204 illustrated in FIG. 2C. However, the total exposed surface area to volume ratio (SAVR) for first polishing elements 204 (e.g., SAVR=TESA/V), which have a similar cross-sectional shape, such as have the same radial width (e.g., width 214 in FIG. 2A) or feature size (e.g., length 208L in FIG. 2C), embedded depth within the second polishing element 206 and polishing element height, will generally have the same total exposed surface area to volume ratio for each of the first polishing elements 204 in the array used to form the advanced polishing pad.

FIG. 6F illustrates two first polishing elements $204_{B1}$ and $204_{B2}$ that are each supported by separate second polishing elements 206, and have differing feature heights $2021_{B1}$, $2021_{B2}$. During a polishing process, the friction created between the top surface of each of the first polishing elements $204_{B1}$ and $204_{B2}$ and the respective substrates, generates a heat flux 2071 or a heat flux 2072 that are conducted away from the top surface of each of the first polishing elements $204_{B1}$ and $204_{B2}$. In general the heat fluxes 2071, 2072 will be similar if the surface properties of the top surface 2011 and polishing parameters used to polish the substrate remain the same for each of these configurations. However, it has been found that the exposed surface area and volume of the first polishing elements $204_{B1}$ and $204_{B2}$ has an effect on the polishing process results, due in part to a difference in temperature that is achieved in differently configured first polishing elements $204_{B1}$ and $204_{B2}$ during normal polishing. An increase in process temperature will generally cause degradation in the mechanical properties of the polymer containing material(s) used to form each of the differently configured first polishing elements $204_{B1}$ and $204_{B2}$. Moreover, one will note that higher polishing temperatures generally increase the polishing rate of the polishing process, and variations in the polishing process conditions from one substrate to the next is generally undesirable for most polishing processes.

Referring to FIG. 6F, convective heat transfer created by the movement of the polishing slurry relative to the exposed surfaces of the first polishing elements $204_{B1}$ and $204_{B2}$ will remove at least a portion of the heat generated during the polishing process. Typically, the polishing slurry is at a temperature below the normal temperature of the top surface (e.g., contact surface) of the first polishing elements $204_{B1}$ and $204_{B2}$ during polishing. Therefore, at least due to: 1) the difference in difference in the exposed surface area, which affects the ability of the differently configured first polishing elements to exchange heat with the slurry, 2) the difference in the insulating effect of the second polishing material 206 due to the difference in feature heights, and 3) the difference in mass (e.g., volume) of the first polishing elements, the polishing process results will be different for the first polishing element $204_{B1}$ and the first polishing element $204_{B2}$. FIG. 6C illustrates the effect of feature height 2021 on the removal rate for a first polishing element during a standard polishing process. As illustrated in FIG. 6F, material removal rate will increase as the feature height is reduced. FIG. 6D illustrates the effect of feature height 2021 on the total exposed surface area to volume ratio. It is believed that the structural and thermal effects created by the difference in the total exposed surface area to volume ratio of the formed first polishing elements leads to the difference in the polishing process results for each of the differently configured first polishing elements (e.g., different feature height 2021) illustrated in FIG. 6C.

One will note that due to the need to "pad condition" the polymer containing polishing pads, the act of abrading the top surface 2011 of the first polishing elements will decrease the feature height 2021 over the lifetime of the polishing pad. However, the variation in feature height 2021 will cause the total exposed surface area to volume ratio, and thus cause the polishing process results, to vary as the advanced pad is abraded by the pad conditioning process. Therefore, it has been found that it is desirable to configure the first polishing elements 204 in an advanced polishing pad, such that the total exposed surface area to volume ratio remains stable over the life of the polishing pad. In some embodiments, the total exposed surface area to volume ratio of the first polishing elements 204, which are partially embedded within a second polishing element 206, are designed to have a total exposed surface area to volume ratio of less than 20 per millimeter ($mm^{-1}$). In another example, the total exposed surface area to volume ratio of less than 15 $mm^{-1}$, such as less than 10 $mm^{-1}$, or even less than 8 $mm^{-1}$.

In some embodiments, the first polishing elements 204 in an advanced polishing pad are designed such that the total exposed surface area to volume ratio is within a stable region, for example the SAVR is less than 20 $mm^{-1}$, and a porosity of the first polishing element 204 is added and/or controlled so that the slurry retention at the top surface 2011 is desirably maintained. It has been found that the addition of porous features to the surface of the first polishing elements 204 can also be used to stabilize the temperature variation in the formed first polishing elements 204 from wafer to wafer, as similarly found by adjusting the total exposed surface area to volume ratio. In one example, the porosity of the formed first polishing element is formed such that the thermal diffusivity ($m^2/s$) of the material is between about 1.0E-7 and 6.0E-6 $m^2/s$. The pores within the first polishing element 204, can have an average pore size of about 50 nm or more, such as about 1 μm to about 150 μm, and have a void volume fraction of about 1% to about 50%.

Figure 6H:
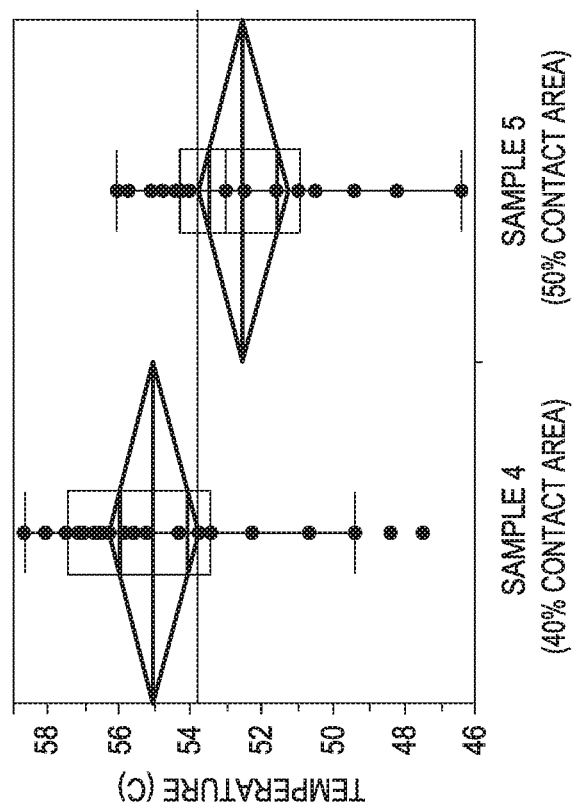
FIG. 6H illustrates a plot of polishing pad temperature versus percent contact area of the first polishing elements formed in an advanced polishing pad, according to an embodiment of the present disclosure.
Figure 6G:
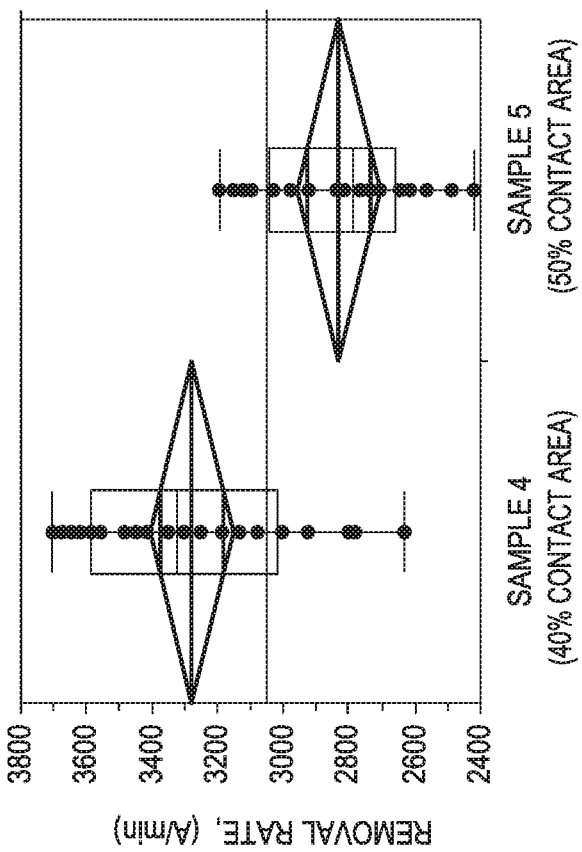
FIG. 6G illustrates a plot of polished material removal rate versus percent contact area of the first polishing elements formed in an advanced polishing pad, according to an embodiment of the present disclosure.

Another advanced polishing pad structural configuration that can be used to control polishing process repeatability and improve the polishing rate of the polishing process includes the substrate contact area (SCA) of the first polishing elements 204 in a formed advanced polishing pad. In general, substrate contact area is area that a substrate contacts as it is being polished, is the sum of all of the areas of the top surfaces 2011 of all of the first polishing elements 204 in an advanced polishing pad. However, the percent contact area is the total surface contact area of the first polishing elements 204 divided by the total pad surface area of the polishing pad (e.g., $\pi D^2/4$, where D is the outer diameter of the pad). FIG. 6G illustrates a plot of the polished material removal rate versus percent contact area of the first polishing elements (Samples 4 and 5) formed in an advanced polishing pad. FIG. 6H illustrates a plot of the average polishing process temperature versus percent contact area of the first polishing elements (Samples 4 and 5) formed in an advanced polishing pad. As illustrated in FIG. 6G, by changing the contact area percentage of an advanced polishing pad from 50% to 40% can change the median material removal rate from about 3000 angstroms per minute to about 3300 angstroms per minute, or a 10% increase in material removal rate. As illustrated in FIG. 6H, by changing the contact area percentage of an advanced polishing pad from 50% to 40% can change the median processing temperature from about 53° C. to about 56° C., or a 6% increase in process temperature. Therefore, in some configurations, the percent contact area of the first polishing elements 204 are adjusted to achieve a percent contact area that is less than an 40%, such as less than 35%, or less than 30%, or less than 25%, or even less than a 20%. In some configurations, the percent contact area of the first polishing elements 204 is adjusted so that it is between 1% and 40%, such as between 10% and 40%, or between 10% and 30%, or between 10% and 20%.

It is also believed that to maintain optimal polishing uniformity and polishing performance on a substrate, the E'30:E'90 ratio of the pad materials should be controlled and adjusted as needed. To that end, in one embodiment, the E'30:E'90 ratio of the one or more of the formed pad materials (e.g., material used to form first polishing element 204), and/or the overall advanced polishing pad 200, may be greater than or equal to 6, such as between about 6 and about 15. The polishing pad may have a stable storage modulus E' over a temperature range of about 25° C. to about 90° C. such that storage modulus E' ratio at E'30/E'90 falls within the range between about 6 to about 30, wherein E'30 is the storage modulus E' at 30° C. and E'90 is the storage modulus E' at 90° C. Polishing pads that have an E'30:E'90 ratio that is 6 or higher are useful to reduce scratch type defects often created when using high storage modulus E' materials at temperatures that are below steady state processing temperatures seen during normal processing. In other words, as the temperature rises in the materials, which are in contact with the substrate during processing, the materials will tend to soften a larger extent than materials having a lower E'30:E'90 ratio, which will thus tend to reduce the possibility of scratching the surface of the substrate. The material softening through the polish process can impact the substrate-to-substrate stability of the process in unfavorable ways. However, high E'30:E'90 ratio materials may be useful where the initial portion (e.g., 10-40 seconds) of a polish process needs a high storage modulus in the polishing surface materials, and then as the temperature continues to increase to levels in which the polishing surface materials become compliant, the polishing surface materials finish the polishing process in a buff or scratch reducing mode.

In some embodiments, it is desirable to control the thermal conductivity of various sections of the advanced polishing pad to allow for the control one or more aspects of the polishing process. In one embodiment, it is desirable to increase the thermal conductivity of the overall advanced polishing pad in a direction normal to the polishing surface, such as the Z-direction in FIGS. 1A-2K. In this example, the increased thermal conductivity in the Z-direction, over traditional polishing pad formulations, allows the polishing pad surface temperature to be maintained at a lower temperature, due the ability to more easily conduct the heat generated at the polishing pad surface during processing to the large thermal mass and/or often cooled polishing platen on which the advanced polishing pad is positioned. The reduced polishing process temperature will reduce the polishing process variability often seen when polishing a first substrate in a batch of substrates versus the last substrate in the batch (e.g., $25^{th}$ substrate), and reduce the degradation of material properties often found in polymeric materials (e.g., storage modulus E', E' ratio, etc.) over the batch of substrates. Alternately, in some embodiments, it is desirable to reduce the thermal conductivity of the overall advanced polishing pad in a direction normal to the polishing surface, such as the Z-direction in FIG. 1A. In this case, the reduced thermal conductivity in the Z-direction, over traditional polishing pad formulations, allows the polishing pad surface temperature to rapidly rise to an equilibrium processing temperature during polishing, due the reduced ability of the polishing pad to conduct the heat generated at the polishing pad surface during processing to the polishing platen on which the advanced polishing pad is positioned. The often higher, but more stable, polishing process temperatures can also be used to reduce the polishing process variability often seen when polishing a first substrate in a batch of substrates versus the last substrate in the batch (e.g., $25^{th}$ substrate).

Therefore, in some embodiments, it is desirable to add one or more fillers, particles or other materials to the first polishing elements 204 and/or second polishing element(s) 206 during the formation process to adjust the thermal conductivity of the advanced polishing pad 200 in the any direction (e.g., X, Y or Z-directions) within the polishing pad by use of one or more of the additive manufacturing process described herein. The thermal conductivity of polymers has been traditionally enhanced by the addition of thermally conductive fillers, including graphite, carbon black, carbon fibers, and nitrides, so a polishing pad formulation and composition may contain thermally conductive particles and compounds such as a metal nitride material, such as boron nitride (BN) or aluminum nitride (AlN), to increase the thermal conductivity of a polishing pad. For example, a conventional polishing pad without a thermally conductive filler may have a thermal conductivity of about 0.1 W/m·K to about 0.5 W/m·K at 25° C. In one embodiment, boron nitride, with a thermal conductivity of about 250 W/m·K is added to a polishing pad, at about 10 wt % based on formulation. The layers containing boron nitride may be deposited at and/or near the pad surface that contacts the substrate being polished, and that may be subjected to the most heating due to frictional polishing forces generated during polishing. In one embodiment, the additional boron nitride particles increased the thermal conductivity of the polishing pad from about 10% to about 25%, and thus increased the life of the polishing pad by about two times. In another embodiment, polymer layers at or near the polishing surface, such as first polishing element 204, may contain particles that aid in the removal of substrate metals and/or metal oxides.

In one embodiment, a percent by weight of silica particles in the surface layers may be from about 0.1% to about 30% by weight of formulation, such as 10% by weight, and by which may increase the Shore hardness and modulus of such a coating from about 10% to about 50%. In one embodiment, the particle surface may be chemically modified so that the particles may be well mixed and/or suspended in a 3D polishing pad ink, and thus more easily dispensed, without phase separation. Chemical modifications include the chemical binding of surfactant like molecules to the polar surface of a particle by a "coupling agent, such as a silane coupling agent. Other coupling agents that may be useful include titanates and zirconates. The chemical binding, coupling, or attachment of a coupling agent to a particle may occur by chemical reactions such as hydrolysis and condensation. Coupling agents and related chemical compounds described herein are available from a number of sources, including Gelest Incorporated of Morrisville, Pa., USA, and Sigma-Aldrich Chemical Company, of St. Louis, Mo., USA.

The process of controlling and/or tuning the formed advanced polishing pad material's mechanical performance, such as modulus, tensile strength, elongation, flexibility, and compressibility, will also depend on the additive manufacturing process's photo-curing kinetic control and manipulation, including governing oligomer/monomer steric hindrance and oxygen concentration. The kinetics of photo-curing (photo-polymerization) is of significance for additive manufacturing of an advanced polishing pad. Polymerization kinetics can be strongly influenced by 1) the molecular steric hindrance of ink oligomers and monomers and 2) the oxygen inhibition wakening free radical activity.

For the steric hindrance, a strong steric hindrance reduces the photo-curing kinetics and thus the curability of materials formed during an additive manufacturing process, which can allow tuning of the mechanical performance. In some cases the resin precursor composition contain oligomers and monomers that are designed to increase steric hindrance to improve a formed material's mechanical performance, such as by blending methacrylate based oligomers and/or monomers with acrylate based oligomers and/or monomers. In other words, the elongation of materials formed by an additive manufacturing process can be controlled by managing ratios of methacrylate based oligomers and/or monomers to acrylate based oligomers and/or monomers. Examples of methacrylate based oligomers are shown below, which include difunctional oligomer methacrylates (X1) and trifunctional oligomer methacrylates (X2).

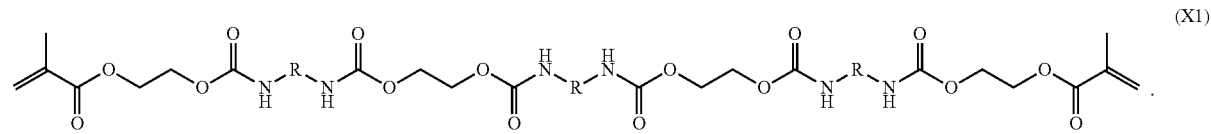

(X1)

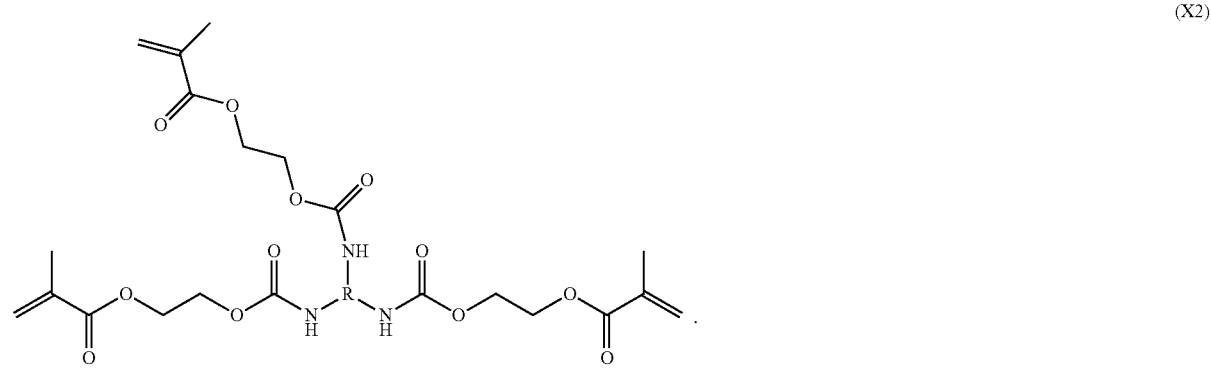

(X2)

Examples of acrylate based oligomers are shown below, which include difunctional oligomer acrylates (Y1) and trifunctional oligomer acrylates (Y2).

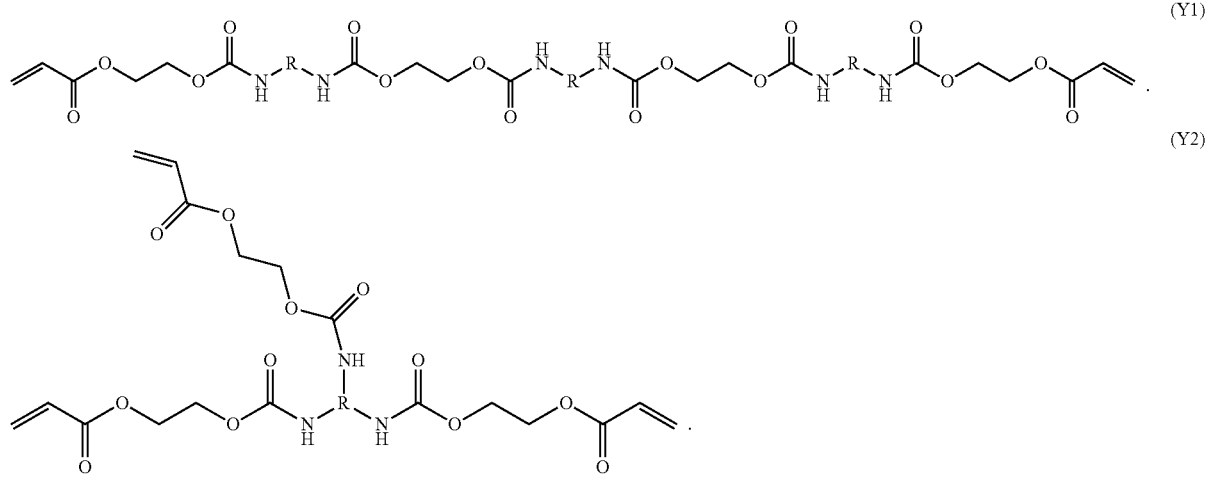

(Y1)

(Y2)

Moreover, specific examples of acrylate based and methacrylate based oligomers and monomers, may include methacrylate based materials SR203 and SR423A and acrylate based materials SR285 and SR506A available from Sartomer.

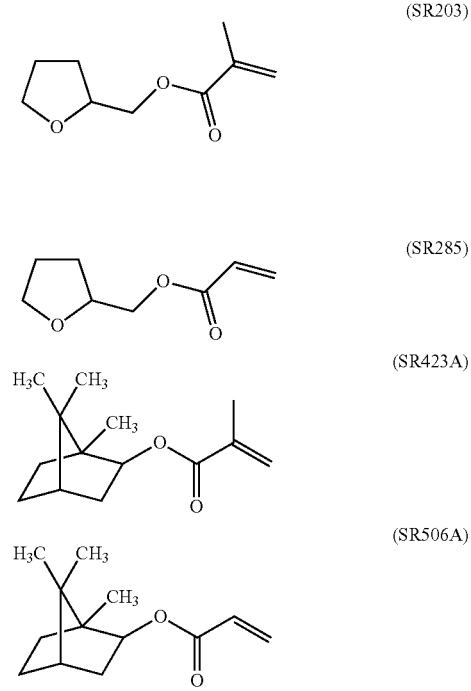

(SR203)

(SR285)

(SR423A)

(SR506A)

Typical examples of methacrylate oligomers include CN1963 and CN1964, which are also available from Sartomer. The enhanced material mechanical properties provide a benefit to an advanced polishing pad's mechanical performance during a polishing process. For instance, the enhanced elongation may facilitate an advanced polishing pad's removing rate, wafer-to-wafer polishing non-uniformity (WTWNU), with-in-wafer non-uniformity (WIWNU), and polarization efficiency.

In regard to the oxygen effect on a formed material's mechanical properties, the manipulation of reactive gas concentration (e.g., oxygen) in the additive manufacturing environment can also help to tune the formed material's surface properties (e.g., hydrophilicity, droplet's formed dynamic contact angle) and mechanical properties. As noted above, by controlling the make-up of the environment within the additive manufacturing tool by displacing various atmospheric contaminants (e.g., air), the processes performed within the additive manufacturing tool can be controlled to improve process repeatability, process yield and improve the properties of the formed layers. In some embodiments, the gas composition in the environment surrounding the print heads 308A-B and surface of the formed layer is controlled by flowing an inert gas therethrough. Examples of inert gases may include nitrogen ($N_2$) and argon (Ar) that is provided at a flow rate that forms a substantially laminar flow through the processing environment. By delivering an inert gas through the processing environment, the oxygen concentration can be controlled so to control the curability of the deposited materials. In one example, based on Fourier transform infrared spectroscopy (FT-IR) characterization (see Table A below) of an acrylate based sample, the percentage of surface curing that occurs when using a UV LED irradiation source in a standard atmospheric environment (i.e., ambient conditions) was found to be about 44%, while when purging the same environment with nitrogen provided a surface curing level of about 88%. In another example, based on FT-IR characterization of another acrylate based sample the percentage of surface curing that occurs when using a standard UV irradiation source in a standard atmospheric environment (i.e., ambient conditions) was found to be about 52%, while when purging the same environment with nitrogen provided a surface curing level of about 96%. The dynamic contact angle under UV and UV LED changes from 30-50' under no nitrogen purging to 60-80' under a nitrogen purged environment.

TABLE A

| Sample | Source | Layer Thickness (μm) | Radiation Energy (mJ/cm²) | % Surface Curing (Ambient) | % Bottom Curing (Ambient) | % Surface Curing (N₂ Blanket) | % Bottom Curing (N₂ Blanket) |
|---|---|---|---|---|---|---|---|
| 1 | UV | 125 | 12 | 52 | 84 | 96 | 88 |
| 2 | UV-LED | 125 | 12 | 44 | 80 | 88 | 88 |

Advanced Polishing Pad Formulation Examples

As noted above, in some embodiments, one or more of the materials that are used to form at least one of the two or more polishing elements, such as the first and second polishing elements 204 and 206, is formed by sequentially depositing and post deposition processing of at least one curable resin precursor composition. In general, the curable resin precursor compositions, which are mixed during the precursor formulation process performed in the precursor delivery section 353 of the additive manufacturing system 350, will include the formulation of resin precursor compositions that contain functional oligomers, reactive diluents and curing components, such as initiators. Examples of some of these components are listed in Table 3.

TABLE 3

| Reference Name | Material Information | Functionality | Tg (° C.) | UTS (psi) | % Elongation |
|---|---|---|---|---|---|
| O1 | Aliphatic urethane acrylate oligomer | 2 | 27 | 5378 | 79 |
| O2 | Aliphatic hexafunctional urethane acrylate | 6 | 145 | 11,000 | 1 |
| O3 | Low viscosity diacrylate oligomer | 2 | 26 | 1,600 | 10 |
| O4 | Aliphatic hexafunctional acrylate | 6 | 120 | | |
| O5 | Multifunctional urethane acrylate oligomer | 3.4 | 46 | 3045 | 2 |
| O6 | Aliphatic urethane diacrylate oligomer 1 | 2 | N/A | N/A | N/A |
| O7 | Aliphatic urethane acrylate oligomer 2 | N/A | N/A | N/A | N/A |
| O8 | Aliphatic polyester urethane diacrylate blend with aliphatic diacrylate | 2 + 2 | N/A | N/A | N/A |
| O9 | Acrylic oligomer | N/A | N/A | N/A | N/A |
| M1 | Dipropylene glycol diacrylate | 2 | 104 | 2938 | 5 |
| M2 | 2-Propenoic acid, 2-phenoxyethyl ester | 1 | 5 | 19 | 236 |
| M3 | Tertiary-butyl cyclohexanol acrylate (TBCHA) | 1 | 41 | | |
| M4 | Polyether-modified polydimethylsiloxane | | | | |
| M5 | CTFA 2 Ethers | 1 | 32 | — | — |
| M6 | EOEO-EA | 1 | -54 | — | — |
| M7 | 2-(((butylamino)carbonyl)oxy)ethyl ester | 1 | -3 | | |
| M8 | Tetrahydrofurfuryl Acrylate | 1 | -12 | | |
| M9 | Tetrafunctional polyether acrylate | 4 | N/A | N/A | N/A |
| M10 | Isobornyl acrylate | 1 | N/A | N/A | N/A |
| M11 | 2-[[(Butylamino)carbonyl]oxy] ethyl acrylate | 1 | N/A | N/A | N/A |
| P1 | 2-Hydroxy-2-methyl-1-phenyl-propan-1-one | N/A | N/A | N/A | N/A |
| P2 | 4-Phenylbenzophenone | N/A | N/A | N/A | N/A |
| P3 | Acyl phosphine oxide | N/A | N/A | N/A | N/A |
| P4 | Bis-benzoyl phosphine oxide | N/A | N/A | N/A | N/A |
| P5 | Blend of P1 and P3 | N/A | N/A | N/A | N/A |
| A1 | Acrylated amine synergist | <1 | N/A | N/A | N/A |
| A2 | Polyoxyethylene alkylphenyl ether ammonium sulfate non-migratory surfactant | | | | |
| A3 | Butyl methacrylate-co-methyl methacrylate copolymer | | 52 | | |

Examples of functional oligomers can be found in items O1-O9 in Table 3. Examples of functional reactive diluents and other additives can be found in items M1-M11 in Table 3. Examples of curing components are found in items P1-P5 and A1 in Table 3. Items O1-O3, O7-O9, M1-M3, M5-M6 and M8-M10 found in Table 3 are available from Sartomer USA, item M11 is available from IGM Resins, USA, item O4 is available from Miwon Specialty Chemicals Corporation of Korea, items O5-O6 is available from Allnex Corporation of Alpharetta, Ga., USA, item M4 is available from BYK-Gardner GmbH of Germany, item M7 is available from Rahn USA Corporation and items P1-P5 and A1 are available from Ciba Specialty Chemicals Inc. and Rahn USA Corporation. A2 is available from Montello, Inc. of Tulsa, Okla. Copolymer A3 is available from Sigma-Aldrich Chemical Company, of St. Louis, Mo., USA.

One advantage of the additive manufacturing processes described herein includes the ability to form an advance polishing pad that has properties that can be adjusted based on the composition of the materials and structural configuration of the various materials used within the pad body structure. The information below provides some examples of some material formulations and the affect that varying various components in these formulations and/or processing techniques have on some of the properties needed to form an advanced polishing pad that will achieve improved polishing results over conventional polishing pad designs. The information provided in these examples can be used to form at least a portion of the advanced polishing pad 200, such as part of the first polishing element 204, the second polishing element 206, or both the first and second polishing elements 204 and 206. The examples provided herein are not intended to be limiting as to the scope of the disclosure provided herein, since other similar chemical formulations and processing techniques can be used to adjust some of the properties described herein.

Examples of the curable resin precursor composition components, which are described above and below, are intended to be comparative examples and one skilled in the art can find other suitable monomers/oligomers from various sources to achieve the desired properties. Some examples for reactive diluents are 2-ethylhexyl acrylate, octyldecyl acrylate, cyclic trimethylolpropane formal acrylate, caprolactone acrylate, isobornyl acrylate (IBOA), and alkoxylated lauryl methacrylate. The aforementioned materials are available from Sigma-Aldrich, and also may be obtained from Sartomer USA and/or Rahn AG USA (SR series 203, 217, 238, 242, 306, 339, 355, 368, 420, 484, 502, 506A, 508, SR 531, 550, 585, 495B, 256, 257, 285, 611, 506, 833S, and 9003B, CD series 421A, 535, 545, 553, 590, 730, and 9075, Genomer series 1116, 1117, 1119, 1121, 1122, 5142, 5161, 5275, 6058, 7151, and 7210, Genocure series, BP, PBZ, PMP, DETX, ITX, LBC, LBP, TPO, and TPO-L, and Miramer series, M120, M130, M140, M164, M166, and M170). Photomer 4184 may be obtained from IGM Resins, USA. Some examples for difunctional cross-linkers are bisphenol A glycerolate dimethacrylate, ethylene glycol dimethacrylate, diethylene glycol dimethacrylate, tetraethylene glycol dimethacrylate, 1,6-hexanediol diacrylate and 1,4-butanediol diacrylate, which may be obtained from Sigma-Aldrich. Some examples of oligomers could include aliphatic oligomers (CN series 131, 131B, 132, 152, 508, 549, 2910, 3100 and 3105 from Sartomer USA), polyester acrylate oligomers (CN series 292, 293, 294E, 299, 704, 2200, 2203, 2207, 2261, 2261LV, 2262, 2264, 2267, 2270, 2271E, 2273, 2279, 2282, 2283, 2285 and 2303 from Sartomer USA) and aliphatic urethane oligomers (CN series 929, 959, 961H81, 962, 969, 964A85, 965, 968, 980, 986, 989, 991, 992, 996, 2921, 9001, 9007, 9013, 9178 and 9783 from Sartomer USA). The agents or additives could be supplied from BYK, such as 3550, 3560, 307, 378, 1791, 1794, 9077, A515, A535, JET9510, JET9511, P9908, UV3500, UV3535, DISPERBYK168, and DISPERBYK2008. The first type photoinitiator could be from BASF, such as Irgacure series 184, 2022, 2100, 250, 270, 295, 369, 379, 500, 651, TPO, TPO-L, 754, 784, 819, 907, 1173, or 4265. Other functional oligomers and resin precursor composition components can be purchased from Allnex Corp., such as the Ebecryl series (EB): 40, 53, 80, 81, 83, 110, 114, 130, 140, 150, 152, 154, 168, 170, 180, 220, 230, 242, 246, 264, 265, 270, 271, 284, 303, 350, 411, 436, 438, 450, 452, 524, 571, 600, 605, 608, 657, 745, 809, 810, 811, 812, 830, 860, 870, 871, 885, 888, 889, 893, 1258, 1290, 1291, 1300, 1360, 1710, 3200, 3201, 3411, 3415, 3418, 3500, 3600, 3700, 3701, 3720, 4265, 4827, 4833, 4849, 4858, 4883, 5129, 7100, 8100, 8296, 8301, 8311, 8402, 8405, 8411, 8412, 8413, 8414, 8465, 8501, 8602, 8701, 8702, 8804, 8807, 8808, and 8810. Free and non-migratory (polymerizable) surfactants such as triethanol amine (TEA) and Hitenol and Maxemul branded materials are available from Sigma-Aldrich, Montello, Inc., of Tulsa, Okla. USA and Croda, Inc., of New Castle, Del., USA.

EXAMPLE 1

Storage Modulus E' and E'30:E'90 Ratio Control Example

The selection, formulation and/or formation of materials that have a desirable storage modulus E' and E'30:E'90 ratio in desirable regions of an advanced polishing pad by use of an additive manufacturing process is an important factor in assuring that the polishing results achieved by the advanced polishing pad are uniform across a substrate. It is noted that storage modulus E' is an intrinsic material property of a formed material, which results from the chemical bonding within a cured polymeric material. Storage modulus may be measured at a desired temperature, such as 30° C. and 90° C. using a dynamic mechanical analysis (DMA) technique. Examples of formulations that contain different storage moduli are illustrated below in Table 4.

TABLE 4

| Item No. | Material Composition (See Table 3 Ref. Name) | Formulation Composition (wt %) | E'30 (MPa) | E'90 (MPa) | E'30/E'90 |
| --- | --- | --- | --- | --- | --- |
| 1 | O1:M3 | 45:55 | 404 | 3.6 | 113.6 |
| 2 | O1:M1 | 45:55 | 1595 | 169.5 | 9.4 |
| 3 | O1:M3:M1:M2 | 45:22:22:11 | 680 | 10.4 | 65.3 |
| 4 | O4:O1:M3:M1:M2 | 30:15:22:22:11 | 925 | 385.4 | 2.4 |
| 5 | O4:O1:O3:M3:M1:M2:M4:P1 | 22.5:22.5:0.6:22:11:22:0.2:2 | 1536 | | 8.9 |
| 6 | O1:O3:M8:M7:M4:P1 | 42.5:0.6:34.5:23:0.2:2 | 4.4 | | 1.3 |
| 7 | O1:O2:M1:M3:P3:P2:A1 | 11.65:5.826:8.544:12.816:0.776:0.098:0.292 | 1700-2300 | 100-300 | |
| 8 | O6:M9:M10:O3:M4:P3:P2:A1 | 3.799:5.698:9.497:0.038:0.019:0.38:0.142:0.427 | 900-1400 | 20-80 | |
| 9 | O1:M3:M1:O2:P4:P2:A1:A2:O3:M4 | 24.10:26.51:24.65:12.05:1.61:0.20:0.60:9.97:0.20:0.10 | | | |

Referring to Table 3 and items 1 and 2 in Table 4, creating a formulation that contains resin precursor components (e.g., monomers, oligomers, reactive diluents and other materials that contain chemically active functional groups or segments) that have a higher functionality than other resin precursor components results in an increased storage moduli E' at different temperatures, while the E'30:E'90 ratio of the formed material can be decreased. Changing the resin precursor component from a type M3, which has a functionality of 1, to a resin precursor component of type M1, which has a functionality of 2, in the formulation increases the storage modulus E' at 30° C. by nearly 400%, while the E'30:E'90 ratio dropped to about 8% of its original value. Similarly, comparing items 3 and 4 in Table 4, one will note that by adding a multifunctional oligomer to a formulation that the storage moduli E' at different temperatures can be moderately increased, while the E'30:E'90 ratio of the formed material can be greatly decreased. Thus, by adding the multifunctional oligomer O4, which has a functionality of 6, to a formulation, the storage modulus E' at 30° C. was only increased by 136%, while the E'30:E'90 ratio dropped to about 4% of its original value. While not intending to be bound by theory, it is believed that by increasing the degree of crosslinking within a formed polymer material, due to the addition of components to a droplet formulation that have an increased functionality, has a significant effect on the storage modulus E' at higher temperatures (e.g., 90° C.) and thus has a significant effect on the E'30:E'90 ratio. Therefore, in some embodiments of the disclosure, precursor components that have a functionality of two or greater are used in the formulations used to form the harder material regions (e.g., first polishing elements 204) in the advanced polishing pad 200. In the same way, softer regions of the advanced polishing pad 200 may be formed by use of formulations that have a lesser functionality than the harder regions in the polishing pad. Therefore, in some embodiments of the disclosure, precursor components that have a functionality of two or less are used in the formulations used to form the softer material regions (e.g., second polishing elements 206) in the advanced polishing pad 200.

In further embodiments of this disclosure, high modulus formulations in larger 40 kg batches may be produced, such as those exemplified by items 7 and 8 in Table 4. In these and other embodiments, the amount of a multifunctional resin precursor component may be increased so that a high degree of crosslinking is achieved, while also assuring that the formulation has a viscosity that will allow it to be dispensed using an additive manufacturing process as described herein (e.g., 5 to 30 cP at 70° C.). For example, the material derived from item 7, contains a hexafunctional urethane acrylate O1 and displays a high modulus and a stable E'30:E'90 modulus ratio. A similar rigid high modulus polishing pad materials may be produced from the item 8 formulation, which contains a tetrafunctional acrylate diluent (item M9). Notably, a polishing pad produced with the item 8 formulation displayed an advantageously high oxide removal rate (using a cerium based polishing slurry) from between about 2500 to about 3500 angstroms/min, with a median removal rate of about 3000 angstroms/min. The item 8 formulation also displayed a range of "thermal stability" over the course of multiple polishing experiments, wherein the pad temperature varied only from between about 27° C. to about 31° C., with a median temperature of about 30° C.

In further embodiments of this disclosure, it has been discovered that formulations including, but not restricted to item 7 of Table 4, may be tuned or modified to produce a new hydrophilic or "water loving" polishing pad material and/or pad surface that has enhanced pad polishing properties, such as high substrate removal rates at typical polishing process temperatures. Specifically, new hydrophilic polishing pads with high removal rates may be produced by the addition of polymerizable surfactants in a formulation, such as the formulation illustrated in item 9 of Table 4. In this example, an appropriate amount of polymerizable surfactant may be added to a formulation to produce a new polishing pad material by use of the additive manufacturing processes described herein that is hydrophilic instead of hydrophobic. In some cases, the polymerizable surfactants may also be known as non-migratory surfactants (NMS) or "surfamers". The NMS materials do not migrate or diffuse through or out of a material because they are covalently bonded to and/or copolymerized with the other polymerized resin precursor components in the formulation, such as oligomers and monomers. The NMS functionality and/or copolymerization mechanism is not restricted in this disclosure, and therefore the NMS may contain any suitable functional group to cause such a copolymerization, such as a double bond or other site of unsaturation, that may be copolymerized by a free radical mechanism, such as a free radical reaction with an acrylate, and/or any suitable resin precursor component, such as those disclosed herein. Generally, the NMS may contain chemical functionality that may engage in any chemical reactions, transformations, or interactions, including, but not restricted to: synthesis, decomposition, single replacement and double replacement, oxidation/reduction, acid/base, nucleophilic, electrophilic and radical substitutions, and addition/elimination reactions.

The NMS materials and surfactants are generally useful in the production of active surface coatings and material dispersions or sols because they may form stable micelles in which a hydrophilic portion of the surfactant interacts with an aqueous solvent or medium and a hydrophobic portion of the molecule may stabile a particle or sol within the micelle. Conventional and NMS surfactants may include, but are not restricted to: anionic and/or nonionic compounds or portions thereof such as alkali metal or ammonium salts of alkyl, aryl, or alkylaryl sulphates, sulphonates, phosphates or phosphate esters, alkyl sulphonic acids, sulphosuccinate salts, fatty acids and ethoxylated alcohols or phenols. The amount of NMS or surfactant that is typically used in a typical process may be from between about 0.1% to 6% by weight, based on the weight of particles, fluids, monomers and/or resin precursor components.

Polishing slurries also typically use surfactants to stabilize and suspend abrasive particles and other components. It is believed that some aqueous slurry emulsions will not interact with a conventional polishing pad surface because the pad surface has a repulsive or hydrophobic character. Advantageously, embodiments of this disclosure provide herein, utilize the NMS materials to form a hydrophilic polishing pad formulation, which thereby produces a polishing pad that has a surface that has a surface energy that will allow it to interact with most conventional polishing slurries, such as aqueous based polishing slurries. Specifically, it is believed that the new polishing pads and/or new polishing pad surfaces that contain the covalently bound NMS materials provide a surfactant-like pad surface (e.g., dynamic contact angle of less than 60°) that chemically interacts with and thus stabilizes a polishing slurry at the polishing pad-slurry-substrate interface. It is believed that a pad surface that has been formed using a NMS containing formulation provides an increased substrate material removal rate due to the slurry being favorably maintained between the pad surface and the substrate by the hydrophilic nature of the exposed pad surface. Non-migratory surfactants that may be useful include Hitenol, Maxemul, and E-Sperse branded materials that are respectively available from Montello, Inc., of Tulsa, Okla. USA and Croda, Inc., of New Castle, Del., USA, and Ethox Chemicals, LLC Greenville, S.C. USA.

Polishing pads modified by NMS materials are expected to display increased surface wettability and decreased contact angles when contacted with an aqueous polishing slurry. This is because the hydrophilic pad surface energy (Dyne) is more closely matched to that of the slurry or slurry droplet, causing the droplet to interact with the pad surface and spread out versus a hydrophobic surface. In some embodiments, hydrophilic pad materials may exhibit increased slurry interaction and slurry transport across a pad surface which is believed to be due to the interaction of the NMS modified surface with the slurry. Such materials may display a water on pad surface dynamic contact angle of about 60 degrees, such as between about 10 degrees to about 60 degrees, and between about 20 degrees to about 60 degrees, and between about 30 degrees to about 60 degrees, and between about 40 degrees to about 60 degrees, and between about 50 degrees to about 60 degrees.

In one embodiment, item 7, which is a hydrophobic formulation, may be modified by the addition of a polymerizable surfactant and other appropriate materials to produce a new hydrophilic formulation represented by item 9 of Table 4. Hydrophilic polishing pads formed using the item 9 formulation display an increased rate of removal of silicon oxide during polishing in comparison to a hydrophobic control sample formed using the item 7 formulation. In one embodiment, a pad derived from the item 9 hydrophilic formulation exhibited a removal rate that was about 1.5 times greater than the item 7 hydrophobic pad material. For example, the pad material formed by the item 9 formulation exhibited a removal rate from between about 2200 angstroms/min to about 2400 angstroms/min, with a median rate of about 2350 angstroms/min. In contrast, a polishing pad derived from the hydrophobic item 7 formulation exhibited a removal rate from between about 1470 angstroms/min to about 1685 angstroms/min, with a median rate of about 1590 angstroms/min.

The removal rate of a material generally tends to track with increased polishing process temperature due to the friction produced by abrasion of the substrate surface. This is reflected in one embodiment of a polishing process in which the hydrophilic pad of item 9 exhibited a process temperature from between about 26° C. to about 29° C., with a median temperature of about 28° C. In contrast, the temperature of a hydrophobic pad derived from the hydrophobic item 7 formulation exhibited a significantly lower process temperature from between about 20° C. to about 23° C., with a median temperature of about 22° C. In another embodiment of this disclosure, similar heating behaviors were observed during a polishing process in which the hydrophilic pad of item 9 exhibited a process temperature from between about 44° C. to about 49° C., with a median temperature of about 48° C. In contrast, the temperature of a hydrophobic pad derived from the hydrophobic item 7 formulation exhibited a significantly lower process temperature from between about 37° C. to about 42° C., with a median temperature of about 40° C.

EXAMPLE 2

Storage Modulus E' and Percent Recovery Control Example

Examples of different formulations that can be used to adjust the storage modulus E' and percent recovery (%) of a material used in an advanced polishing pad are illustrated below in Table 5.

TABLE 5

| Item No. | Material Composition (See Table 3 Ref. Name) | Formulation Composition (wt %) | E'30 (MPa) | UTS (MPa) | E'30/E'90 | % EL @ break | % Recovery |
|---|---|---|---|---|---|---|---|
| 1 | O1:O2:M3:M1:M2 | 40:5:10:10:35 | 347 | 9.8 | 19 | 38.5 | 40 |
| 2 | O1:O2:M3:M1:M2 | 25:5:10:50:10 | 1930 | 19.5 | 11 | 1.9 | 86 |

Referring to items 1 and 2 in Table 5, one will note that by adjusting the amounts of various components in a formulation that an increase in storage moduli E' at lower temperatures (e.g., 30° C.), an increase in the percent recovery (%) and a reduction in the percent elongation at break can be achieved. It is believed that the significant change in the storage modulus E' at 30° C., the percent recovery (%) and elongation at break properties are largely due to the increase in the percentage of the chemical components that have a high glass transition temperature (Tg). One will note that a material that has a low glass transition temperature, such as resin precursor component M2 (e.g., Tg=5° C.), will tend to be softer at room temperature, while a material that has a high glass transition temperature, such as resin precursor component M1 (e.g., Tg=104° C.) will tend to be harder and more brittle at temperatures near room temperature. One will note in this example that while the percentage of the multifunctional oligomer O1, which has a functionality of two, is slightly decreased and percentage of the resin precursor component M1, which also has a functionality of 2, is significantly increased, and the change in the E'30:E'90 ratio is only modestly changed. Therefore, it is believed that the cross-linking density is likely to be similar for polymer materials formed by the compositions of items 1 and 2 in Table 5, which supported by the rather modest change in the E'30:E'90 ratio of the two materials. Therefore, in some embodiments, precursor components that have a high glass transition temperature can be increased in a formulation to form a material that has higher storage modulus E', greater hardness, a greater percentage of recovery during processing and a smaller elongation at break. Similarly, in some embodiments, precursor components that have a low glass transition temperature may be increased in a formulation to form a material that has lower storage modulus E', lower hardness and a greater elongation at break.

In some embodiments, it is desirable to adjust the various components in a droplet formulation used to form a low storage modulus E' material, such that the amount of components that have a glass transition temperature (Tg) of less than or equal to 40° C. is greater than the amount of components that have a glass transition temperature (Tg) of greater than 40° C. Similarly, in some embodiments, it is desirable to adjust the various components in a droplet formulation used to form a high storage modulus E' material, such that the amount of components that have a glass transition temperature (Tg) of greater than 40° C. is greater than the amount of components that have a glass transition temperature (Tg) of less or equal to about 40° C. In some embodiments, one or more resin precursor component materials in a droplet formulation used to form a low storage modulus E' material in an advanced polishing pad have a glass transition temperature (Tg) of less than or equal to 40° C., such as less than or equal to 30° C., and one or more resin precursor component materials used form a droplet formulation used to form a higher storage modulus E' material in the same advanced polishing pad have a glass transition temperature (Tg) of greater than or equal to 40° C.

In some embodiments, a formed low storage modulus E' material in an advanced polishing pad has a glass transition temperature (Tg) such that the formed material's tan delta is greater than 0.25 over a temperature range of between 25 and 90° C. In some embodiments, one or more resin precursor component materials in a droplet formulation are used to form the low storage modulus E' material in the advanced polishing pad.

EXAMPLE 3

Contact Angle Control Example

Examples of different formulations that can be used to adjust the contact angle of droplets, as discussed above in conjunction with FIG. 3C, that are deposited on a surface is illustrated below in Table 6. As noted above, it has been found that by at least controlling: 1) the composition of the components in a dispensed droplet during the additive manufacturing process, 2) the amount of cure of the previously formed layer, 3) the amount of energy from the curing device, 4) the composition of the surface that the dispensed droplet is disposed on, and 5) the amount of the curing agent (e.g., photoinitiator) in the droplet composition, the contact angle α of the dispensed droplet can be controlled to improve the control of the resolution of the features formed by the additive manufacturing process described herein.

TABLE 6

| Item No. | Material Composition (See Table 3 Ref. Name) | Formulation Composition (wt %) | E'30 (MPa) | Contact Angle (°) | E'30/E'90 | Recovery (%) |
|---|---|---|---|---|---|---|
| 1 | O1:O2:M1:M2:P1 | 22:18:30:30:<1 | 2078 | 30 | 9.4 | 85 |
| 2 | O1:O2:M1:M2:O3:M4:P1:P2:A1 | 22.5:22.5:30:25:0.06:0.02:<1:<1:<1 | 1353 | 60 | 4 | 82 |
| 3 | O1:O2:M1:M2:O3:M4:P1:P2:A1 | 27.5:17.5:30:25:0.06:0.02:<1:<1:<1 | 2632 | 90 | 4.4 | 79 |

Referring to items 1, 2 and 3 in Table 6, one will note that by adjusting the amounts of the various components in a formulation that the contact angle of a cured droplet or "fixed" droplet on a surface that was formed with same, or a similar, droplet formulation, can be adjusted. It is believed that a significant change in the contact angle can be achieved by adjusting the type and amount of the functional monomers (e.g., items M1-M2 and M4) and photoinitiator components (e.g., items P1, P2 and A1) in the dispensed droplet's formulation.

The contact angle of a droplet formulation can be improved through the use of: 1) through or bulk cure photoinitiators (e.g., first type of photoinitiator) that ensure that the mechanical properties of the at least partially cured droplets can be achieved, 2) through the use of a second type of photo-initiator such as benzophenones and an amine synergist, which enable a fast surface cure by reducing the ability of $O_2$ in the environment to quench the free radicals generated through UV exposure (e.g., second type of photoinitiator), and 3) through surface modifiers that tend to make the surface of the dispensed droplet more or less polar. The surface modifiers, for example, may be used such that when a drop of a hydrophilic uncured resin is deposited on a hydrophobic surface, the surface energy of the dispensed droplet can be altered. This will result in a large contact angle, and thereby ensure that the droplet does not "wet" the surface. The prevention of wetting of the surface will allow the subsequently deposited droplets to be built vertically (e.g., Z-direction). When droplet after droplet are positioned horizontally next to each other, it is desirable to prevent horizontal wetting of the surface, so that the side walls of the vertically formed features will be formed vertically as opposed to a slopping shape. This improvement in contact angle ensures that the side walls of the printed features are vertical, or have gradual slopes when deposited one on top of one another. This resolution is important in an advanced polishing pad as the substrate contact area of the polishing features needs to be maintained at a consistent contact area throughout each polish process and/or as the pad polishing material is removed by abrasion or pad conditioning throughout the life of the pad.

EXAMPLE 4

Low Storage modulus E' Tuning Example

The selection, formulation and/or formation of materials that have a desirable low storage modulus E' and desirable E'30:E'90 ratio in various regions of the advanced polishing pad can be an important factor in assuring that the static and dynamic related mechanical properties of an advanced polishing pad can be adjusted to achieve desirable polishing results when combined with higher storage modulus E' material. Examples of formulations that contain different storage moduli E' are illustrated below in Table 7.

TABLE 7

| Item No. | Material Composition (See Table 3 Ref. Name) | Formulation Composition (wt %) | E'30 (MPa) | E'90 (MPa) | E'30/E'90 |
|---|---|---|---|---|---|
| 1 | O1:O5:M3:M5:M6:P1 | 25:25:21.4:14.3:14.3:<1 | 88 | 20 | 4.4 |
| 2 | O8:M8:O9:O3:M4:P5 | 27:40:33:0.3:0.1:2 | 25.2 | 5.2 | 4.8 |
| 3 | O1:M3:M2 | 45:27.5:27.5:<1 | 17.9 | 3.1 | 5.9 |

Referring to items 1 and 3 in Table 7, as similarly noted in Example 1 above, one will note that by creating a formulation that contains multifunctional oligomers that have a functionality of two or greater and that have differing glass transition temperatures (Tg) the storage moduli E' at different temperatures can be adjusted, while the E'30:E'90 ratio of the formed material can remain constant. For example, by adding a multifunctional oligomer O5, which has a functionality of 3.4 to a formulation, the storage modulus E' at 30° C. can be increased by nearly 500%, while the E'30:E'90 ratio only dropped to about 75% of its original value. While not intending to be bound by theory, it is believed that by increasing the degree of crosslinking within a formed polymer material, due to the addition of multifunctional oligomer O5 components to a droplet formulation, has a significant effect on the storage modulus E' at lower temperatures (e.g., 30° C.) when used in combination with a resin precursor component that has a relatively low glass transition temperature Tg. Therefore, in some embodiments of the disclosure, resin precursor components that have a functionality of two or greater are used in combination with resin precursor components that have a relatively low glass transition temperature Tg to form softer material regions (e.g., second polishing elements 206) in the advanced polishing pad 200. Also, in some embodiments of the disclosure, precursor components and functional oligomer that have a functionality of two or less are used in the formulations used to form the softer material regions (e.g., second polishing elements 206) in the advanced polishing pad 200. We further note that the adjustment of the ratios and identities of the resin precursor components may advantageously produce a high elongation material at a desired E'30:E'90 ratio, as exemplified by item 2 in Table 7, wherein a material exhibited an elongation from about 82% to about 114% and an E'30:E'90 of about 4.8. In another embodiment of this disclosure, a high elongation material was produced that exhibited an elongation from about 80 to about 195%, wherein the wt % ratios of the resin precursor components O7:M10:M11:P5 may be about 15:10:75:2. Similarly, one may produce a stable E'30:E'90 material by combining the resin precursor components in the following ratios: O1:M7: M8:O3:M4:P1, and wherein a 40 kg batch may be produced when the relative wt % ratios (kg) are about 16.537:8.949: 13.424:0.233:0.078:0.778. As per the above embodiments and examples, one may balance hardness and elongation by judicious choice of resin precursor components and their ratios to one another, while also assuring that the formulation has a viscosity that will allow it to be dispensed using an additive manufacturing process as described herein (e.g., 15 to 30 cP at 70° C.).

In some embodiments, it is desirable to control the properties of one or more of the polishing elements 204, 206 in the advanced polishing pad by controlling the relative amounts of oligomers to monomers, or also referred to herein as controlling the oligomer-monomer ratio, in a resin precursor composition to control the amount of cross-linking within the cured material formed by the resin precursor composition. By controlling the oligomer-monomer ratio in a resin precursor composition, the properties (e.g., mechanical, dynamic, polishing performance, etc.) of the formed material can be further controlled. In some configurations, monomers have a molecular weight of less than 600. In some configurations, oligomers have a molecular weight of 600 or more, such as a molecular weight of >1000. In some configurations, the oligomer-monomer ratio is defined as a weight ratio of the oligomer component to the monomer component, and is typically selected to achieve the desired strength and modulus. In some implementations, the oligomer-monomer ratio is from about 3:1 to about 1:19. In some implementations the oligomer-monomer ratio is in a range from about 3:1 to about 1:3 (e.g., ratio 2:1 to 1:2; ratio 1:1 to 1:3; ratio 3:1 to 1:1). In one example, an oligomer-monomer ratio of 1:1 can be used to achieve desirable toughness properties such as elongation and storage modulus E' while maintaining printability of the formed formulation. In some embodiments, it is desirable to select an oligomer-monomer ratio that is greater than a 1:1 ratio, and thus contains a greater amount by weight of oligomers to monomers. A resin precursor composition that has an oligomer-monomer ratio that is greater than a 1:1 may be used to form the tougher or more elastomeric material regions (e.g., first polishing elements 204) in the advanced polishing pad 200. In some embodiments, it is desirable to select an oligomer-monomer ratio that is less than 1:1 ratio, and thus contains a smaller amount by weight of oligomers to monomers. A resin precursor composition that has an oligomer-monomer ratio that is less than 1:1 may be used to form less elastomeric material regions (e.g., second polishing elements 206) in the advanced polishing pad 200.

EXAMPLE 5

Advanced Polishing Pad Properties Example

As discussed above, the additive manufacturing processes described herein enable specific placement of material compositions with desired properties in specific areas of the advanced polishing pad, so that the properties of the deposited compositions can be combined to create a polishing pad that has properties that are an average of the properties, or a "composite" of the properties, of the individual materials. In one example, an advanced polishing pad may be formed so that it has desirable average tan delta (tan δ) properties over a desired temperature range. Curves 821-823, curves 831-833 and curve 841 in FIG. 8A illustrate the average tan delta properties as a function of temperature for differently configured and/or loaded advanced polishing pads.

Figure 8B:
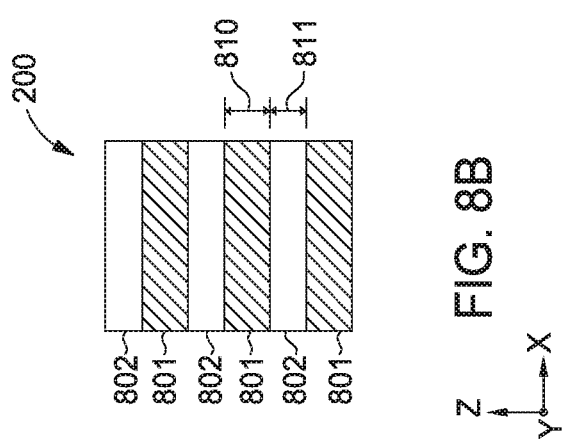
FIGS. 8B and 8C are each schematic side cross-sectional views of portions of an advanced polishing pad, according to an embodiment of the present disclosure.
Figure 8C:
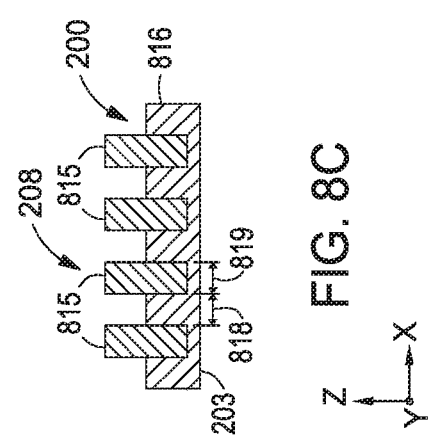
Figure 8A:
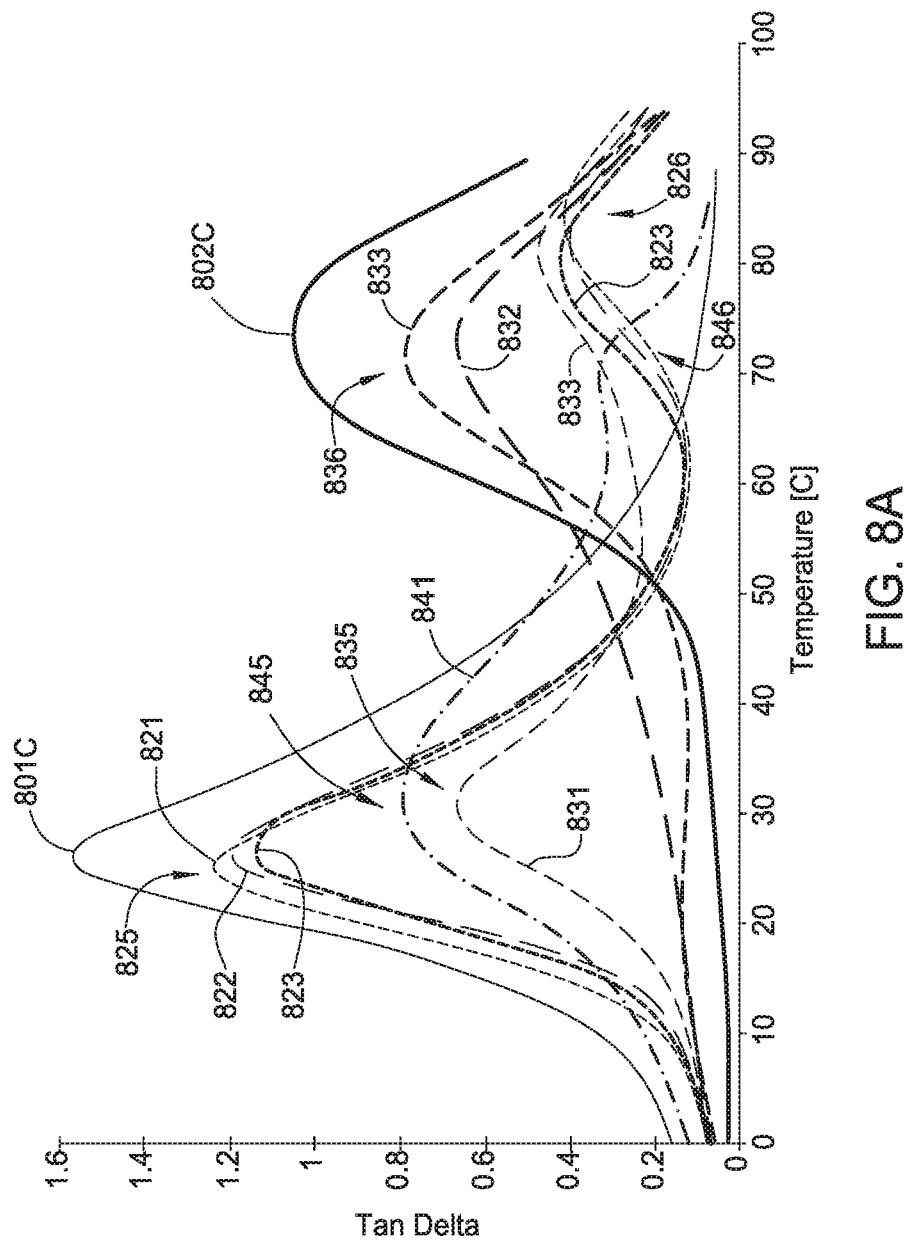
FIG. 8A illustrates a plot of tan delta versus temperature for various materials and an advanced polishing pad, according to an embodiment of the present disclosure.

FIGS. 8B and 8C are side cross-sectional views of two basic configurations of advanced polishing pads that were used to generate the tan delta versus temperature data, shown in FIG. 8A. The tan delta versus temperature data found in curves 821-823 in FIG. 8A were collected using a DMA technique that causes the advanced polishing pad samples of the type shown in FIG. 8B to be cycled in a test fixture that loads the cantilevered samples in the Z-direction. The tan delta versus temperature data found in curves 831-833 in FIG. 8A were collected using a DMA technique that causes the advanced polishing pad samples of the type shown in FIG. 8B to be cycled in a test fixture that loads the cantilevered samples in the X-direction (e.g., parallel to the formed layers). The tan delta versus temperature data found in curve 841 in FIG. 8A was collected using a DMA technique that causes the advanced polishing pad samples of the type shown in FIG. 8C to be cycled in a test fixture that loads a cantilevered test sample in the Z-direction. During all of the tests, the advanced polishing pad samples were heated from a temperature of −81° C. to a temperature of 95° C. at a ramp rate of 5° C./minute.

FIG. 8B illustrates a portion of an advanced polishing pad 200 that contains discrete layers of a first polishing pad material 801 and a second polishing pad material 802 that are formed using an additive manufacturing process described herein so that the formed layers are aligned parallel to the X-Y plane and are stacked in the Z-direction. The first polishing pad material 801 includes a low storage modulus urethane acrylate material that has a low glass transition temperature (Tg) and the second polishing pad material 802 includes a high storage modulus urethane acrylate material that has a high glass transition temperature (Tg). The layers of the first polishing pad material 801 and the second polishing pad material 802 each have a thickness 810 and 811 in the Z-direction, respectively.

Referring back to FIG. 8A, the plotted data contains separate and discrete tan delta peaks for the first polishing pad material 801 and second polishing pad material 802, as shown by curves 801C and 802C. The tan delta data for the DMA testing performed on the advanced polishing pad configuration shown in FIG. 8B are illustrated by curves 821-823 and curves 831-833, and the tan delta data for the DMA testing performed on the advanced polishing pad configuration shown in FIG. 8C is illustrated by curve 841.

Curves 821, 822 and 823 illustrate the effect of altering the thickness and relative spacing of each of the layers shown in FIG. 8B when loaded in the Z-direction during testing. Curve 821 illustrates a plot of the tan delta as a function of temperature for the advanced polishing pad structure shown in FIG. 8B, which has a 50:50 composition of the first polishing pad material 801 to the second polishing pad material 802, and thus has equivalent thicknesses 810 and 811 in the Z-direction for each of the layers. The thicknesses 810 and 811 in the first sample were both about 0.16 mm (0.006 inches). Curve 822 illustrates a plot of the tan delta as a function of temperature for the same general advanced polishing pad structure used to generate curve 821, except that the thicknesses 810 and 811 of the layers of the first and second materials 801 and 802 were both twice as large. Similarly, curve 823 illustrates a plot of the tan delta as a function of temperature for the same advanced polishing pad structure used to generate curve 821, except that thicknesses 810 and 811 of the layers of the first and second polishing pad materials 801 and 802 were both three times as large. One will note that curves 821, 822 and 823 all show a blending or averaging of the properties found in the individual materials 801 and 802, as seen by the two clear peaks (e.g., peaks 825 and 826) and the drop in magnitude of each of the peaks in the tan delta data. The two peaks found in curves 821, 822 and 823 may be indicative of molecular scale mixing, chain entanglement, and/or chemical bonding formed between the first polishing pad material and the second polishing pad material. Thus, in some embodiments, molecular scale mixing, chain entanglement, and/or chemical bonding may be desirably formed between a first material composition in the first polishing elements and a second material composition in the second polishing elements with an advanced polishing pad, which can help improve a property of the formed advanced polishing pad (e.g., tan delta, E'30:E'90 ratio, E'30, etc.).

Curves 831, 832 and 833 illustrate the effect of altering the thickness and relative spacing of each of the layers shown in FIG. 8B when loaded in the X-direction during testing. Curve 831 illustrates a plot of the tan delta as a function of temperature for the advanced polishing pad structure shown in FIG. 8B, which has a 50:50 composition of the first polishing pad material 801 to the second polishing pad material 802, and thus has equivalent thicknesses 810 and 811 in the Z-direction for each of the layers. The thicknesses 810 and 811 in the first sample were both about 0.16 mm (0.006 inches). Curve 832 illustrates a plot of the tan delta as a function of temperature for the same general advanced polishing pad structure used to generate curve 831, except that the thicknesses 810 and 811 of the layers of the first and second materials 801 and 802 were both twice as large. Similarly, curve 833 illustrates a plot of the tan delta as a function of temperature for the same advanced polishing pad structure used to generate curve 831, except that thicknesses 810 and 811 of the layers of the first and second polishing pad materials 801 and 802 were three times as large. One will note that curve 831 shows a blending or averaging of the properties found in the individual materials 801 and 802, as seen by the two clear peaks (e.g., peaks 835 and 836) and the drop in magnitude of each of the peaks in the tan delta data. While curves 832 and 833 show only a little blending or averaging of in the properties found in the individual materials 801 and 802, as seen by the lack of the two clear peaks.

FIG. 8C illustrates a portion of an advanced polishing pad 200 that contains a first polishing pad feature 815 and a base layer 816 that were also formed using an additive manufacturing process so that the first polishing pad features 815 are supported by the base layer 816 and are aligned in the Z-direction (e.g., items 204a in FIG. 2A). The base layer 816, in this configuration, includes a 50:50 "blend" (i.e., 1:1 material composition ratio) of fixed droplets of the first polishing pad material 801 and fixed droplets of the second polishing pad material 802. The thickness of the first polishing pad features 815 and the base layer 816 each have a width 818 and 819 that is aligned in the X-direction, respectively. Curve 841 illustrates the effect of forming a compositionally "blended" polishing pad element on the average or "composite" properties of an advanced polishing pad 200. One will note that curve 841 shows a blending or averaging of the properties found in the individual materials 801 and 802 found in the base layer 816, as seen by the two clear peaks (e.g., peaks 845 and 846) and the drop in magnitude of each of the peaks in the tan delta data. The two peaks found in curve 841 may be indicative of molecular scale mixing, chain entanglement, and/or chemical bonding formed between the first polishing pad material and the second polishing pad material within the base layer 816.

The tan delta versus temperature data found in FIG. 8A illustrates that the structural spacing or thickness of the layers relative to the loading direction (e.g., curves 821 and 841) can have a dramatic effect on the tan delta property averaging within an advanced polishing pad. Referring to curves 831, 832 and 833 one will note that as the spacing between the layers of the harder and softer materials increase the more the properties of the harder materials tend to dominate the properties of a formed polishing pad when loaded in a direction that is parallel to the formed layer orientation (e.g., X-direction). However, referring to curves 821, 822 and 823 one will note that the spacing between the layers of the harder and softer materials has little effect on the properties of a formed advanced polishing pad that is configured with the polishing features aligned in an orientation that is perpendicular to the loading direction, since the measured tan delta versus temperature does not vary much as the thickness of the features increases. Therefore, by controlling the structural orientation of one or more layers relative to the loading direction and relative spacing of the "hard" and "soft" layers within an advanced polishing pad, one or more of the pad properties (e.g., tan delta) can be adjusted to better control the polishing process performance of the advanced polishing pad.

Alternate Pad Structure Designs

Figure 9:
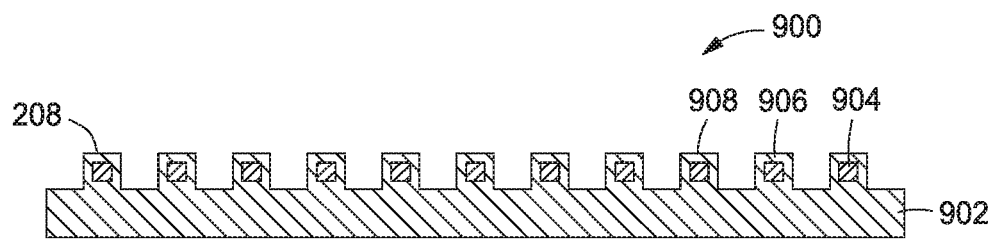
FIG. 9 is a schematic side cross-sectional view of a portion of a polishing pad according to an embodiment of the present disclosure.

FIG. 9 is a schematic perspective sectional view of a polishing pad 900 according to one embodiment of the present disclosure. The polishing pad 900 includes a second polishing element 902 that is a soft or low storage modulus E' material similar to the second polishing elements 206 of the printed polishing pad. Similar to the second polishing elements 206, the second polishing element 902 may be formed from one or more elastomeric polymer compositions that may include polyurethane and aliphatic segments. The polishing pad 900 includes a plurality of surface features 906 extending from the second polishing element 902. Outer surfaces 908 of the surface features 906 may be formed from a soft or low E' material or a composition of soft or low storage modulus E' materials. In one embodiment, the outer surface 908 of the surface features 906 may be formed from the same material or the same composition of materials as the second polishing element 902. The surface features 906 may also include a hard feature 904 embedded therein. The hard or high storage modulus E' features 904 may be formed from a material or a composition of materials that is harder than the surface features 906. The hard or high storage modulus E' features 904 may be formed from materials similar to the material or materials of the hard or high storage modulus E' features 204 of the advanced polishing pad, including crosslinked polymer compositions and compositions containing aromatic groups. The embedded hard features 904 alter the effective hardness of the surface features 906, and thus provide a desired target pad hardness for polishing. The soft or low storage modulus E' polymeric layer of the outer surface 908 can be used to reduce defects and improve planarization on the substrate being polished. Alternatively, a soft or low storage modulus E' polymer material may be printed on surfaces of other polishing pads of the present disclosure to provide the same benefit.

FIG. 10 is a schematic perspective sectional view of a polishing pad 1000 having one or more observation windows 1010. The polishing pad 1000 may have a pad body 1002. The pad body 1002 may include one or more soft or low storage modulus E' features 1006 and a plurality of first polishing elements 1004 extending from the second polishing elements 1006 for polishing. The second polishing elements 1006 and the first polishing elements 1004 may be formed from materials similar to those for the second polishing element(s) 206 and first polishing elements 204 of the advanced polishing pad 200. The first polishing elements 1004 may be arranged in any suitable patterns according to the present disclosure.

The one or more observation windows 1010 may be formed from a transparent material or compositions to allow observation of the substrate being polished. The observation windows 1010 may be formed through, and/or about portions of, the second polishing elements 1006 or the first polishing elements 1004. In some embodiments, the observation window 1010 may be formed from a material that is substantially transparent, and thus is able to transmit light emitted from a laser and/or white light source for use in a CMP optical endpoint detection system. The optical clarity should be high enough to provide at least about 25% (e.g., at least about 50%, at least about 80%, at least about 90%, at least about 95%) light transmission over the wavelength range of the light beam used by the end point detection system's optical detector. Typical optical end point detection wavelength ranges include the visible spectrum (e.g., from about 400 nm to about 800 nm), the ultraviolet (UV) spectrum (e.g., from about 300 nm to about 400 nm), and/or the infrared spectrum (e.g., from about 800 nm to about 1550 nm). In one embodiment, observation window 1010 is formed from a material that has a transmittance of >35% at wavelengths between 280-800 nm. In one embodiment, observation window 1010 is formed from a material that has a transmittance of >35% at wavelengths between 280-399 nm, and a transmittance of >70% at wavelengths between 400-800 nm. In some embodiments, the observation window 1010 is formed from a material that has a low refractive index that is about the same as that of the polishing slurry and has a high optical clarity to reduce reflections from the air/window/water interface and improve transmission of the light through the observation window 1010 to and from the substrate.

In one embodiment, the observation window 1010 may be formed from a transparent printed material, including polymethylmethacrylate (PMMA). In another embodiment, the window is formed using transparent polymeric compositions that contain epoxide groups, wherein the compositions may be cured using a cationic cure, and may provide additional clarity and less shrinkage. In a similar embodiment, the window may be formed from a mixture of compositions that undergo both cationic and free radical cure. In another embodiment, the window may be produced by another process, and may be mechanically inserted into a preformed opening in the polishing pad that is formed by a 3D process.

Figure 11:
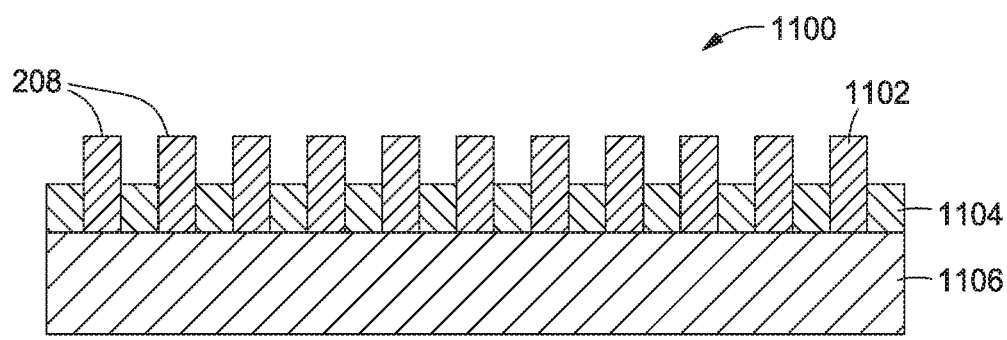
FIG. 11 is a schematic perspective sectional view of a polishing pad including a supporting foam layer, according to an embodiment of the present disclosure.

FIG. 11 is a schematic perspective sectional view of a polishing pad 1100 including a backing layer 1106. The polishing pad 1100 includes a second polishing element 1104 and a plurality of first polishing elements 1102 protruding from the second polishing element 1104. The polishing pad 1100 may be similar to any of the polishing pads 200, 900, 1000 described above, with the exception that the backing layer 1106 attached to the second polishing element 1104. The backing layer 1106 may provide a desired compressibility to the polishing pad 1100. The backing layer 1106 may also be used to alter the overall mechanical properties of the polishing pad 1100 to achieve a desired hardness and/or have desired storage modulus E' and loss modulus E". The backing layer 1106 may have a hardness value of less than 80 Shore A scale. In one embodiment, the backing layer 1106 may be formed from an open-cell or a closed-cell foam, such as polyurethane or polysiloxane (silicone), so that under pressure the cells collapse and the backing layer 1106 compresses. In another embodiment, the backing layer 1106 may be formed from natural rubber, EPDM rubber (ethylene propylene diene monomer), nitrile, or neoprene (polychloroprene).

In one embodiment, the materials of the first polishing element 204 and second polishing element 206 are chemically resistant to attack from the polishing slurry. In another embodiment, the materials of first polishing element 204 and second polishing element 206 are hydrophilic. The hydrophilic and hydrophobic nature of the polishing pad may be adjusted by judicious choice of formulation chemistries by those skilled in the art.

Although polishing pads described herein are circular in shape, polishing particles according to the present disclosure may include any suitable shape, such as polishing webs configured to move linearly during polishing.

Compared with traditional polishing pads, the advanced polishing pad disclosed herein has several manufacturing and cost related advantages. For example, traditional polishing pads generally include a machined and textured polishing surface that is supported by a subpad formed from a soft or low storage modulus E' material, such as a foam, to obtain target hardness and/or a storage modulus E' for polishing substrates. However, by selecting materials having various mechanical properties and adjusting the dimensions and arrangement of the different features formed on an advanced polishing pad the same properties can be achieved in the pad body of the advanced polishing pad without the need for a subpad. Therefore, the advanced polishing pad reduces a user's cost of ownership by eliminating the need for a subpad.

The increased complexity of polishing pad designs that will be required to polish the next generation IC devices greatly increases the manufacturing complexity of these polishing pads. There are non-additive manufacturing type processes and/or subtractive process which may be employed to manufacture some aspects of these complex pad designs. These processes may include multi-material injection molding and/or sequential step UV casting to form material layers from single discrete materials. These forming steps are then typically followed by machining and post processing using milling, grinding or laser ablation operations or other subtractive techniques.

While the foregoing is directed to embodiments of the present disclosure, other and further embodiments of the disclosure may be devised without departing from the basic scope thereof, and the scope thereof is determined by the claims that follow.

The invention claimed is:

1. A method of forming a polishing article by sequentially forming a plurality of polymer layers, comprising:
   forming a first layer on a surface, wherein forming the first layer comprises:
      dispensing a plurality of first droplets on the surface in a first pattern which is aligned in a first direction, wherein the first droplets each have a first volume and comprise a first resin precursor composition; and
      curing the dispensed first droplets, wherein the cured first droplets each have a first size when measured in the first direction, wherein a spacing, in the first direction, of the first pattern of cured first droplets is equal to or greater than the first size of the cured first droplets, wherein curing the dispensed first droplets comprises exposing the first droplets to electromagnetic radiation for a first period of time to only partially cure the first droplets, and wherein the partially cured first droplets each have a contact angle relative to the surface on which the first layer is formed that is greater than or equal to 50 degrees; and
   forming a second layer on a surface of the first layer, wherein forming the second layer comprises:
      dispensing a first droplet, which comprises the first resin precursor composition, on each of the first droplets in the first layer; and
      curing the dispensed first droplets in the second layer.

2. The method of claim 1, wherein the first size of the cured first droplets is smaller than an uncured equilibrium size of a first droplet that is disposed on the surface, wherein the uncured equilibrium size of the first droplet is measured in the first direction.

3. The method of claim 1, further comprising:
   dispensing a plurality of second droplets on the surface in a second pattern which is aligned in the first direction, wherein the second droplets each have a second volume and comprise a second resin precursor composition; and
   curing the dispensed second droplets, wherein the cured second droplets each have a second size when measured the first direction,
   wherein a spacing of the second pattern of cured second droplets is equal to or greater than the second size of the cured second droplets.

4. The method of claim 3, wherein a first ratio of the first droplets to second droplets in the first layer varies in a second direction that is at an angle to the first direction.

5. The method of claim 3, wherein
   the first resin precursor composition comprises a first amount of an aliphatic multifunctional urethane acrylate, a first amount of a second resin precursor component, and a first amount of a first curing agent; and
   the second resin precursor composition comprises a second amount of the aliphatic multifunctional urethane acrylate and a first amount of a third resin precursor component.

6. The method of claim 3, wherein the first volume and the second volume are equal.

7. A method of forming a polishing article by sequentially forming a plurality of polymer layers, comprising:
   forming a first layer on a surface, wherein forming the first layer comprises:
      dispensing a plurality of first droplets on a surface in a first pattern which is aligned in a first direction;
      exposing the plurality of first droplets and plurality of second droplets to electromagnetic radiation for a first period of time to only partially cure the plurality of first droplets and the plurality of second droplets before forming a second layer, wherein
      the first droplets comprise a first resin precursor composition,
      a spacing of the first droplets in the first direction is equal to or smaller than an equilibrium size of a first droplet that is disposed on the surface, and
      the partially cured first droplets and the partially cured second droplets each have a contact angle relative to the surface on which the first layer is formed that is greater than or equal to 50 degrees; and
      dispensing a plurality of second droplets on the surface in a second pattern which is aligned in the first direction, wherein the second droplets comprises a second resin precursor composition; and
   forming the second layer on a surface of the first layer, wherein forming the second layer comprises dispensing a first droplet, which comprises the first resin precursor composition, on each of the first droplets in the first layer.

8. The method of claim 7, wherein a first ratio of the first droplets to second droplets in the first layer varies in a second direction that is at an angle to the first direction.

9. The method of claim 7, wherein
   the first droplet composition comprises a resin precursor composition that has a glass transition temperature of less than or equal to about 40° C., and
   the second droplet composition comprises a resin precursor composition that has a glass transition temperature of greater than about 40° C.

10. The method of claim 7, wherein a spacing of one or more second droplets in the first direction is equal to or greater than a size of a dispensed second droplet.

11. A method of forming a polishing pad, comprising:
   forming a plurality of repeating first and second layers using a layer-by-layer additive manufacturing process, wherein forming each the first layers comprises:
      dispensing droplets of a first precursor composition onto a surface of a second layer, wherein at least some of the droplets of the first precursor are spaced apart from one another;
      dispensing droplets of a second precursor composition in the spaces disposed between at least some of the droplets of the first precursor composition; and
      at least partially curing the dispensed droplets of the first and second precursor compositions by exposing the dispensed droplets of the first and second precursor compositions to electromagnetic radiation for a first period of time, wherein the at least partially cured dispensed droplets each have a contact angle relative to the surface of the second layer that is greater than or equal to 50 degrees.

12. The method of claim 11, wherein forming each of the second layers comprises:
dispensing droplets of the first precursor composition onto a surface of a first layer, wherein at least some of the individual droplets of the first precursor are spaced apart from one another;
dispensing droplets of the second precursor composition in the spaces disposed between at least some of the droplets of the first precursor composition; and
at least partially curing the dispensed droplets of the first and second precursor compositions.

13. The method of claim 12, wherein forming a portion of one or more of the first and second layers comprises dispensing at least some droplets of the first precursor composition onto a portion of a surface of a previously formed layer that comprises at least partially cured droplets of the second precursor composition.

14. The method of claim 12, wherein droplets of one or both of the first and second precursor compositions are at least partially cured before the droplets reach an equilibrium size.

15. A method of forming a polishing article by sequentially forming a plurality of first and second polymer layer stacks, comprising:
forming a first polymer layer on a previously formed second polymer layer, wherein forming the first polymer layer comprises:
dispensing first droplets of a first precursor composition on a surface of the previously formed second polymer layer in a first pattern which is aligned in a first direction, wherein
at least some of the first droplets are spaced apart from one another;
dispensing second droplets of a second precursor composition on the surface of the second layer in a second pattern which is aligned in the first direction, wherein
the second droplets comprise a second resin precursor composition, and
the second droplets are dispensed into spaces disposed between the first droplets; and
at least partially curing the dispensed first and second droplets by exposing the first and second droplets to electromagnetic radiation for a first period of time, wherein the at least partially cured first droplets and second droplets each have a contact angle relative to the surface of the previously formed second polymer layer that is greater than or equal to 50 degrees; and
forming a second polymer layer on a surface of the first polymer layer, wherein forming the second polymer layer comprises dispensing first droplets onto a surface formed of at least partially cured second droplets in the first polymer layer.

16. The method of claim 15, wherein forming a portion of the second polymer layer further comprises dispensing droplets of the second precursor composition onto a surface formed of at least partially cured first droplets in the first precursor composition.

17. The method of claim 1, wherein the first resin precursor composition comprising an aliphatic multifunctional urethane acrylate that has a functionality that is greater than or equal to 2.

18. The method of claim 7, wherein the first resin precursor composition comprises an aliphatic multifunctional urethane acrylate that has a functionality that is greater than or equal to 2.

19. The method of claim 11, wherein one or both of the first precursor composition and the second precursor composition comprises a functional aliphatic acrylate.

20. The method of claim 15, wherein the first droplets comprise an acrylate.

21. The method of claim 18, wherein
the first resin precursor composition comprises a first amount of the aliphatic multifunctional urethane acrylate, a first amount of a second resin precursor component, and a first amount of a first curing agent; and
the second resin precursor composition comprises a second amount of the aliphatic multifunctional urethane acrylate and a first amount of a third resin precursor component.

22. The method of claim 19, wherein the functional aliphatic acrylate is selected from a group consisting of aliphatic monofunctional urethane acrylates, aliphatic monofunctional acrylates, aliphatic difunctional acrylates, and aliphatic multifunctional urethane acrylates having a functionality that is greater than or equal to 2.

23. The method of claim 19, wherein the functional aliphatic acrylate is an aliphatic multifunctional urethane acrylate having a functionality that is greater than or equal to 2.

24. The method of claim 23, wherein one or both of the first precursor composition and the second precursor composition comprises a mixture of the aliphatic multifunctional urethane acrylate having a functionality of 2 or more and a chemical component having an aromatic group.

25. The method of claim 24, wherein the chemical component having the aromatic group is an acrylate.

26. The method of claim 20 wherein the acrylate comprises an aromatic group.

27. The method of claim 20 wherein the acrylate is an aliphatic multifunctional urethane acrylate having a functionality that is greater than or equal to 2.

28. The method of claim 20 wherein the acrylate is selected from a group consisting of aliphatic monofunctional urethane acrylates, aliphatic monofunctional acrylates, aliphatic difunctional acrylates, and aliphatic multifunctional urethane acrylates having a functionality that is greater than or equal to 2.

29. The method of claim 28, wherein the first droplets further comprise a chemical component having an aromatic group.

* * * * *